(12) United States Patent
Pacala et al.

(10) Patent No.: US 12,189,038 B2
(45) Date of Patent: Jan. 7, 2025

(54) PROCESSING SYSTEM FOR LIDAR MEASUREMENTS

(71) Applicant: Ouster, Inc., San Francisco, CA (US)

(72) Inventors: Angus Pacala, San Francisco, CA (US); Marvin Shu, San Francisco, CA (US)

(73) Assignee: Ouster, Inc., San Francisco, CA (US)

( * ) Notice: Subject to any disclaimer, the term of this patent is extended or adjusted under 35 U.S.C. 154(b) by 310 days.

(21) Appl. No.: 17/496,583

(22) PCT Filed: Aug. 5, 2020

(86) PCT No.: PCT/US2020/045016
§ 371 (c)(1),
(2) Date: Oct. 7, 2021

(87) PCT Pub. No.: WO2021/026241
PCT Pub. Date: Feb. 11, 2021

(65) Prior Publication Data
US 2023/0176223 A1  Jun. 8, 2023

Related U.S. Application Data

(60) Provisional application No. 62/882,907, filed on Aug. 5, 2019.

(51) Int. Cl.
*G01S 17/89* (2020.01)
*G01S 7/4865* (2020.01)
(Continued)

(52) U.S. Cl.
CPC .......... *G01S 17/894* (2020.01); *G01S 7/4865* (2013.01); *G01S 7/487* (2013.01); *G01S 17/931* (2020.01)

(58) Field of Classification Search
None
See application file for complete search history.

(56) References Cited

U.S. PATENT DOCUMENTS

| | | |
|---|---|---|
| 3,566,402 A | 2/1971 | Taylor |
| 3,786,428 A | 1/1974 | Takashi |
| | (Continued) | |

FOREIGN PATENT DOCUMENTS

| | | |
|---|---|---|
| CN | 205826866 | 12/2016 |
| EP | 3370079 A1 | 9/2018 |
| | (Continued) | |

OTHER PUBLICATIONS

Chih-Yuan Chen, a Sub-Centimeter Ranging Precision Lidar Sensor Prototype Based On ILO-TDC, https://oaktrust.library.tamu.edu/bitstream/handle/1969.1/157844/CHEN-THESIS-2016.pdf?sequence=1&isAllowed=y, Thesis Aug. 2016 (Year: 2016).*

(Continued)

*Primary Examiner* — Hovhannes Baghdasaryan
(74) *Attorney, Agent, or Firm* — Kilpatrick Townsend & Stockton LLP

(57) ABSTRACT

An optical measurement system may improve the accuracy with which it estimates distances to surrounding objects by upgrading various aspects of its data path. Spatial resolution may be increased by subdividing histogram buckets or integration registers based on spatial location. Saturation at any point in the data path can be detected and used to stop counting photons in individual pixels, which can then be normalized after a measurement is over. Multiple peaks can be detected using recursive or iterative techniques to identify a largest remaining peak at each stage. Instead of iterating through the histogram memory multiple times, a threshold can be pre-calculated based on an estimated ambient noise level, and peaks can be detected in a single pass.

19 Claims, 41 Drawing Sheets

(51) Int. Cl.
    *G01S 7/487* (2006.01)
    *G01S 17/894* (2020.01)
    *G01S 17/931* (2020.01)

(56) References Cited

U.S. PATENT DOCUMENTS

| | | | |
|---|---|---|---|
| 6,897,434 | B1 | 5/2005 | Kumar et al. |
| 7,020,353 | B1 | 3/2006 | Mccaffrey et al. |
| 7,187,452 | B2 | 3/2007 | Jupp et al. |
| 7,456,970 | B1 | 11/2008 | Lopez et al. |
| 7,830,442 | B2 | 11/2010 | Griffis et al. |
| 7,917,320 | B2 | 3/2011 | Levesque et al. |
| 7,969,558 | B2 | 6/2011 | Hall |
| 8,115,925 | B1 | 2/2012 | Mathur et al. |
| 8,232,514 | B2 | 7/2012 | Grund |
| 8,363,511 | B2 | 1/2013 | Frank et al. |
| 8,374,405 | B2 | 2/2013 | Lee et al. |
| 8,724,096 | B2 | 5/2014 | Gosch et al. |
| 8,836,922 | B1 | 9/2014 | Pennecot et al. |
| 8,963,069 | B2 | 2/2015 | Drader et al. |
| 9,081,096 | B2 | 7/2015 | Li |
| 10,036,801 | B2 | 7/2018 | Retterath et al. |
| 10,048,374 | B2 | 8/2018 | Hall |
| 10,203,399 | B2 | 2/2019 | Retterath et al. |
| 10,317,529 | B2 | 6/2019 | Shu et al. |
| 10,884,126 | B2 | 1/2021 | Shu et al. |
| 11,105,925 | B2 | 8/2021 | Pacala et al. |
| 2003/0173514 | A1 | 9/2003 | Syage et al. |
| 2004/0119838 | A1 | 6/2004 | Griffis et al. |
| 2004/0130702 | A1 | 7/2004 | Jupp et al. |
| 2009/0099813 | A1 | 4/2009 | Dimsdale et al. |
| 2009/0295632 | A1 | 12/2009 | Simic et al. |
| 2010/0020306 | A1 | 1/2010 | Hall |
| 2010/0042362 | A1 | 2/2010 | Levesque et al. |
| 2010/0114416 | A1 | 5/2010 | Au et al. |
| 2010/0182874 | A1 | 7/2010 | Frank et al. |
| 2011/0052004 | A1 | 3/2011 | Lee et al. |
| 2011/0153268 | A1 | 6/2011 | Jordan et al. |
| 2012/0026497 | A1 | 2/2012 | Mathur et al. |
| 2012/0091324 | A1 | 4/2012 | Grund |
| 2012/0153120 | A1 | 6/2012 | Baxter |
| 2012/0154786 | A1 | 6/2012 | Gosch et al. |
| 2013/0153754 | A1 | 6/2013 | Drader et al. |
| 2014/0063483 | A1 | 3/2014 | Li |
| 2014/0211194 | A1 | 7/2014 | Pacala et al. |
| 2015/0041625 | A1 | 2/2015 | Dutton et al. |
| 2015/0131080 | A1 | 5/2015 | Retterath et al. |
| 2016/0041258 | A1 | 2/2016 | Cashler et al. |
| 2016/0155621 | A1 | 6/2016 | Denny et al. |
| 2016/0259038 | A1 | 9/2016 | Retterath et al. |
| 2017/0052065 | A1 | 2/2017 | Sharma et al. |
| 2017/0269209 | A1 | 9/2017 | Hall et al. |
| 2018/0259645 | A1 | 9/2018 | Shu et al. |
| 2018/0284277 | A1 | 10/2018 | LaChappelle et al. |
| 2018/0292534 | A1 | 10/2018 | Field |
| 2018/0299552 | A1 | 10/2018 | Shu et al. |
| 2018/0299554 | A1 | 10/2018 | Van Dyck et al. |
| 2018/0373260 | A1 | 12/2018 | Lipson et al. |
| 2019/0018119 | A1 | 1/2019 | Laifenfeld et al. |
| 2019/0056497 | A1 | 2/2019 | Pacala et al. |
| 2019/0179018 | A1 | 6/2019 | Gunnam et al. |
| 2019/0257950 | A1 | 8/2019 | Patanwala et al. |

FOREIGN PATENT DOCUMENTS

| | | | |
|---|---|---|---|
| GB | 1291240 | A | 10/1972 |
| JP | 2018091760 | A | 6/2018 |
| WO | 2016063028 | | 4/2016 |
| WO | 2016126250 | A1 | 8/2016 |
| WO | 2018057081 | A1 | 3/2018 |
| WO | 2018160886 | A1 | 9/2018 |
| WO | 2019112733 | A1 | 6/2019 |

OTHER PUBLICATIONS

U.S. Appl. No. 18/139,847, "Final Office Action", Oct. 31, 2023, 11 pages.
PCT/US2020/045016, "International Search Report and Written Opinion", Dec. 8, 2020, 12 pages.
PCT/US2020/045016, "Invitation to Pay Additional Fees and, Where Applicable, Protest Fee", Oct. 9, 2020, 2 pages.
U.S. Appl. No. 18/139,847, "Non Final Office Action", Jul. 21, 2023, 9 pages.
EP20849369.2, "Extended European Search Report", Jul. 10, 2023, 6 pages.
JP2022-506630, "Office Action", Jul. 23, 2024, 9 pages.
U.S. Appl. No. 18/139,847, "Non-Final Office Action", Apr. 4, 2024, 11 pages.
CN202080066762.5, "Office Action", Jul. 26, 2024, 14 pages.

\* cited by examiner

PROCESSING SYSTEM FOR LIDAR MEASUREMENTS

CROSS-REFERENCES TO RELATED APPLICATION

This application is the U.S. National Stage application of International Application No. PCT/US2020/045016, filed Aug. 5, 2020; which claims the benefit of and priority to U.S. Provisional Application No. 62/882,907 filed on Aug. 5, 2019, which is incorporated herein by reference in its entirety.

TECHNICAL FIELD

This disclosure generally describes Light Detection And Ranging (LIDAR) systems. More specifically, this disclosure describes SPAD-based LIDAR systems that estimate a background noise level and aggregate total photon counts over the course of a measurement with improved temporal resolution.

BACKGROUND

LIDAR systems are used for object detection and ranging, e.g., for vehicles such as cars, trucks, boats, etc. LIDAR systems also have uses in mobile applications (e.g., for face recognition), home entertainment (e.g., to capture gesture capture for video game input), and augmented reality. A LIDAR system measures the distance to an object by irradiating a landscape with pulses from a laser, and then measuring the time for photons to travel to an object and return after reflection, as measured by a receiver of the LIDAR system. A detected signal is analyzed to detect the presence of reflected signal pulses among background light. A distance to an object can be determined based on a time-of-flight from transmission of a pulse to reception of a corresponding reflected pulse.

It can be difficult to provide robust distance accuracy down to a few centimeters in all conditions, particularly at an economical cost for the LIDAR system. Promising new detector technologies, like single photon avalanche diodes (SPADs), are attractive but have significant drawbacks when used to measure time-of-flight and other signal characteristics due to their limited dynamic range, particularly over a broad range of ambient conditions and target distances. Additionally, because of their sensitivity to even a small number of photons, SPADs can be very susceptible to ambient levels of background noise light.

LIDAR systems would benefit from more accurate methods of detecting reflected laser pulses and measuring their time-of-flight under varying real world conditions. Specifically, SPAD-based LIDAR systems would benefit from methods to accurately estimate a background noise level and aggregate total photon counts over the course of a measurement with improved temporal resolution.

BRIEF SUMMARY

In some embodiments, an optical measurement system may include a light source configured to transmit one or more pulse trains over one or more first time intervals as part of an optical measurement. Each of the one or more first time intervals may include one of the one or more pulse trains. The optical measurement system may also include a photosensor comprising one or more photodetectors configured to detect photons from the one or more pulse trains and photons from ambient light. The optical measurement system may additionally include a plurality of first registers that accumulate photon counts from the one or more photodetectors received during the one or more first time intervals. Each of the one or more first time intervals may be subdivided into a plurality of first time bins, and each of the plurality of first registers may accumulate photon counts received during a corresponding one of the plurality of first time bins in each of the one or more first time intervals to represent a histogram of photon counts received during the one or more first time intervals. The optical measurement system may further include a plurality of second registers that accumulate the photon counts from the one or more photodetectors over a second time interval that overlaps with at least a portion of the one or more first time intervals. The second time interval may be subdivided into a plurality of second time bins, and each of the plurality of second registers may accumulate photon counts received during a corresponding one of the plurality of second time bins.

In some embodiments, a method of using an optical measurement system may include transmitting one or more pulse trains over one or more first time intervals as part of an optical measurement. Each of the one or more first time intervals may include one of the one or more pulse trains. The method may also include detecting photons from the one or more pulse trains and photons from ambient light. The method may additionally include accumulating, into a plurality of first registers, photon counts from one or more photodetectors received during the one or more first time intervals. Each of the one or more first time intervals may be subdivided into a plurality of first time bins, and each of the plurality of first registers may accumulate photon counts received during a corresponding one of the plurality of first time bins in each of the one or more first time intervals to represent a histogram of photon counts received during the one or more first time intervals. The method may further include accumulating, into a plurality of second registers, photon counts over a second time interval that overlaps with at least a portion of the one or more first time intervals. The second time interval may be subdivided into a plurality of second time bins. Each of the plurality of second registers may accumulate photon counts received during a corresponding one of the plurality of second time bins.

In any embodiments any or all of the following features may be included in any combination and without limitation. The optical measurement system may also include an arithmetic logic circuit that aggregates photon counts in each of the plurality of second registers to generate a total photon count received during the second time interval. Each of the one or more first time intervals may be defined by a first start signal. The second time interval may be defined by a second start signal that is independent from the first start signal. The one or more photodetectors may include one or more single-photon avalanche diodes (SPADs). Each of the one or more first time intervals may be included in the second time interval. The optical measurement system may also include a select signal that selects which of the plurality of second registers accumulates photon counts during each of the plurality of second time bins. The select signal may be generated by a timer. The select signal may be generated on a same integrated circuit as the plurality of second registers. The select signal may alternatively not be generated on a same integrated circuit as the plurality of second registers. The select signal may be generated based on an angular position of the photosensor when around a center axis. The method/system operations may also include aggregating photon counts in each of the plurality of second registers to generate a total photon count received during the second time interval; and estimating a background noise detected by the optical measurement system during the second time interval using the total photon count. Estimating the background noise may include dividing the total photon count by a length of the second time interval. Estimating the background noise may include identifying one or more time bins in the plurality of first time bins during which reflected photons resulting from the one or more pulse trains are estimated to have been received by the optical measurement system; and excluding photon counts received in the one or more time bins from the total photon count. The background noise may be removed from the plurality of first registers. The second time interval may include time intervals outside of the one or more first time intervals. The histogram of photon counts in the plurality of first registers received during the one or more first time intervals may represent a single optical measurement by the optical measurement system. The method/system operations may also include using the photon counts stored in the plurality of second registers over the second time interval to generate an ambient image of a surrounding environment. The photon counts stored in the plurality of second registers over the second time interval may include the photons from the one or more pulse trains and the photons from the ambient light.

In some embodiments, an optical measurement system may include a light source configured to transmit one or more pulse trains over one or more first time intervals as part of an optical measurement. Each of the one or more first time intervals may include one of the one or more pulse trains. The optical measurement system may also include a photosensor comprising one or more photodetectors configured to detect photons from the one or more pulse trains. optical measurement system may also include a data path comprising an arithmetic logic circuit and a plurality of first registers. The data path may be configured to populate the plurality of first registers using photon counts from the one or more pulse trains aggregated by the arithmetic logic circuit, such that the plurality of first registers represents a histogram of photon counts received during the one or more first time intervals. The optical measurement system may additionally include a saturation detection circuit that determines when a saturation occurs in the data path and causes the data path to stop populating the plurality of first registers in time intervals in the one or more time first intervals that occur after the saturation occurs.

In some embodiments, a method of using an optical measurement system may include transmitting one or more pulse trains over one or more first time intervals as part of an optical measurement. Each of the one or more first time intervals may include one of the one or more pulse trains. The method may also include detecting photons from the one or more pulse trains using one or more photodetectors. The method may additionally include populating a plurality of first registers in a data path using photon counts from the one or more photodetectors. The photon counts are aggregated by an arithmetic logic circuit in the data path such that the plurality of first registers represents a histogram of photon counts received during the one or more first time intervals. The method may further include determining when a saturation occurs in the data path. The method may also include causing the data path to stop populating the plurality of first registers in time intervals in the one or more first time intervals that occur after the saturation occurs.

In any embodiments any or all of the following features may be included in any combination and without limitation. The data path may include a counter that may count a number of the one or more first time intervals that occur before the saturation detection circuit causes the data path to stop populating the plurality of first registers. The counter may be incremented by a signal that also starts the one or more first time intervals. The data path may further include a counter that counts a number of times the arithmetic logic circuit updates the plurality of first registers before the saturation detection circuit causes the data path to stop populating the plurality of first registers. The saturation detection circuit may receive a signal from the arithmetic logic circuit indicating that the arithmetic logic circuit has saturated. The saturation detection circuit may receive a signal indicating that a result from the arithmetic logic circuit is larger than a maximum number to be stored in one of the plurality of first registers. The saturation detection circuit may cause the data path to stop populating the plurality of first registers by disabling a periodic signal that causes the arithmetic logic circuit to aggregate photon counts. The saturation detection circuit may cause the data path to stop populating the plurality of first registers by disabling a periodic signal that causes the plurality of first registers to store updated photon counts. The system may also include a second data path comprising a second arithmetic logic circuit and one or more integration registers, where the second data path may be configured to aggregate the photon counts from the one or more photodetectors into the one or more integration registers over a second time interval that includes at least the one or more first time intervals. The second data path may include a second saturation detection circuit that determines when a saturation occurs in the second data path and causes the second data path to stop aggregate the photon counts from the one or more photodetectors into the one or more integration registers during the second time interval after the saturation occurs. The system may also count a number of events that occur prior to causing the data path to stop populating the plurality of first registers. The system may also calculate a multiplier using the number of events that occur prior to causing the data path to stop populating the plurality of first registers; and a total number of events that occur during the one or more first time intervals. The system may also scale the histogram of photon counts in the plurality of first registers using the multiplier. The system may also locate a peak in the histogram of photon counts in the plurality of first registers after scaling the histogram of photon counts. The system may also populate one or more integration registers in a second data path using photon counts from the one or more photodetectors, where the photon counts may be aggregated by a second arithmetic logic circuit in the second data path such that the one or more integration registers represents a total photon count received over a second time interval that includes at least the one or more first time intervals; determine when a saturation occurs in the second data path; and cause the second data path to stop populating the one or more integration registers after the saturation occurs. The system may also count a number of events that occur prior to causing the second data path to stop populating the one or more integration registers; and scale the total photon count in the one or more integration registers using the number of events that occur prior to causing the second data path to stop populating the one or more integration registers. The system may also calculate an ambient background noise level after scaling the total photon count. The system may also set a threshold for detecting peaks in the optical measurement using the ambient background noise level. The system may also remove the ambient background noise level from the histogram of photon counts in the plurality of first registers.

In some embodiments, an optical measurement system may include a light source configured to transmit one or more pulse trains over one or more first time intervals as part of an optical measurement, where each of the one or more first time intervals includes one of the one or more pulse trains. The system may also include a photosensor with one or more photodetectors configured to detect photons from the one or more pulse trains. The system may additionally include a plurality of first registers that accumulate photon counts from the one or more photodetectors received during the one or more first time intervals to represent a histogram of photon counts received during the one or more first time intervals, each of the plurality of first registers corresponding a time bin in the histogram. The system may further include a peak detection circuit configured to identify a maximum peak in at least a portion of the histogram in the plurality of first registers each time the peak detection circuit executes. The system may also include a masking circuit configured to cause the peak detection circuit to exclude registers corresponding to peaks identified as a maximum peak during a previous execution of the peak detection circuit from being identified as a maximum peak during a subsequent execution of the peak detection circuit, such that a plurality of executions of the peak detection circuit identifies a plurality of peaks.

In some embodiments, a method of using an optical measurement system may include transmitting one or more pulse trains over one or more first time intervals as part of an optical measurement. Each of the one or more first time intervals may include one of the one or more pulse trains. The method may also include detecting photons from the one or more pulse trains using one or more photodetectors. The method may additionally include accumulating photon counts from the one or more photodetectors into a plurality of first registers to represent a histogram of photon counts received during the one or more first time intervals, each of the plurality of first registers corresponding a time bin in the histogram. The method may further include identifying a plurality of peaks in the histogram in the plurality of first registers through a plurality of executions of a peak detection circuit. Each execution of the peak detection circuit may identify a maximum peak in at least a portion of the histogram. Registers corresponding to peaks identified as a maximum peak during a previous execution of the peak detection circuit may be excluded from being identified as a maximum peak during a subsequent execution of the peak detection circuit.

In any embodiments any or all of the following features may be included in any combination and without limitation. The system may also include a plurality of second registers configured to store the plurality of peaks identified by the peak detection circuit. Each of the plurality of peaks may be stored as a series of time bins representing a time interval in the histogram around the peak. Each of the plurality of peaks may be stored with a relative time in the histogram at which the peak occurred. The system may be configured to send the plurality of peaks identified by the peak detection circuit to a processor, where the processor may operate on an integrated circuit chip that is distinct from an integrated circuit chip on which the peak detection circuit operates. The plurality of peaks may be sent to the processor without applying a filter to values representing the plurality of peaks. Each execution of the peak detection circuit may be configured to cycle through the plurality of first registers and identify a maximum value in the plurality of first registers that has not been excluded by the masking circuit. A maximum peak may include a subset of the plurality of first registers centered around one of the plurality of first registers storing the maximum value. The peak detection circuit may be configured to cycle through the plurality of first registers at least three times to identify at least three maximum peaks in the histogram. The one or more photodetectors may include one or more SPADs. The method/system operations may also include applying a low-pass filter to the histogram stored in the plurality of first registers prior to identifying the maximum peaks. The method/system operations may also include applying a matched filter to the histogram stored in the plurality of first registers prior to identifying the maximum peaks, where the matched filter may correspond to the one or more pulse trains. The peaks identified as maximum peaks during previous executions of the peak detection circuit may be excluded from being identified as maximum peaks during subsequent executions of the peak detection circuit by masking registers in the plurality of first registers that represent the peaks previously identified as maximum peaks from the peak detection circuit during subsequent executions. The peaks identified as maximum peaks during previous executions of the peak detection circuit may be excluded from being identified as maximum peaks during subsequent executions of the peak detection circuit by setting a threshold at or below a maximum value from the peaks previously identified as maximum peaks; and excluding peaks during subsequent executions of the peak detection circuit that meet or exceed the threshold. Excluding peaks during subsequent executions of the peak detection circuit that meet or exceed the threshold may include identifying a register in the plurality of first registers with a value that meets or exceeds the threshold; and excluding registers around the register in the plurality of first registers. The method/system operations may also include excluding an initial peak in the histogram from executions of the peak detection circuit. The initial peak may result from the a reflection of the one or more pulse trains off a housing of the optical measurement system. The initial peak may meet or exceed a saturation threshold for a saturation detection circuit. The method/system operations may also include masking the initial peak from the saturation detection circuit.

In some embodiments, an optical measurement system may include a light source configured to transmit one or more pulse trains over one or more first time intervals as part of an optical measurement. Each of the one or more first time intervals may include one of the one or more pulse trains. The system may also include a photosensor with one or more photodetectors configured to detect photons from the one or more pulse trains. The system may additionally include a first integrated circuit including a plurality of first registers that accumulate photon counts from the one or more photodetectors received during the one or more first time intervals to represent a histogram of photon counts received during the one or more first time intervals. Each of the plurality of first registers may correspond to a time bin in the histogram. The first integrated circuit may also include a threshold detection circuit configured to provide a threshold for identifying one or more peaks in the histogram; and a peak detection circuit configured to make a pass through the plurality of first registers and identify the one or more peaks represented in the histogram using the threshold. The system may also include a second integrated circuit having a processor. The first integrated circuit may be configured to send information describing the one or more peaks detected using the threshold to the processor on the second integrated circuit.

In some embodiments, a method of using an optical measurement system may include transmitting one or more pulse trains over one or more first time intervals as part of an optical measurement. Each of the one or more first time intervals may include one of the one or more pulse trains. The method may also include detecting photons from the one or more pulse trains using one or more photodetectors. The method may additionally include accumulating, on a first integrated circuit, photon counts from the one or more photodetectors into a plurality of first registers to represent a histogram of photon counts received during the one or more first time intervals, wherein each of the plurality of first registers may correspond to a time bin in the histogram. The method may further include providing, on the first integrated circuit, a threshold for identifying one or more peaks in the histogram. The method may also include identifying, on the first integrated circuit, the one or more peaks represented in the histogram by making a pass through the plurality of first registers with the threshold. The method may additionally include sending, from the first integrated circuit, information describing the one or more peaks detected using the threshold to a processor on a second integrated circuit.

In any embodiments any or all of the following features may be included in any combination and without limitation. The threshold detection circuit may be configured to use an existing threshold. The threshold detection circuit may be configured to calculate the threshold based on a background noise level present during the one or more first time intervals. The system may also include one or more integration registers that accumulate the photon counts from the one or more photodetectors over a second time interval that overlaps with at least a portion of the one or more first time intervals, where the threshold detection circuit may be further configured to calculate the background noise level using one or more values in the one or more integration registers. The threshold detection circuit is further configured to calculate the background noise level by dividing a total photon count in the one or more integration registers by a duration of time during which the one or more integration registers were enabled. The duration of time during which the one or more integration registers were enabled may be determined based on a total number of clock cycles during which the one or more integration registers were enabled. The threshold detection circuit may be further configured to calculate the background noise level by identifying one or more time bins in the histogram that represent the one or more peaks; and subtracting photon counts in the one or more time bins from a total photon count in the one or more integration registers. The system may also include a plurality of second registers configured to store the one or more peaks identified by the peak detection circuit. Each of the one or more peaks may be stored as a window of time bins representing a time interval in the histogram around the peak; and a relative time in the histogram at which the peak occurred. The first integrated circuit may be implemented on a chip that is physically separate and distinct from a chip on which the second integrated circuit is implemented. The one or more peaks may be sent to the processor without applying a filter to values representing the one or more peaks in the histogram. The method/system operations may also include removing the background noise level from the one or more peaks represented in the histogram. The method/system operations may also include determining the background noise level based on a sample of photons received by the one or more photodetectors between the one or more pulse trains. Providing the threshold may include setting the threshold a predetermined interval above a background noise level. Providing the threshold may include setting the threshold an interval above a background noise level that is a predetermined percentage of the background noise level. The method/system operations may also include applying a low-pass filter to the histogram stored in the plurality of first registers prior to identifying the one or more peaks. The method/system operations may also include applying a matched filter to the histogram stored in the plurality of first registers prior to identifying the one or more peaks, where the matched filter may correspond to the one or more pulse trains. The one or more peaks may include a peak corresponding to reflections of the one or more pulse trains and a peak that does not correspond to reflections of the one or more pulse trains. Identifying the one or more peaks represented in the histogram may use only a single pass through the plurality of first registers.

BRIEF DESCRIPTION OF THE DRAWINGS

A further understanding of the nature and advantages of various embodiments may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

TERMS

Figure 1B:
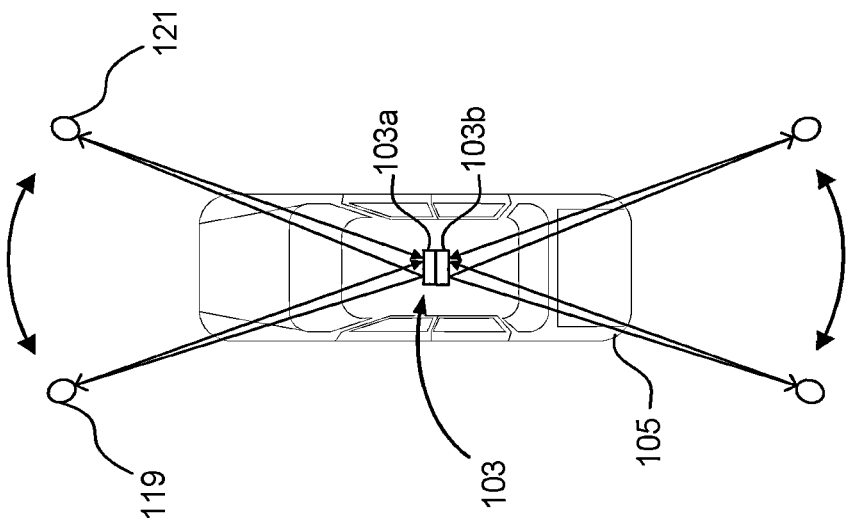
FIGS. 1A and 1B show automotive light ranging devices, also referred to herein as LIDAR systems, according to some embodiments.

The term "ranging," particularly when used in the context of methods and devices for measuring an environment or assisting with vehicle operations, may refer to determining a distance or a distance vector from one location or position to another location or position. "Light ranging" may refer to a type of ranging method that makes use of electromagnetic waves to perform ranging methods or functions. Accordingly, a "light ranging device" may refer to a device for performing light ranging methods or functions. "Lidar" or "LIDAR" may refer to a type of light ranging method that measures a distance to a target by illuminating the target with a pulsed laser light, and thereafter measure the reflected pulses with a sensor. Accordingly, a "lidar device" or "lidar system" may refer to a type of light ranging device for performing lidar methods or functions. A "light ranging system" may refer to a system comprising at least one light ranging device, e.g., a lidar device. The system may further comprise one or more other devices or components in various arrangements.

A "pulse train" may refer to one or more pulses that are transmitted together. The emission and detection of a pulse train may be referred to as a "shot." A shot can occur over a "detection time interval" (or "detection interval").

A "measurement" may include N multiple pulse trains that are emitted and detected over N shots, each lasting a detection time interval. An entire measurement can be over a measurement time interval (or just "measurement interval"), which may equal the N detection interval of a measurement or be longer, e.g., when pauses occur between detection intervals.

A "photosensor" or "photosensitive element" can convert light into an electrical signal. A photosensor may include a plurality of "photodetectors," e.g., single-photon avalanche diodes (SPADs). A photosensor can correspond to a particular pixel of resolution in a ranging measurement.

A "histogram" may refer to any data structure representing a series of values over time, as discretized over time bins. A histogram can have a value assigned to each time bin. For example, a histogram can store a counter of a number of photodetectors that fired during a particular time bin in each of one or more detection intervals. As another example, a histogram can correspond to the digitization of an analog signal at different times. A histogram can include signal (e.g., pulses) and noise. Thus, a histogram can be considered a combination of signal and noise as a photon time series or photon flux. A raw/digitized histogram (or accumulated photon time series) can contain the signal and the noise as digitized in memory without filtering. A "filtered histogram" may refer to the output after the raw histogram is passed through a filter.

An emitted signal/pulse may refer to the "nominal," "ideal," or "template" pulse or pulse train that is not distorted. A reflected signal/pulse may refer to the reflected laser pulse from an object and may be distorted. A digitized signal/pulse (or raw signal) may refer to the digitized result from the detection of one or more pulse trains of a detection interval as stored in memory, and thus may be equivalent to a portion of a histogram. A detected signal/pulse may refer to the location in memory that the signal was detected. A detected pulse train may refer to the actual pulse train found by a matched filter. An anticipated signal profile may refer to a shape of a digitized signal resulting from a particular emitted signal that has a particular distortion in the reflected signal.

DETAILED DESCRIPTION

The present disclosure relates generally to the field of object detection and ranging, and more particularly to the use of time-of-flight optical receiver systems for applications such as real-time three-dimensional mapping and object detection, tracking and/or classification. Various improvements can be realized with various embodiments of the present invention. Such improvements can be increased accuracy, reduced noise, and increased energy efficiency.

Sections below introduce an illustrative automotive LIDAR system, followed descriptions of example techniques to detect signals by a light ranging system, and then different embodiments are described in more details.

I. Illustrative Automotive LIDAR System

Figure 1A:
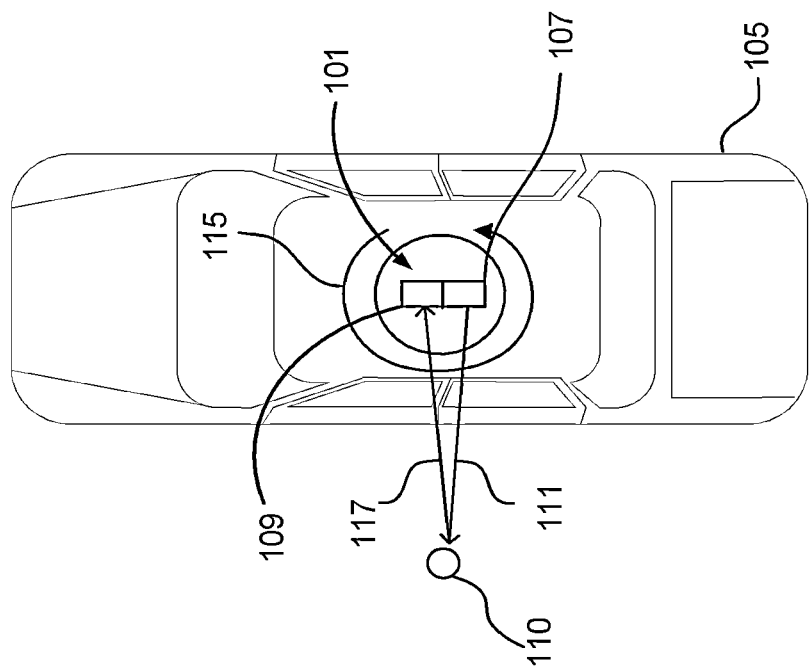

FIGS. 1A-1B show automotive light ranging devices, also referred to herein as LIDAR systems, according to some embodiments. The automotive application for the LIDAR systems is chosen here merely for the sake of illustration and the sensors described herein may be employed in other types of vehicles, e.g., boats, aircraft, trains, etc., as well as in a variety of other applications where 3D depth images are useful, such as medical imaging, mobile phones, augmented reality, geodesy, geomatics, archaeology, geography, geology, geomorphology, seismology, forestry, atmospheric physics, laser guidance, airborne laser swath mapping (ALSM), and laser altimetry. According to some embodiments, a LIDAR system, e.g., scanning LIDAR system 101 and/or solid state LIDAR system 103, can be mounted on the roof of a vehicle 105 as shown in FIGS. 1A and 1B.

The scanning LIDAR system 101 shown in FIG. 1A can employ a scanning architecture, where the orientation of the LIDAR light source 107 and/or detector circuitry 109 can be scanned around one or more fields of view 110 within an external field or scene that is external to the vehicle 105. In the case of the scanning architecture, the emitted light 111 can be scanned over the surrounding environment as shown. For example, the output beam(s) of one or more light sources (such as infrared or near-infrared pulsed IR lasers, not shown) located in the LIDAR system 101, can be scanned, e.g., rotated, to illuminate a scene around the vehicle. In some embodiments, the scanning, represented by rotation arrow 115, can be implemented by mechanical means, e.g., by mounting the light emitters to a rotating column or platform. In some embodiments, the scanning can be implemented through other mechanical means such as through the use of galvanometers. Chip-based steering techniques can also be employed, e.g., by using microchips that employ one or more MEMS based reflectors, e.g., such as a digital micromirror (DMD) device, a digital light processing (DLP) device, and the like. In some embodiments, the scanning can be effectuated through non-mechanical means, e.g., by using electronic signals to steer one or more optical phased arrays.

For a stationary architecture, like solid state LIDAR system 103 shown in FIG. 1B, one or more solid state LIDAR subsystems (e.g., 103a and 103b) can be mounted to the vehicle 105. Each solid state LIDAR unit can face a different direction (possibly with partially and/or non-overlapping fields of views between units) so as to capture a composite field of view that is larger than each unit is capable of capturing on its own.

In either the scanning or stationary architectures, objects within the scene can reflect portions of the light pulses that are emitted from the LIDAR light sources. One or more reflected portions then travel back to the LIDAR system and can be detected by the detector circuitry. For example, reflected portion 117 can be detected by detector circuitry 109. The detector circuitry can be disposed in the same housing as the emitters. Aspects of the scanning system and stationary system are not mutually exclusive and thus can be used in combination. For example, the individual LIDAR subsystems 103a and 103b in FIG. 1B can employ steerable emitters such as an optical phased array or whole the composite unit may rotate through mechanical means thereby scanning the entire scene in front of the LIDAR system, e.g., from field of view 119 to field of view 121.

Figure 2:
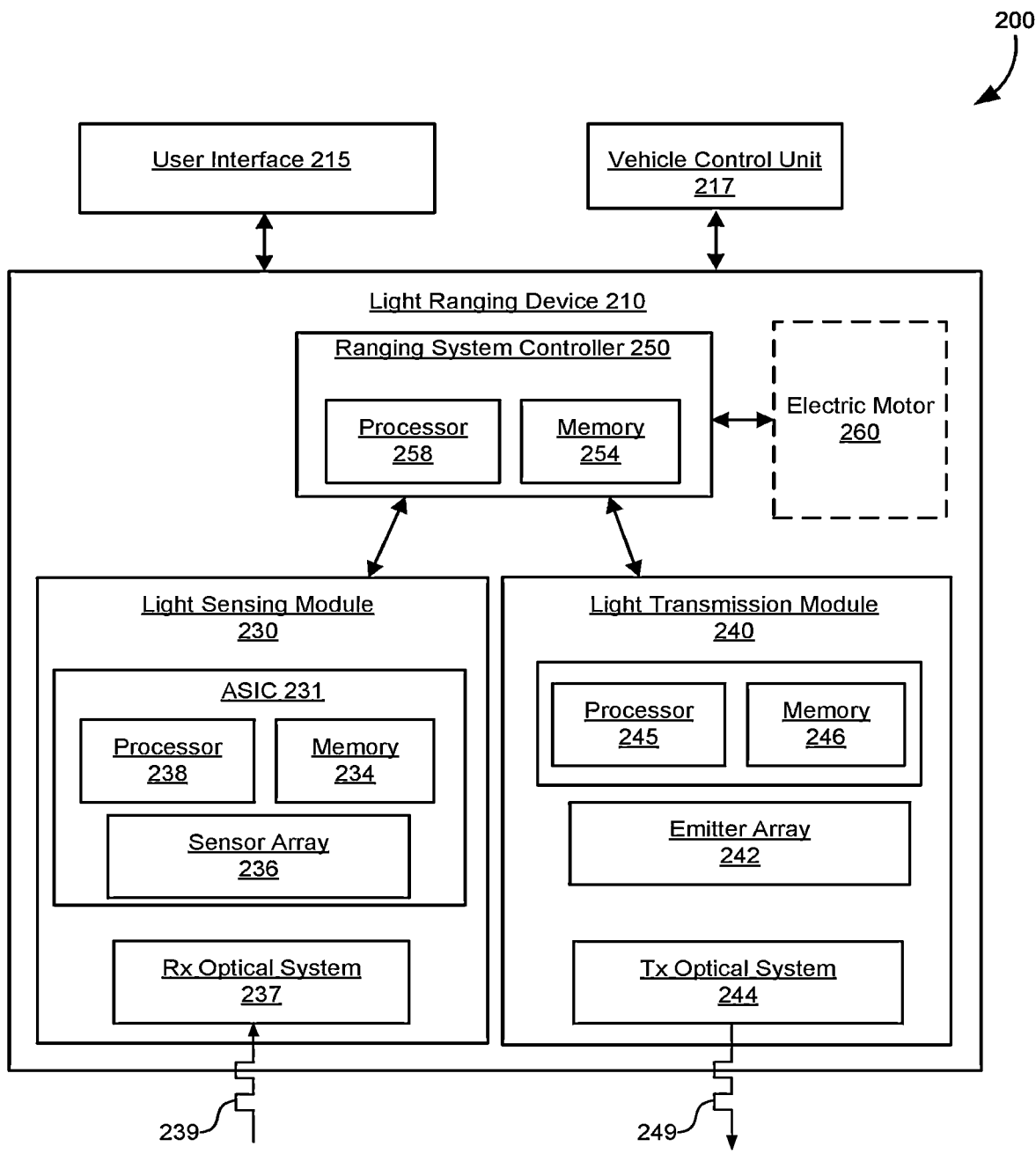
FIG. 2 shows a block diagram of an exemplary LIDAR device for implementing various embodiments.

FIG. 2 illustrates a more detailed block diagram of a rotating LIDAR system 200 according to some embodiments. More specifically, FIG. 2 optionally illustrates a rotating LIDAR system that can employ a rotary actuator on a rotating circuit board, which can receives power and data (as well as transmit) from a stationary circuit board.

LIDAR system 200 can interact with one or more instantiations of user interface 215. The different instantiations of user interface 215 can vary and may include, e.g., a computer system with a monitor, keyboard, mouse, CPU and memory; a touch-screen in an automobile; a handheld device with a touch-screen; or any other appropriate user interface. The user interface 215 may be local to the object upon which the LIDAR system 200 is mounted but can also be a remotely operated system. For example, commands and data to/from the LIDAR system 200 can be routed through a cellular network (LTE, etc.), a personal area network (Bluetooth, Zigbee, etc.), a local area network (WiFi, IR, etc.), or a wide area network such as the Internet.

The user interface 215 of hardware and software can present the LIDAR data from the device to the user but can also allow a user to control the LIDAR system 200 with one or more commands. Example commands can include commands that activate or deactivate the LIDAR system, specify photo-detector exposure level, bias, sampling duration and other operational parameters (e.g., emitted pulse patterns and signal processing), specify light emitters parameters such as brightness. In addition, commands can allow the user to select the method for displaying results. The user interface can display LIDAR system results which can include, e.g., a single frame snapshot image, a constantly updated video image, and/or a display of other light measurements for some or all pixels. In some embodiments, user interface 215 can track distances (proximity) of objects from the vehicle, and potentially provide alerts to a driver or provide such tracking information for analytics of a driver's performance.

In some embodiments, the LIDAR system can communicate with a vehicle control unit 217 and one or more parameters associated with control of a vehicle can be modified based on the received LIDAR data. For example, in a fully autonomous vehicle, the LIDAR system can provide a real time 3D image of the environment surrounding the car to aid in navigation. In other cases, the LIDAR system can be employed as part of an advanced driver-assistance system (ADAS) or as part of a safety system that, e.g., can provide 3D image data to any number of different systems, e.g., adaptive cruise control, automatic parking, driver drowsiness monitoring, blind spot monitoring, collision avoidance systems, etc. When a vehicle control unit 217 is communicably coupled to light ranging device 210, alerts can be provided to a driver or tracking of a proximity of an object can be tracked.

The LIDAR system 200 shown in FIG. 2 includes the light ranging device 210. The light ranging device 210 includes a ranging system controller 250, a light transmission (Tx) module 240 and a light sensing (Rx) module 230. Ranging data can be generated by the light ranging device by transmitting one or more light pulses 249 from the light transmission module 240 to objects in a field of view surrounding the light ranging device. Reflected portions 239 of the transmitted light are then detected by the light sensing module 230 after some delay time. Based on the delay time, the distance to the reflecting surface can be determined. Other ranging methods can be employed as well, e.g. continuous wave, Doppler, and the like.

The Tx module 240 includes an emitter array 242, which can be a one-dimensional or two-dimensional array of emitters, and a Tx optical system 244, which when taken together can form an array of micro-optic emitter channels. Emitter array 242 or the individual emitters are examples of laser sources. The Tx module 240 further includes processor 245 and memory 246. In some embodiments, a pulse coding technique can be used, e.g., Barker codes and the like. In such cases, memory 246 can store pulse-codes that indicate when light should be transmitted. In one embodiment the pulse-codes are stored as a sequence of integers stored in memory.

The Rx module 230 can include sensor array 236, which can be, e.g., a one-dimensional or two-dimensional array of photosensors. Each photosensor or photosensitive element (also referred to as a sensor) can include a collection of photodetectors, e.g., APDs or the like, or a sensor can be a single photon detector (e.g., an SPAD). Like the Tx module 240, Rx module 230 includes an Rx optical system 237. The Rx optical system 237 and sensor array 236 taken together can form an array of micro-optic receiver channels. Each micro-optic receiver channel measures light that corresponds to an image pixel in a distinct field of view of the surrounding volume. Each sensor (e.g., a collection of SPADs) of sensor array 236 can correspond to a particular emitter of emitter array 242, e.g., as a result of a geometrical configuration of light sensing module 230 and light transmission module 240.

In one embodiment, the sensor array 236 of the Rx module 230 is fabricated as part of a monolithic device on a single substrate (using, e.g., CMOS technology) that includes both an array of photon detectors and an ASIC 231 for signal processing the raw histograms from the individual photon detectors (or groups of detectors) in the array. As an example of signal processing, for each photon detector or grouping of photon detectors, memory 234 (e.g., SRAM) of the ASIC 231 can accumulate counts of detected photons over successive time bins, and these time bins taken together can be used to recreate a time series of the reflected light pulse (i.e., a count of photons vs. time). This time-series of aggregated photon counts is referred to herein as an intensity histogram (or just histogram). The ASIC 231 can implement matched filters and peak detection processing to identify return signals in time. In addition, the ASIC 231 can accomplish certain signal processing techniques (e.g., by processor 238), such as multi-profile matched filtering to help recover a photon time series that is less susceptible to pulse shape distortion that can occur due to SPAD saturation and quenching. In some embodiments, all or parts of such filtering can be performed by processor 258, which may be embodied in an FPGA.

In some embodiments, the Rx optical system 237 can also be part of the same monolithic structure as the ASIC, with separate substrate layers for each receiver channel layer. For example, an aperture layer, collimating lens layer, an optical filter layer and a photo-detector layer can be stacked and bonded at the wafer level before dicing. The aperture layer can be formed by laying a non-transparent substrate on top of a transparent substrate or by coating a transparent substrate with an opaque film. In yet other embodiments, one or more components of the Rx module 230 may be external to the monolithic structure. For example, the aperture layer may be implemented as a separate metal sheet with pinholes.

In some embodiments, the photon time series output from the ASIC are sent to the ranging system controller 250 for further processing, e.g., the data can be encoded by one or more encoders of the ranging system controller 250 and then sent as data packets to user interface 215. The ranging system controller 250 can be realized in multiple ways including, e.g., by using a programmable logic device such an FPGA, as an ASIC or part of an ASIC, using a processor 258 with memory 254, and some combination of the above. The ranging system controller 250 can cooperate with a stationary base controller or operate independently of the base controller (via pre-programed instructions) to control the light sensing module 230 by sending commands that include start and stop light detection and adjust photo-detector parameters. Similarly, the ranging system controller 250 can control the light transmission module 240 by sending commands, or relaying commands from the base controller, that include start and stop light emission controls and controls that can adjust other light-emitter parameters (e.g., pulse codes). In some embodiments, the ranging system controller 250 has one or more wired interfaces or connectors for exchanging data with the light sensing module 230 and with the light transmission module 240. In other embodiments, the ranging system controller 250 communicates with the light sensing module 230 and light transmission module 240 over a wireless interconnect such as an optical communication link.

The electric motor 260 may be an optional component needed when system components, e.g., the Tx module 240 and or Rx module 230, need to rotate. The system controller 250 controls the electric motor 260 and can start rotation, stop rotation and vary the rotation speed.

II. Detection of Reflected Pulses

The photosensors can be arranged in a variety of ways for detecting reflected pulses. For example, the photosensors can be arranged in an array, and each photosensor can include an array of photodetectors (e.g., SPADs). Different patterns of pulses (pulse trains) transmitted during a detection interval are also described below.

A. Time-of-Flight Measurements and Detectors

Figure 3:
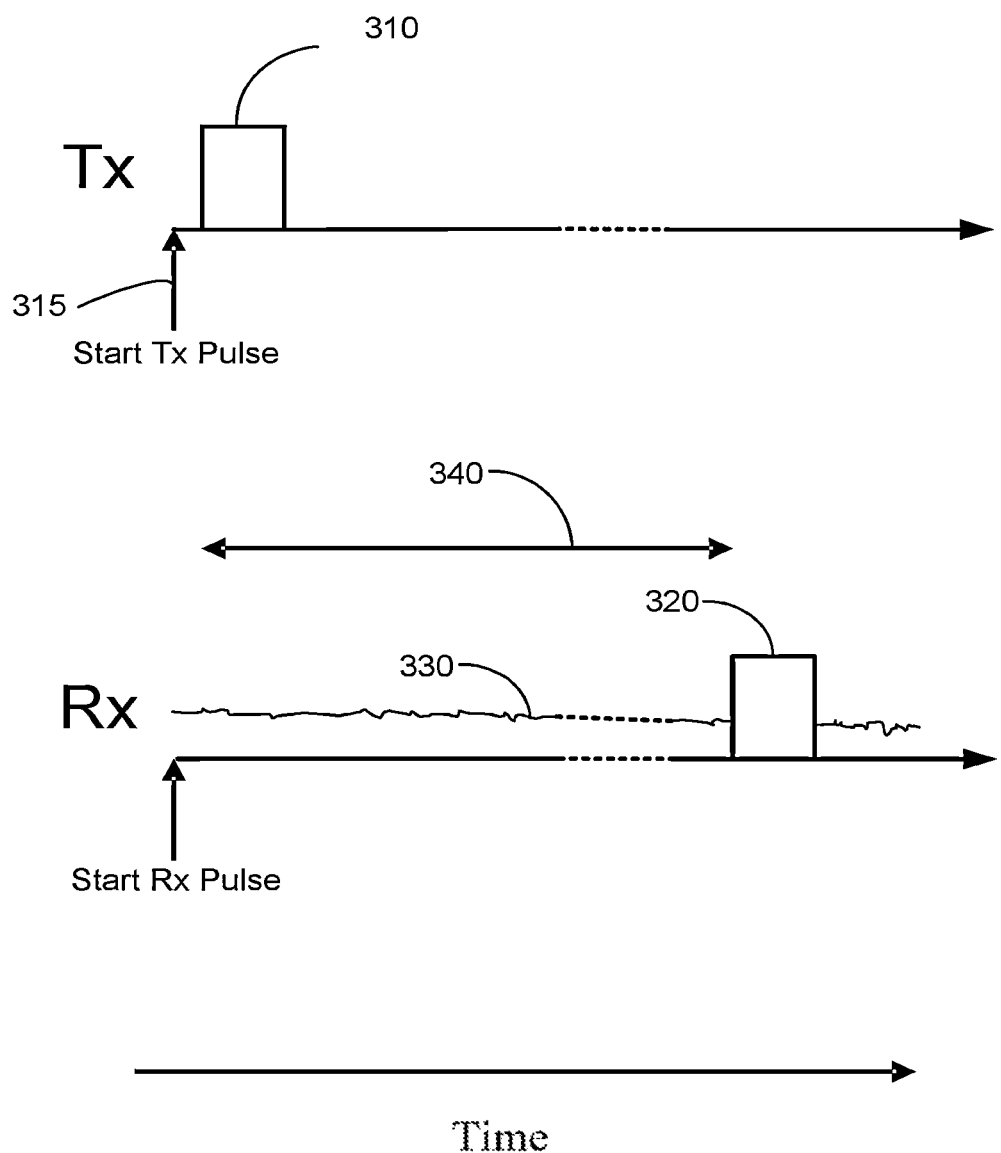
FIG. 3 illustrates the operation of a typical LIDAR system that may be improved by embodiments.

FIG. 3 illustrates the operation of a typical LIDAR system that may be improved by some embodiments. A laser generates a light pulse 310 of short duration. The horizontal axis represents time and the vertical axis represents power. An example laser pulse duration, characterized by the full-width half maximum (FWHM), is a few nanoseconds, with the peak power of a single emitter being around a few watts. Embodiments that use side emitter lasers or fiber lasers may have much higher peak powers, while embodiments with small diameter VCSELs could have peak powers in the tens of milliwatts to hundreds of milliwatts.

A start time 315 for the transmission of the pulse does not need to coincide with the leading edge of the pulse. As shown, the leading edge of light pulse 310 may be after the start time 315. One may want the leading edge to differ in situations where different patterns of pulses are transmitted at different times, e.g., for coded pulses.

An optical receiver system can start detecting received light at the same time as the laser is started, i.e., at the start time. In other embodiments, the optical receiver system can start at a later time, which is at a known time after the start time for the pulse. The optical receiver system detects background light 330 initially and after some time detects the laser pulse reflection 320. The optical receiver system can compare the detected light intensity against a threshold to identify the laser pulse reflection 320. The threshold can distinguish the background light 330 from light corresponding to the laser pulse reflection 320.

The time-of-flight 340 is the time difference between the pulse being sent and the pulse being received. The time difference can be measured by subtracting the transmission time of the pulse (e.g., as measured relative to the start time) from a received time of the laser pulse reflection 320 (e.g., also measured relative to the start time). The distance to the target can be determined as half the product of the time-of-flight and the speed of light. Pulses from the laser device reflect from objects in the scene at different times and the pixel array detects the pulses of radiation reflection.

B. Detection of Objects Using Array Lasers and Array of Photosensors

Figure 4:
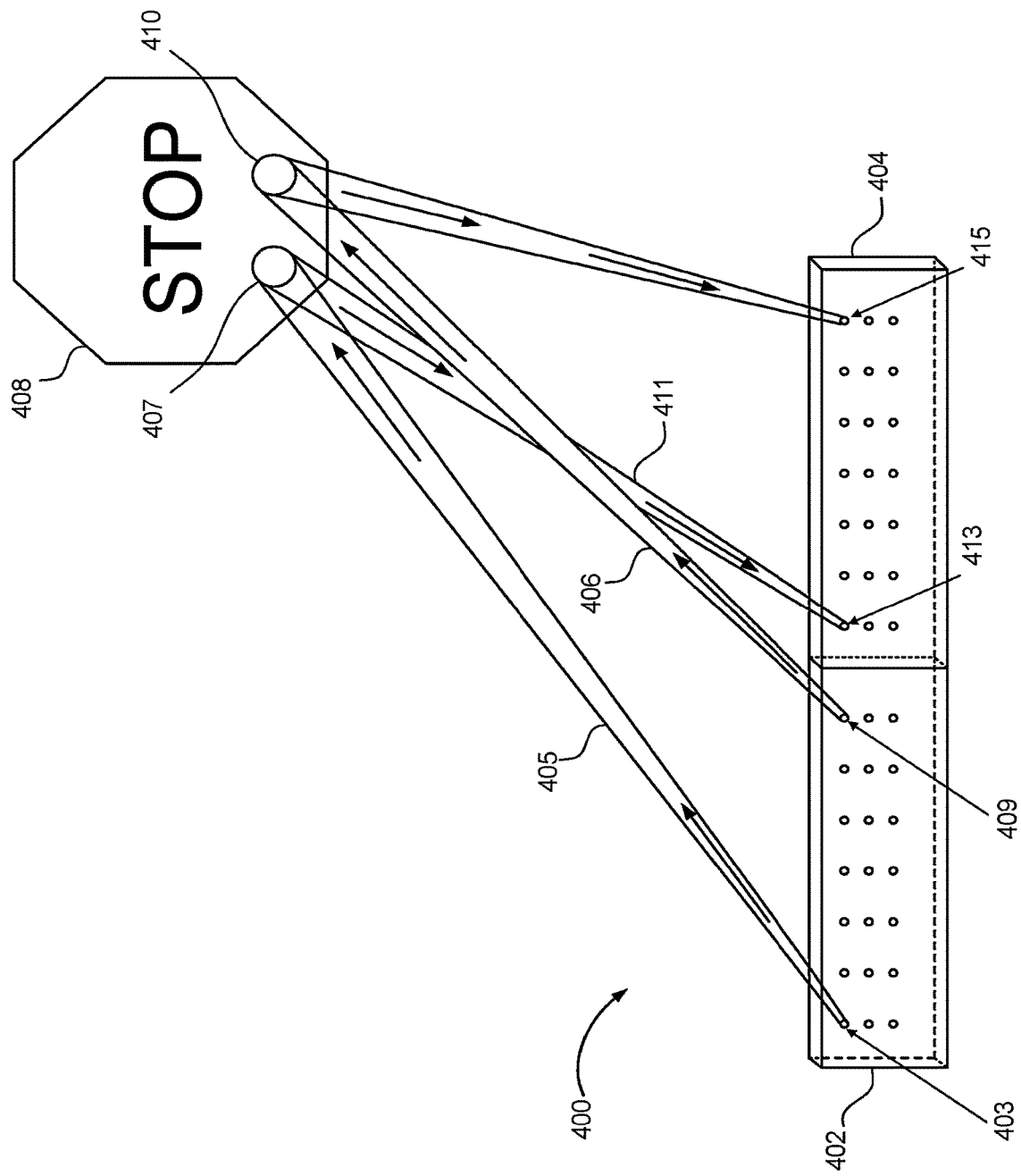
FIG. 4 shows an illustrative example of the light transmission and detection process for a light ranging system according to some embodiments.

FIG. 4 shows an illustrative example of the light transmission and detection process for a light ranging system, according to some embodiments. FIG. 4 shows a light ranging system (e.g., solid state or and/or scanning) collecting three-dimensional distance data of a volume or scene that surrounds the system. FIG. 4 is an idealized drawing to highlight relationships between emitters and sensors, and thus other components are not shown.

Light ranging system 400 includes a light emitter array 402 and a light sensor array 404. The light emitter array 402 includes an array of light emitters, e.g., an array of VCSELs and the like, such as emitter 403 and emitter 409. Light sensor array 404 includes an array of photosensors, e.g., sensors 413 and 415. The photosensors can be pixelated light sensors that employ, for each pixel, a set of discrete photodetectors such as single photon avalanche diodes (SPADs) and the like. However, various embodiments can deploy any type of photon sensors.

Each emitter can be slightly offset from its neighbor and can be configured to transmit light pulses into a different field of view from its neighboring emitters, thereby illuminating a respective field of view associated with only that emitter. For example, emitter 403 emits an illuminating beam 405 (formed from one or more light pulses) into the circular field of view 407 (the size of which is exaggerated for the sake of clarity). Likewise, emitter 409 emits an illuminating beam 406 (also called an emitter channel) into the circular field of view 410. While not shown in FIG. 4 to avoid complication, each emitter emits a corresponding illuminating beam into its corresponding field of view resulting in a 2D array of fields of view being illuminated (21 distinct fields of view in this example).

Each field of view that is illuminated by an emitter can be thought of as a pixel or spot in the corresponding 3D image that is produced from the ranging data. Each emitter channel can be distinct to each emitter and be non-overlapping with other emitter channels, i.e., there is a one-to-one mapping between the set of emitters and the set of non-overlapping fields or view. Thus, in the example of FIG. 4, the system can sample 21 distinct points in the 3D space. A denser sampling of points can be achieved by having a denser array of emitters or by scanning angular position of the emitter beams over time such that one emitter can sample several points in space. As described above, scanning can be accomplished by rotating the entire emitter/sensor assembly.

Each sensor can be slightly offset from its neighbor and, like the emitters described above, each sensor can see a different field of view of the scene in front of the sensor. Furthermore, each sensor's field of view substantially coincides with, e.g., overlaps with and is the same size as a respective emitter channel's field of view.

In FIG. 4, the distance between corresponding emitter-sensor channels is exaggerated relative to the distance to objects in the field of view. In practice, the distance to the objects in the field of few is much greater than the distance between corresponding emitter-sensor channels and thus the path of light from the emitter to the object is approximately parallel to the path of the reflected light back from the object to the sensor (i.e., it is almost "back reflected"). Accordingly, there is a range of distances in front of the system 400 over which the fields of view of individual sensors and emitters are overlapped.

Because the fields of view of the emitters are overlapped with the fields of view of their respective sensors, each sensor channel ideally can detect the reflected illumination beam that originates from its respective emitter channel with ideally no cross-talk, i.e., no reflected light from other illuminating beams is detected. Thus, each photosensor can correspond to a respective light source. For example, emitter 403 emits an illuminating beam 405 into the circular field of view 407 and some of the illuminating beam reflects from the object 408. Ideally, a reflected beam 411 is detected by sensor 413 only. Thus, emitter 403 and sensor 413 share the same field of view, e.g., field of view 407, and form an emitter-sensor pair. Likewise, emitter 409 and sensor 415 form an emitter-sensor pair, sharing field of view 410. While the emitter-sensor pairs are shown in FIG. 4 as being in the same relative locations in their respective array, any emitter can be paired with any sensor depending on the design of the optics used in the system.

During a ranging measurement, the reflected light from the different fields of view distributed around the volume surrounding the LIDAR system is collected by the various sensors and processed, resulting in range information for any objects in each respective field of view. As described above, a time-of-flight technique can be used in which the light emitters emit precisely timed pulses, and the reflections of the pulses are detected by the respective sensors after some elapsed time. The elapsed time between emission and detection and the known speed of light is then used to compute the distance to the reflecting surface. In some embodiments, additional information can be obtained by the sensor to determine other properties of the reflecting surface in addition to the range. For example, the Doppler shift of a pulse can be measured by the sensor and used to compute the relative velocity between the sensor and the reflecting surface. The pulse strength can be used to estimate the target reflectivity, and the pulse shape can be used to determine if the target is a hard or diffuse material.

In some embodiments, the LIDAR system can be composed of a relatively large 2D array of emitter and sensor channels and operate as a solid state LIDAR, i.e., it can obtain frames of range data without the need to scan the orientation of the emitters and/or sensors. In other embodiments, the emitters and sensors can be scanned, e.g., rotated about an axis, to ensure that the fields of view of the sets of emitters and sensors sample a full 360 degree region (or some useful fraction of the 360 degree region) of the surrounding volume. The range data collected from the scanning system, e.g., over some predefined time period, can then be post-processed into one or more frames of data that can then be further processed into one or more depth images or 3D point clouds. The depth images and/or 3D point clouds can be further processed into map tiles for use in 3D mapping and navigation applications.

C. Multiple Photodetectors in Each Photosensor

Figure 5:
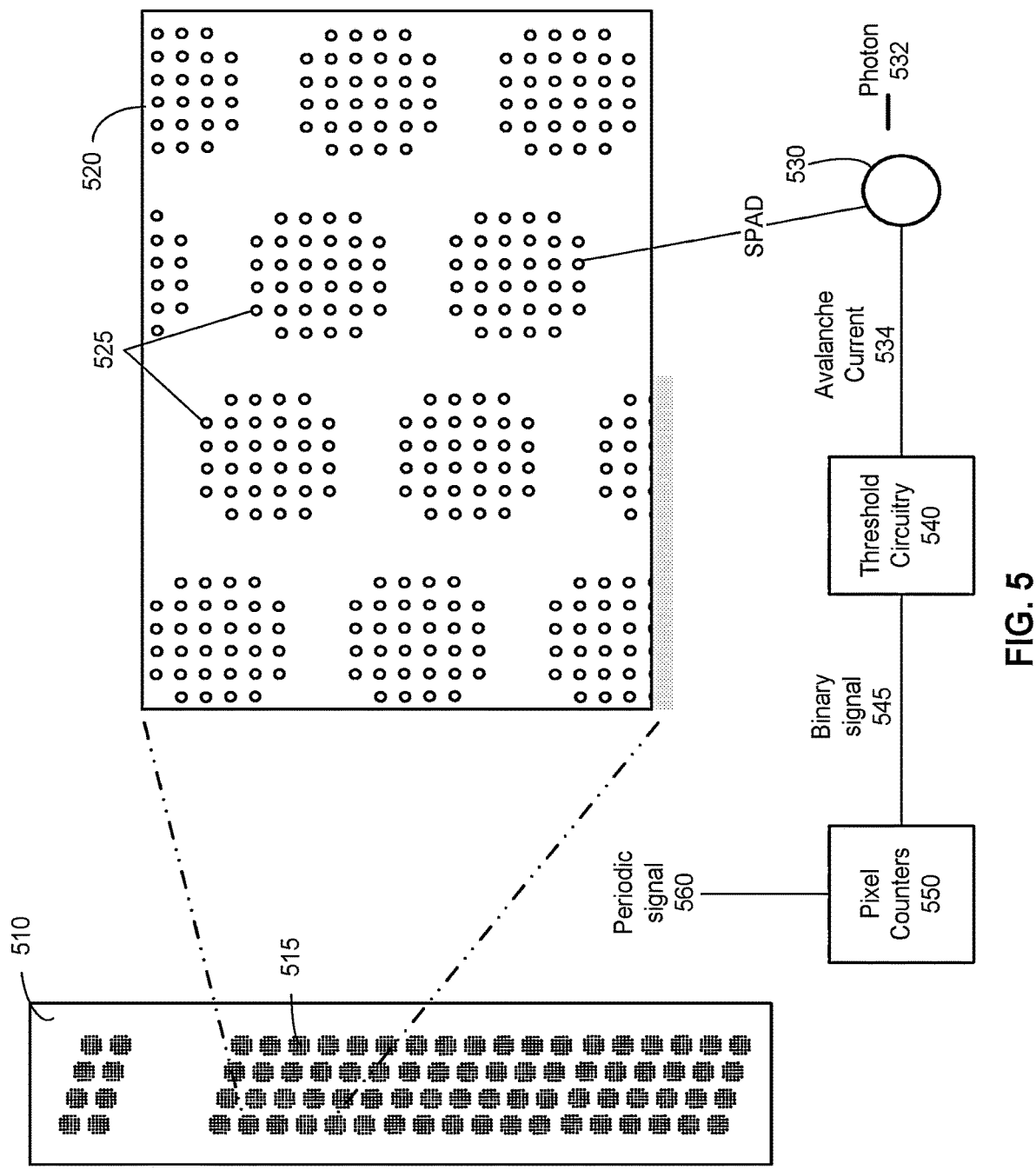
FIG. 5 shows various stages of a sensor array and associated electronics according to embodiments of the present invention.

FIG. 5 shows various stages of a sensor array and associated electronics according to embodiments of the present invention. Array 510 shows photosensors 515 that each correspond to a different pixel. Array 510 can be a staggered array. In this specific example, array 510 is 18×4 photosensors. Array 510 can be used to achieve a high resolution (e.g. 72×1024) as the implementation is amenable to sweeping.

Array 520 shows a magnified view of a portion of array 510. As can be seen, each photosensor 515 is composed of a plurality of photodetectors 525. Signals from the photodetectors of a pixel collectively contribute to a measurement for that pixel.

In some embodiments, each pixel has a multitude of single-photon avalanche diode (SPAD) units that increase the dynamic range of the pixel itself. Each SPAD can have an analog front end circuit for biasing, quenching, and recharging. SPADs are normally biased with a biased voltage above the breakdown voltage. A suitable circuit senses the leading edge of the avalanche current, generates a standard output pulse synchronous with the avalanche build-up, quenches the avalanche by lowering the bias down below the breakdown voltage, and restore the photodiode to the operative level.

The SPADs may be positioned so as to maximize the fill factor in their local area, or a microlens array may be used, which allows for high optical fill factors at the pixel level. Accordingly, an imager pixel can includes an array of SPADs to increase the efficiency of the pixel detector. A diffuser may be used to spreads rays passed through an aperture and collimated by a microlens. The can diffuser serves to spread the collimated rays in a way that all the SPADs belonging to the same pixel receive some radiation.

FIG. 5 further shows a particular photodetector 530 (e.g., a SPAD) that detects a photon 532. In response to the detection, photodetector 530 produces an avalanche current 534 of charge carriers (electrons or holes). Threshold circuitry 540 conditions the avalanche current 534 by comparing it to a threshold. When a photon is detected and photodetector 530 is functioning properly, the avalanche current 534 rises above the comparator threshold and threshold circuitry 540 produces a temporally accurate binary signal 545 indicating the accurate time of the SPAD current avalanche, which is in turn an accurate measurement of the photon arrival. The correlation of the current avalanche to the photon arrival can occur with a resolution of nanoseconds, thereby providing high timing resolution. The rising edge of binary signal 545 can be latched by pixel counters 550.

Binary signal 545, avalanche current 534, and pixel counters 550 are examples of data values that can be provided by a photosensor composed of one or more SPADs. The data values can determined from respective signals from each of the plurality of photodetectors. Each of the respective signals can be compared to a threshold to determine whether a corresponding photodetector triggered. Avalanche current 534 is an example of an analog signal, and thus the respective signals can be analog signals.

Pixel counters 550 can use binary signal 545 to count the number of photodetectors for a given pixel that have been triggered by one or more photons during a particular time bin (e.g., a time window of 1, 2, 3, etc. ns) as controlled by periodic signal 560. Pixel counters 550 can store counters for each of a plurality of time bins for a given measurement. The value of the counter for each time bind can start at zero and be incremented based on binary signal 545 indicating a detection of a photon. The counter can increment when any photodetector of the pixel provide such a signal.

Periodic signal 560 can be produced by a phase-locked loop (PLL) or delay-locked loop (DLL) or any other method of producing a clock signal. The coordination of periodic signal 560 and pixel counter 550 can act as a time-to-digital converter (TDC), which is a device for recognizing events and providing a digital representation of the time they occurred. For example, a TDC can output the time of arrival for each detected photon or optical pulse. The measure time can be an elapsed time between two events (e.g., start time and detected photon or optical pulse) rather than an absolute time. Periodic signal 560 can be a relatively fast clock that switches between a bank of memory comprising pixel counter 550. Each register in memory can correspond to one histogram bin, and the clock can switch between them at the sampling interval. Accordingly, a binary value indicating a triggering can be sent to the histogram circuitry when the respective signal is greater than the threshold. The histogram circuitry can aggregate binary values across the plurality of photodetectors to determine a number of photodetectors that triggered during a particular time bin.

The time bins can be measured relative to a start signal, e.g., at start time 315 of FIG. 3. Thus, the counters for time bins right after the start signal may have low values corresponding to a background signal, e.g., background light 330. A last time bin can correspond to an end of a detection time interval (also called a shot) for a given pulse train, which is further described in the next section. The number of cycles of periodic signal 560 since a start time can act as a timestamp for when a rising edge of avalanche current 534 indicates a detected photon. The timestamp corresponds to the time bin for a particular counter in pixel counters 550. Such an operation is different from a simple analog-to-digital converter (ADC) following a photodiode (e.g., as for an avalanche photodiode (APD)). Each of the counters of the time bins can correspond to a histogram, which is described in more detail below. Therefore, while the APD is a linear amplifier for the input optical signal with limited gain, the SPAD is a trigger device that provides a binary output of yes/no for a triggering event occurring in a time window.

D. Pulse Trains

Ranging may also be accomplished by using a pulse train, defined as containing one or more pulses. Within a pulse train, the number of pulses, the widths of the pulses, and the time duration between pulses (collectively referred to as a pulse pattern) can be chosen based on a number of factors, some of which includes:

1—Maximum laser duty cycle—The duty cycle is the fraction of time the laser is on. For a pulsed laser this could be determined by the FWHM as explained above and the number of pulses emitted during a given period.
2—Eye safety limits—This is determined by maximum amount of radiation a device can emit without damaging the eyes of a bystander who happens to be looking in the direction of the LIDAR system.
3—Power consumption—This is the power that the emitter consumes for illuminating the scene.

For example, the spacing between pulses in a pulse train can be on the order of single digits or 10 s of nanoseconds.

Multiple pulse trains can be emitted during the time span of one measurement. Each pulse train can correspond to a different time interval, e.g., a subsequent pulse train is not emitted until an expiration of the time limit for detecting reflected pulses of a previous pulse train.

For a given emitter or laser device, the time between the emissions of pulse trains determines the maximum detectable range. For example, if pulse train A is emitted at time $t_0=0$ ns, and pulse train B is emitted at time $t_1=1000$ ns, then one must not assign reflected pulse trains detected after $t_1$ to pulse train A, as they are much more likely to be reflections from pulse train B. Thus, the time between pulse trains and the speed of light define a maximum bound on the range of the system given in the following equation.

$$R_{max}=c \times (t_1-t_0)/2$$

The time between shots (emission and detection of pulse trains) can be on the order of 1 μs to allow enough time for the entire pulse train to travel to a distant object approximately 150 meters away and then back.

III. Histogram Signals From Photodetectors

One mode of operation of a LIDAR system is time-correlated single photon counting (TCSPC), which is based on counting single photons in a periodic signal. This technique works well for low levels of periodic radiation which is suitable in a LIDAR system. This time correlated counting may be controlled by periodic signal 560 of FIG. 5 and may use time bins, as discussed for FIG. 5.

The frequency of the periodic signal can specify a time resolution within which data values of a signal are measured. For example, one measured value can be obtained for each photosensor per cycle of the periodic signal. In some embodiments, the measurement value can be the number of photodetectors that the triggered during that cycle. The time period of the periodic signal corresponds to time bin, with each cycle being a different time bin.

Figure 6:
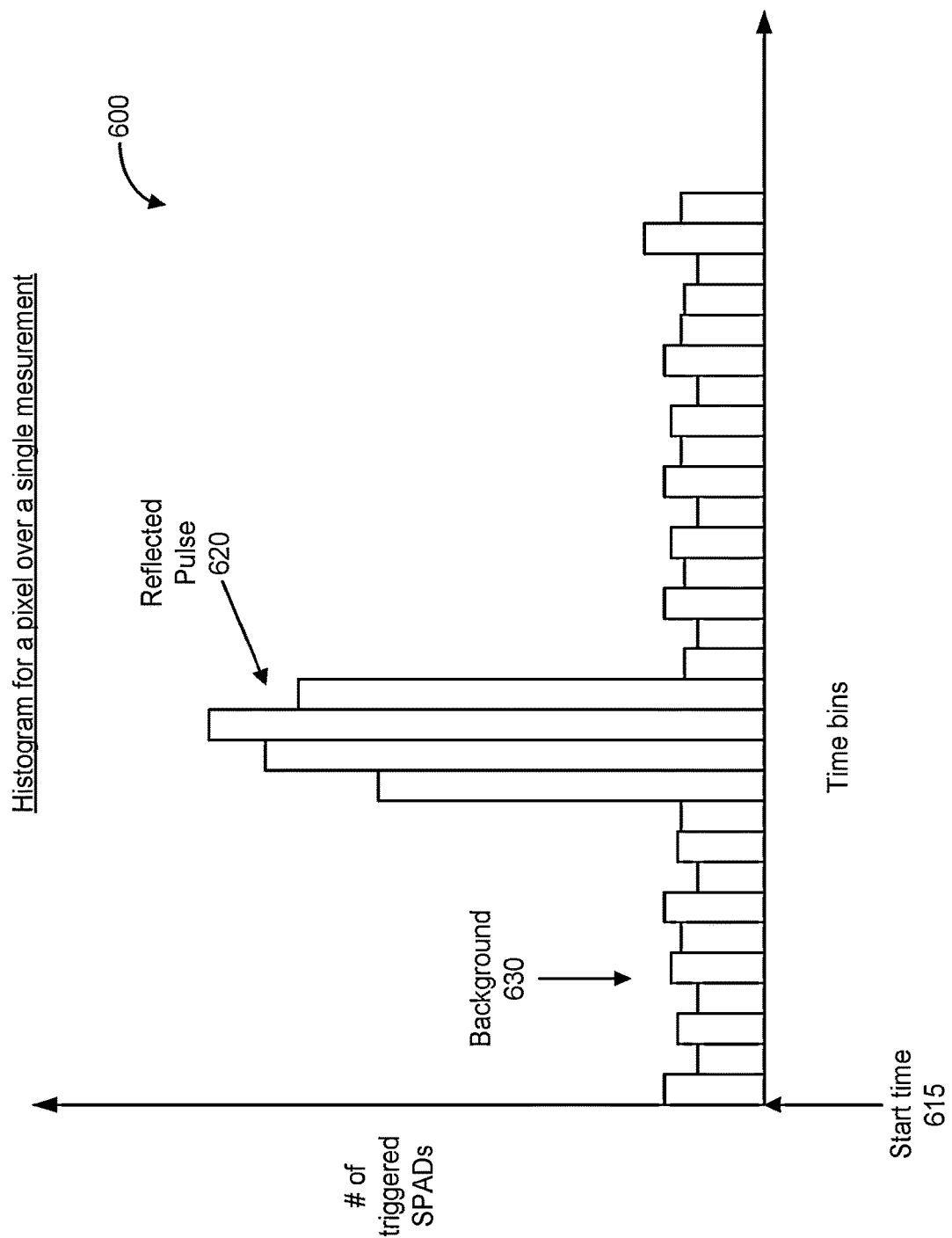
FIG. 6 shows a histogram according to embodiments of the present invention.

FIG. 6 shows a histogram 600 according to embodiments of the present invention. The horizontal axis corresponds to time bins as measured relative to start time 615. As described above, start time 615 can correspond to a start time for the pulse train. Any offsets between rising edges of the first pulse of a pulse train and the start time for either or both of a pulse train and a detection time interval can be accounted for wherein determining the received time to be used for the time-of-flight measurement. The vertical axis corresponds to the number of triggered SPADs. In certain embodiments, the vertical axis may correspond to an output of an ADC that follows an APD. For example, APDs can exhibit traditional saturation effects, such as a constant maximum signal rather than the dead-time based effects of SPADs. Some effects can occur for both SPADs and APDs, e.g., pulse smearing of very oblique surfaces may occur for both SPADs and APDs.

The counter for each of the time bins corresponds to a different bar in histogram 600. The counters at the early time bins are relatively low and correspond to background noise 630. At some point, a reflected pulse 620 is detected. The corresponding counters are much larger, and may be above a threshold that discriminate between background and a detected pulse. The reflected pulse 620 (after digitizing) is shown corresponding to four time bins, which might result from a laser pulse of a similar width, e.g., a 4 ns pulse when time bins are each 1 ns. But, as described in more detail below, the number of time bins can vary, e.g., based on properties of a particular object in an angle of incidence of the laser pulse.

The temporal location of the time bins corresponding to reflected pulse 620 can be used to determine the received time, e.g., relative to start time 615. As described in more detail below, matched filters can be used to identify a pulse pattern, thereby effectively increasing the signal-to-noise ratio, but also to more accurately determine the received time. In some embodiments, the accuracy of determining a received time can be less than the time resolution of a single time bin. For instance, for a time bin of 1 ns, that resolution would correspond to about 15 cm. However, it can be desirable to have an accuracy of only a few centimeters.

Accordingly, a detected photon can result in a particular time bin of the histogram being incremented based on its time of arrival relative to a start signal, e.g., as indicated by start time 615. The start signal can be periodic such that multiple pulse trains are sent during a measurement. Each start signal can be synchronized to a laser pulse train, with multiple start signals causing multiple pulse trains to be transmitted over multiple detection intervals. Thus, a time bin (e.g., from 200 to 201 ns after the start signal) would occur for each detection interval. The histogram can accumulate the counts, with the count of a particular time bin corresponding to a sum of the measured data values all occurring in that particular time bin across multiple shots. When the detected photons are histogrammed based on such a technique, it results in a return signal with a signal to noise ratio greater than from a single pulse train by the square root of the number of shots taken.

Figure 7:
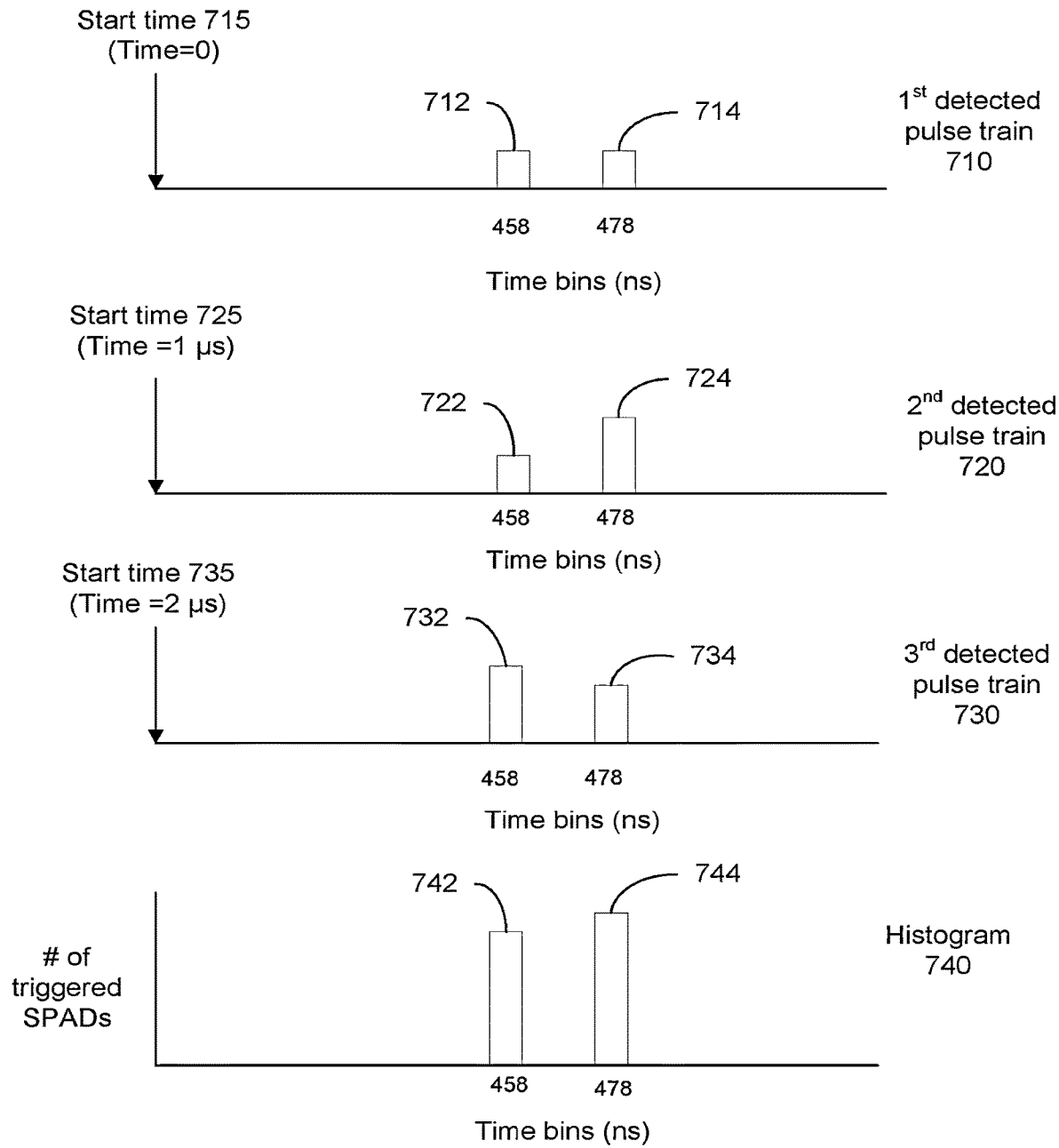
FIG. 7 shows the accumulation of a histogram over multiple pulse trains for a selected pixel according to embodiments of the present invention.

FIG. 7 shows the accumulation of a histogram over multiple pulse trains for a selected pixel according to embodiments of the present invention. FIG. 7 shows three detected pulse trains 710, 720 and 730. Each detected pulse train corresponds to a transmitted pulse train that has a same pattern of two pulses separated by a same amount of time. Thus, each detected pulse train has a same pulse pattern, as shown by two time bins having an appreciable value. Counters for other time bins are not shown for ease of illustration, although the other time bins may have relatively low non-zero values.

In the first detected pulse train 710, the counters for time bins 712 and 714 are the same. This can result from a same number of photodetectors detecting a photon during the two time bins. Or, in other embodiments, approximately the same number of photons being detected during the two time bins. In other embodiments, more than one consecutive time bin can have a consecutive non-zero value; but for ease of illustration, individual nonzero time bins have been shown.

Time bins 712 and 714 respectively occur 458 ns and 478 ns after start time 715. The displayed counters for the other detected pulse trains occur at the same time bins relative to their respective start times. In this example, start time 715 is identified as occurring at time 0, but the actual time is arbitrary. The first detection interval for the first detected pulse train can be 1 μs. Thus, the number of time bins measured from start time 715 can be 1,000. After, this first detection interval ends, a new pulse train can be transmitted and detected. The start and end of the different time bins can be controlled by a clock signal, which can be part circuitry that acts as a time-to-digital converter (TDC), e.g., as is described in FIG. 5.

For the second detected pulse train 720, the start time 725 is at 1 μs, e.g., at which the second pulse train can be emitted. Such a separate detection interval can occur so that any pulses transmitted at the beginning of the first detection interval would have already been detected, and thus not cause confusion for pulses detected in the second time interval. For example, if there is not extra time between shots, then the circuitry could confuse a retroreflective stop sign at 200 m with a much less reflective object at 50 m (assuming a shot period of about 1 us). The two detection time intervals for pulse trains 710 and 720 can be the same length and have the same relationship to the respective start time. Time bins 722 and 724 occur at the same relative times of 458 ns and 478 ns as time bin 712 and 714. Thus, when the accumulation step occurs, the corresponding counters can be added. For instance, the counter values at time bin 712 and 722 can be added together.

For the third detected pulse train 730, the start time 735 is at 2 μs, e.g., in which the third pulse train can be emitted. Time bin 732 and 734 also occur at 458 ns and 478 ns relative to its respective start time 735. The counters at different time bins may have different values even though the emitted pulses have a same power, e.g., due to the stochastic nature of the scattering process of light pulses off of objects.

Histogram 740 shows an accumulation of the counters from three detected pulse trains at time bins 742 and 744, which also correspond to 458 ns and 478 ns. Histogram 740 could have less number of time bins that are measured during the respective detection intervals, e.g., as a result of dropping time bins in the beginning or the end, or that have values less than a threshold. In some implementations, about 10-30 time bins can have appreciable values, depending on the pattern for a pulse train.

As examples, the number of pulse trains emitted during a measurement to create a single histogram can be around 1-40 (e.g., 24), but can also be much higher, e.g., 50, 100, or 500. Once a measurement is completed, the counters for the histogram can be reset, and a set of pulse trains can be emitted to perform a new measurement. In various embodiments and depending on the number of detection intervals in the respective duration, measurements can be performed every 25, 50, 100, or 500 μs. In some embodiments, measurement intervals can overlap, e.g., so a given histogram corresponds to a particular sliding window of pulse trains. In such an example, memory can exist for storing multiple histograms, each corresponding to a different time window. Any weights applied to the detected pulses can be the same for each histogram, or such weights could be independently controlled.

IV. Histogram Data Path

Figure 8:
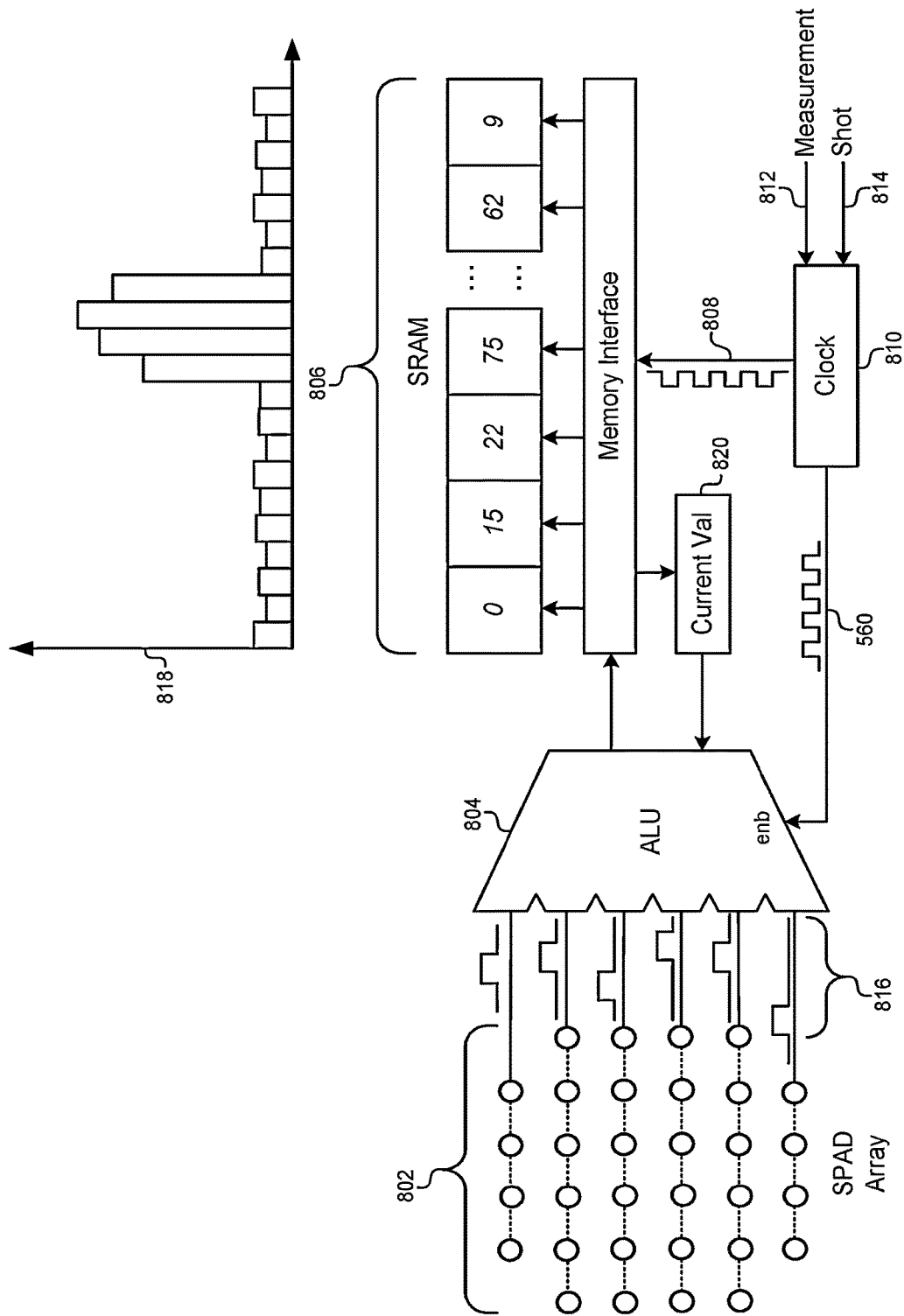
FIG. 8 shows a circuit for receiving photons and generating a set of signals that are stored in a memory representing histogram, according to some embodiments.

FIG. 8 shows a circuit for receiving photons and generating a set of signals that are stored in a memory representing histogram, according to some embodiments. As described above in relation to FIG. 5, an array of photosensors may be used to receive reflected pulses and background photons from ambient light in an optical measurement system. A single photosensor 802 may include a plurality of photodetectors. Each photodetector may be implemented by a SPAD or other light-sensitive sensor, and the photodetectors may be arranged in a grid pattern for the photosensor 802 as illustrated in FIG. 8. A filter may be used for each of the photosensors to block light outside of a range centered around the light source of the LIDAR system from being received by the photosensor. However, even with this filter, some ambient light at or near the emitted wavelength of the light source may pass through the filter. This may result in photons from ambient light as well as photons emitted from the LIDAR light source being be received by the photosensor.

Each photodetector in the photosensor 802 may include analog front-end circuitry for generating an output signal indicating when photons are received by the photodetectors. For example, referring back to FIG. 5, the avalanche current 534 from a SPAD may trigger the threshold circuitry 540 to generate the output binary signal 545. Turning back to FIG. 8, each photodetector in the photosensor 802 may generate its own signal corresponding to received photons. Thus, the photosensor 802 may generate a set of signals 816 corresponding to the number of photodetectors in the photosensor 802. The photosensor 802 may also be referred to as a "pixel" or a "pixel sensor," as it may correspond to a single pixel of information when displayed or analyzed in later stages of the optical measurement system. When signals are generated in response to received photons (e.g., transitioning from a logical "0" to a logical "1"), this may be referred to as a "positive" signal.

An arithmetic logic unit (ALU) 804 may be used to implement the functionality of the pixel counter 550 from FIG. 5. Specifically, the ALU 804 may receive the set of signals 816 from the individual photodetectors of the photosensor 802 and aggregate a number of these signals that each indicate the detection of a photon. The ALU 804 may include a combinational digital electronic circuit that performs arithmetic and/or other bitwise operations on the set of signals 816. For example, the ALU 804 may receive each of the set of signals 816 as a binary signal (i.e., a "0" or a "1") as an input or operand to the ALU 804. By aggregating or adding inputs together, the ALU 804 may count a number positive signals in the set of signals 816 that indicate that photons have been received within a particular time bin. For example, by adding each of the signals indicating a "1" signal level, the output of the ALU 804 may indicate the number of signals in the set of signals 816 that are associated with photodetectors that in turn received photons during the time bin.

The ALU 804 is designed specifically to receive at least a number of inputs that correspond to the number of photodetectors in the photosensor 802. In the example of FIG. 8, the ALU 804 may be configured to receive 32 parallel inputs that are a single bit wide. Internally, the ALU 804 may be implemented with digital logic gates to form a ripple-carry adder, a carry-lookahead adder, a carry-save adder, and/or any other type of adder that can aggregate a relatively large number of inputs with low propagation time. The output of the ALU 804 may be referred to as a "total signal count" and may be represented as an n-bit binary number output from the ALU 804 or from a stage of the ALU 804.

As described above, the output of the ALU 804 may characterize the total number of photons received by the photosensor 802 during a particular time bin. Each time the ALU 804 completes an aggregation operation, the total signal count can be added to a corresponding memory location in a memory 806 representing histogram 818. In some embodiments, the memory 806 may be implemented using an SRAM. Thus, over the course of multiple shots (with each shot including a pulse train) the total signal count from the ALU 804 can be aggregated with an existing value in a corresponding memory location in the memory 806. A single measurement may be comprised of a plurality of shots that populate the memory 806 to generate the histogram 818 of values in the time bins that can be used to detect reflected signals, background noise, peaks, and/or other signals of interest.

The ALU 804 may also perform a second aggregation operation that adds the total signal count to an existing value in a memory location of the memory 806. Recall from FIG. 7 that with each shot, a new total signal count may be added to an existing value in the corresponding time bin of the memory 806. In this manner, the histogram 818 can be gradually constructed in the memory 806 over a number of shots. When the total signal count is generated by the ALU 814, a current value 820 of a corresponding memory location for that time bin can be retrieved from the memory 806. The current value 820 can be provided as an operand to the ALU 804, which can be combined with the total signal count from the set of signals 816. In some embodiments, the ALU 804 can be composed of a first stage and a second stage, where the first stage calculates the total signal count from the photosensor 802, and the second stage combines the total signal count with the current value 820 from that time bin's memory location in the memory 806. In some embodiments, the aggregation of the set of signals 816 and the aggregation of total signal count and the current value 820 may be carried out as a single operation. Thus, even though these two operations may functionally be described as separate "aggregations," they may in fact be performed together using a combination of parallel and sequential circuitry in the ALU 804.

As described above in relation to FIG. 5, the ALU 804 may receive a periodic signal 560 that triggers the aggregation operation(s). The periodic signal 560 may be generated using any of the techniques described above. The periodic signal 560 may define the length of each time bin. In some embodiments, the periodic signal 560 and the corresponding time bins can be measured relative to a start signal as illustrated in FIG. 3. Each cycle of the periodic signal 560 can cause aggregation operations to execute in the ALU 804 and may cause the memory address of the memory 860 increment to the next time bin. For example, a rising edge of the periodic signal 560 may cause the ALU 804 to produce a result that aggregates the total signal count and the current value 820 together. A corresponding periodic signal 808 may also be sent to a memory interface circuit that increments an address to a memory location of a current time bin such that each cycle also moves to the next time bin in the memory 806.

A clock circuit 810 may be used to generate the periodic signal 560 based on inputs that define shots and measurements for the optical measurement system. For example, a shot input 814 may correspond to the start signal illustrated in FIG. 3. The shot input 814 may reset the address for the memory 806 to a beginning memory location corresponding with a first time bin of the histogram 818. The shot input 814 may also cause the clock circuit 810 to begin generating the periodic signal 560 for the ALU 804 and/or the periodic signal 808 that increments the address for the memory 806. Additionally, the clock circuit 810 may receive a measurement input 812 that defines the beginning/end of a measurement. A measurement may be comprised of a plurality of shots that incrementally build the histogram 818. The measurement signal 812 may be used to reset the values in the memory 806 such that the histogram can start over for each new measurement.

The memory 806 may include a plurality of registers that accumulate photon counts from photodetectors. By accumulating photon counts in respective registers corresponding to time bins, the registers in the memory 806 can store photon counts based on arrival times of the photons. For example, photons arriving in a first time bin can be stored in a first register in the memory 806, photons arriving in a second time bin can be stored in a second register in the memory 806, and so forth. Each "shot" may include one traversal through each of the registers in the memory 806 corresponding to a time bin for that photosensor. The shot signal 814 may be referred to as an "enable" signal for the plurality of registers in the memory 806 in that the shot signal 814 enables the registers in the memory 806 to store results from the ALU 804 during the current shot.

The periodic signal 560 can be generated such that it is configured to capture the set of signals 816 as they are provided asynchronously from the photosensor 802. For example, the threshold circuitry 540 may be configured to hold the output signal high for a predetermined time interval. The periodic signal 560 may be timed such that it has a period that is less than or equal to the hold time for the threshold circuitry 540. Alternatively, the period of the periodic signal 560 may be a percentage of the hold time for the threshold circuitry 540, such as 90%, 80%, 75%, 70%, 50%, 110%, 120%, 125%, 150%, 200%, and so forth. Some embodiments may use rising-edge detection circuitry as illustrated in FIG. 5 to convert the asynchronous signals from the photodetectors into single clock strobes that use the same clock that runs the ALU 804. This may guarantee that photons are not counted more than once. Other embodiments may alternatively oversample the asynchronous pulses from the photodetectors or use brute-force rising-edge detection.

Figure 9:
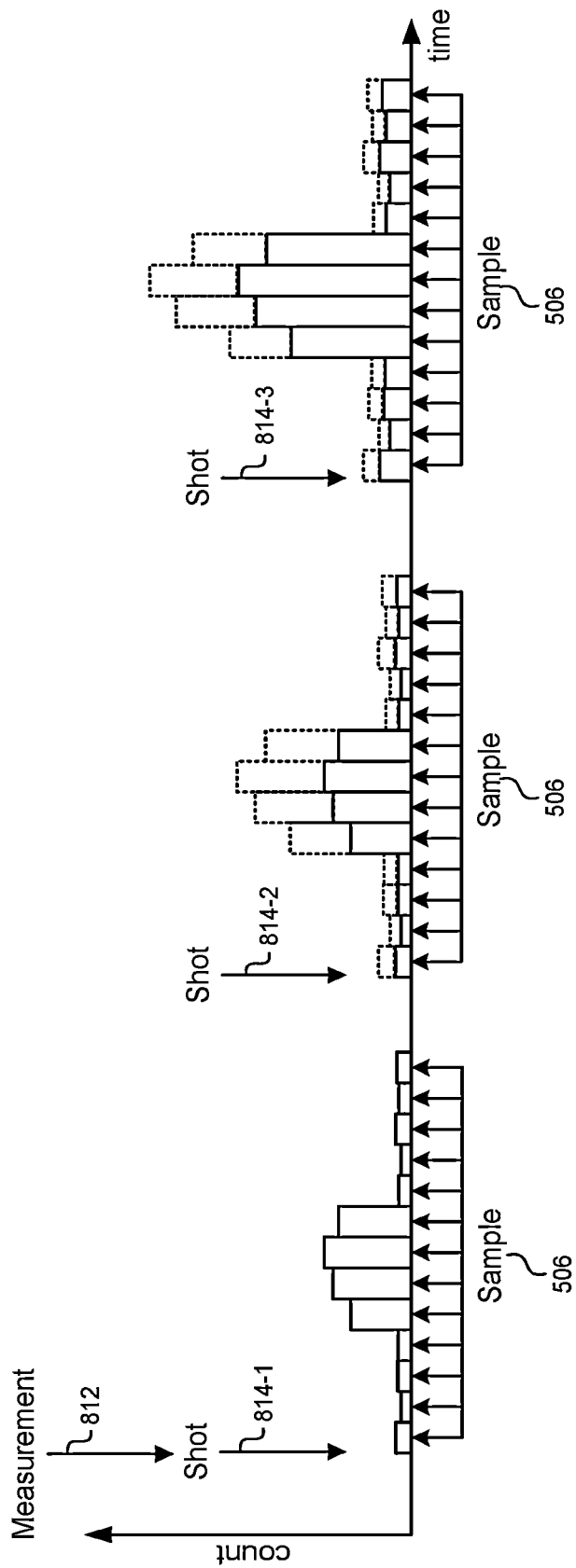
FIG. 9 shows the timing associated with different shots in a measurement, according to some embodiments.

FIG. 9 shows the timing associated with different shots in a measurement, according to some embodiments. The vertical axis represents the total number of photodetector signals measured for a single photosensor. For example, the vertical axis may represent a total photon count. The horizontal axis represents time. When a new optical measurement is started as indicated by the measurement signal 812, a first shot can begin with the receipt of the shot signal 814-1 as a start signal. The periodic signal 506 illustrates how each clocking of the ALU 804 corresponds to a single time bin and corresponding memory location in the memory 806.

With each subsequent shot, the histogram can be constructed in the memory 806 as illustrated in FIG. 9. Each time a shot input 814 is received, the addressing of the memory 806 can be reset such that new total signal count can be added to the existing signal counts. In the example of FIG. 9, there is a non-zero time interval of separation between each shot. For example, the shot started by the shot signal 814-1 ends, and a non-zero time interval elapses before the shot defined by the shot signal 814-2 begins. Alternatively, some embodiments may not have a delay between subsequent shots such that the periodic signal 506 clocks continuously throughout the measurement. Subsequent shot signals 814-2, 814-3 may then define both the end of a previous shot and the beginning of a subsequent shot.

In some embodiments, the timing of the measurement signal 812, the shot signal 814, and the periodic signal 506 that clocks the ALU 804 may all be coordinated and generated relative to each other. Thus, the clocking of the ALU may be triggered by, and dependent on, the start signal for each shot. Additionally the period of the periodic signal 506 may define the length of each time bin associated with each memory location in the histogram.

The data path illustrated in FIG. 8 is primarily configured to build the histogram 818 over a number of shots. However, the histogram may only populated during shots in some embodiments. Any photons received between shots would not be aggregated by the ALU 804 in a time bin and would not be stored in the memory 806. Additionally, after each measurement is complete and before a subsequent measurement begins, the contents of the memory 806 may be reset. Therefore, photons received before and/or after a current measurement may not be saved or readily available. Furthermore, no total count of all photons received in the histogram is readily available in the histogram data path, and no total count of all photons received during a measurement cycle is available if there are non-zero intervals between shots when the histogram is disabled. To record received photons in a continuous manner that is not reliant on the shot/measurement timing, a second parallel data path may be used in addition to the histogram data path illustrated in FIG. 8.

V. Integration Data Path

In order to record cumulative photon totals for all photodetectors in a photosensor, some embodiments may provide a parallel data path that includes an integration register. This integration data path may receive the total positive signal count for each time bin and add that value to a single integration register instead of separate time bins to form a histogram. This integration register can record photon counts before, between, and after shots. It can even record photon counts when no active measurement, or shot within a multi-shot measurement, is taking place because it can be clocked separately and independently from the histogram data path described above. It provides a readily-available total of photons for a photosensor or pixel that can be used to estimate background noise, set thresholds, and provide real-time image data.

Figure 10:
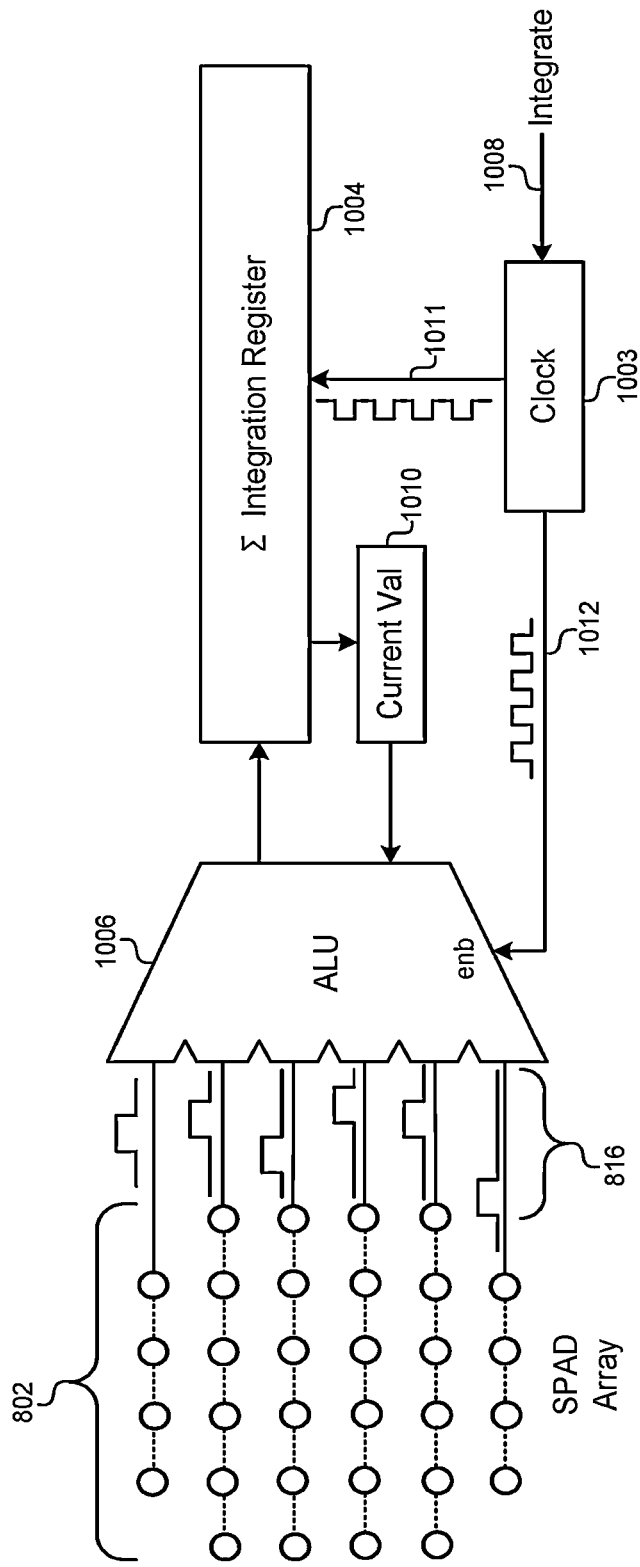
FIG. 10 shows a data path with an integration register, according to some embodiments.

FIG. 10 shows a data path with an integration register, according to some embodiments. The photosensor 802 with the plurality of photodetectors may generate the set of signals 816 as described above in relation to FIG. 8. A second ALU 1006 can aggregate the positive signals received during a time bin as described above. However, instead of storing the total signal count aggregated by the ALU 1006 in discrete time bins in the memory 806, this second data path can add the total signal count to a value stored in an integration register 1004 that represents a total number of positive signals received from the photodetectors across each of the time bins over any number of shots. For example, the integration register 1004 can provide a current value 1010 in the integration register 1004 to the ALU 1006. A first stage of the ALU 1006 can aggregate the set of signals 816 from the photosensor 802 to generate a total signal count for a current time bin. A second stage of the ALU 1006 can then add the total signal count for the current time bin to the current value 1010 representing the total photon count in the integration register 1004 and store the updated total photon count in the integration register 1004.

An integrate signal 1008 may be provided to a clock circuit 1003 to begin an integration cycle. The clock circuit 1003 can generate a periodic signal 1012 that can clock the ALU 1006. For example, the periodic signal 1012 can define time bins during which the set of signals 816 can be aggregated by the ALU 1006. The clock circuit 1003 may also generate a periodic signal 1011 that is used to latch a new value into the integration register 1004. For example, a rising clock edge on the periodic signal 1011 may cause the integration register 1004 to latch the result from the ALU 1006. The result from the ALU 1006 may be the aggregated total of the total signal counts and the current value 1010 of the integration register 1004 before latching the new result value.

The timing associated with the integration register 1004 and/or the ALU 1006 may be independent from the timing of the clock circuit 810 in the histogram data path of FIG. 8. For example, the periodic signal 1012 in the integration data path need not be phase-aligned with the periodic signal 560 in the histogram data path. These periodic signals 1012, 560 may also have different periods and/or duty cycles. Additionally, the integrate signal 1008 that defines the beginning and/or length of an integration cycle need not be aligned with or derived from the shot signal 814 or the measurement signal 812 of the histogram data path. Thus, the timing of the histogram data path and the integration data path can be completely independent from each other.

In some embodiments, the integration register 1004 can accumulate photon counts from the photosensor 802 during one or more intervals that are defined by the integrate signal 1008. In this sense, the integrate signal 1008 may also be referred to as an "enable" signal in that it enables the integration register 1004 to accumulate photon counts. In some embodiments, each enablement of the integrate signal 1008 may reset the integration register 1004 such that the accumulation of the photon counts starts over. In other embodiments, each enablement of the integrate signal 1008 may restart the integration register 1004 such that it continues accumulating photon counts where it left off. This allows the integration register 1004 to accumulate photon counts over one or more time intervals that can be defined by the integrate (i.e., enable) signal 1008.

Figure 11:
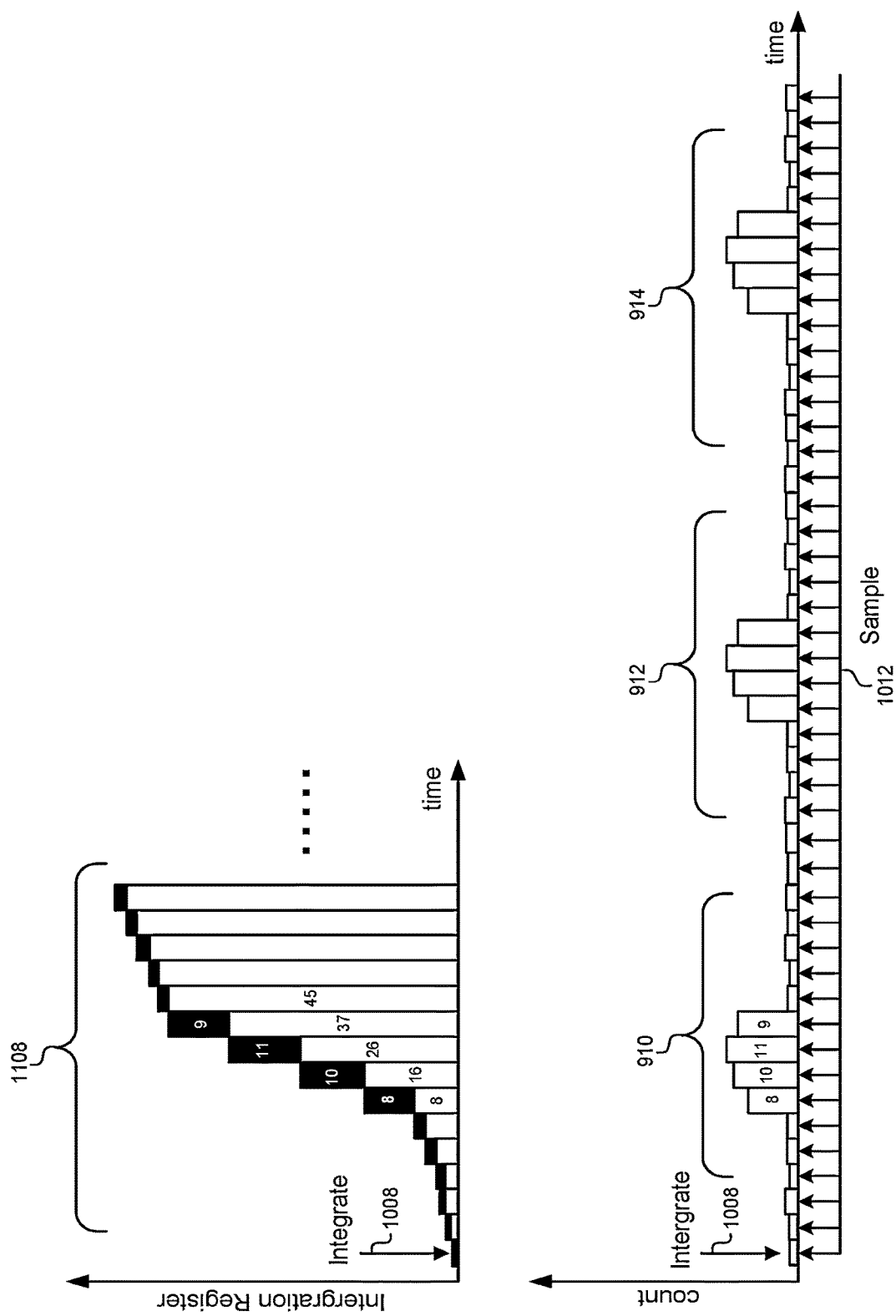
FIG. 11 shows a timing graph for the integration data path, according to some embodiments.

FIG. 11 shows a timing graph for the integration data path, according to some embodiments. The vertical axis on the bottom graph represents the total signal count for each time bin. The vertical axis the top graph represents the total value stored in the integration register. The horizontal axes of the top graph and the bottom graph represent time. When the integrate signal is received 1008, the clock circuit 1003 may begin generating the periodic signal 1012. As illustrated in the bottom graph, the periodic signal 1012 may define the time bins for each sampling of the ALU 1006. Note that the term "time bins" in the integration data path need not correspond to specific memory locations in a histogram as the time bins do in the histogram data path. Instead, the time bins of the integration data path refer to the interval between when aggregation results become available from the ALU 1006. As described above for the periodic signal 560 of the histogram data path, the frequency of the periodic signal 1012 of the integration data path may be timed relative to the hold time of the threshold circuitry 540 such that positive sensor responses to photons are not missed or over counted between aggregation operations of the ALU 1006. In some embodiments, the analog front ends for the SPADs may implement rising-edge detectors to convert photodetector signals to a synchronous clocked signal as described above.

Although not necessarily timed with shots of the histogram data path, three such shots 910, 912, and 914 are illustrated in FIG. 11 as a reference. For example, interval 910 may represent a first shot, interval 912 may represent a second shot, and interval 914 may represent a third shot. Note that the integrate signal 1008 need not correspond to the start signal that would signify the beginning of a shot in the histogram data path, such as shot 910. Additionally, note that the integration register may continually be updated over time without regard to shots or measurements. In this example, the periodic signal 1012 continues to clock the ALU 1006 before, between, and after the shots 910, 912, 914 that in the histogram data path. Because the integration register 1004 may be continuously updated, the integration register may represent a total number of positive signals received from photodetectors across each of the time bins and across time intervals representing separate shots.

The top graph of FIG. 11 illustrates the value 1108 of the integration register 1004 over time. The top graph does not represent a histogram, but instead each vertical bar represents the value of the integration register 1004 at that point in time. The values from the bottom graph are also illustrated as the black boxes in the top graph that are added to the value 1108 of the integration register 1004 for each time bin. For example, the time bins in the bottom graph having values of 8, 10, 11, 9 are cumulatively added to the value 1108 in the integration register in the top graph during the corresponding time bin. When the value of 8 is stored in the histogram time bin, it is also added to the existing value 1108 in the integration register to produce an updated value of 16. Next, the current value of 10 is added to its time bin and to the existing value of 16 in the integration register to produce an upgraded value of 26, and so forth. Instead of storing an updated value in a memory location and incrementing the address of the memory, the same integration register is continuously updated with new values from the ALU 1006. As described above, the value of the integration register 1004 may be continuously increased without regard to shots being recorded in the histogram data path.

VI. Multiple Integration Registers

The embodiments described above use a single integration register to accumulate photon counts for photons received before, during, between, and/or after shots in one or more optical measurements. This aggregated value stored in the integration register can be used to estimate a background noise level for distinguishing between background noise and photons reflected from a pulse train as part of the measurement. Additionally, the value in the integration register can be used to generate an ambient light image of the surrounding environment. For example, each of the shots in a measurement can fall within an integration window of the integration register. While the histogram data path will generate distance measurements to objects in the surrounding environment, the value in the integration register can be used to generate an ambient light image (e.g., grayscale) of the surrounding environment. The spatial resolution of the resulting ambient light image may generally line up with the spatial resolution of the measurements of the LIDAR system such that each distance measurement corresponds to one grayscale image value for the ambient light image.

Figure 12:
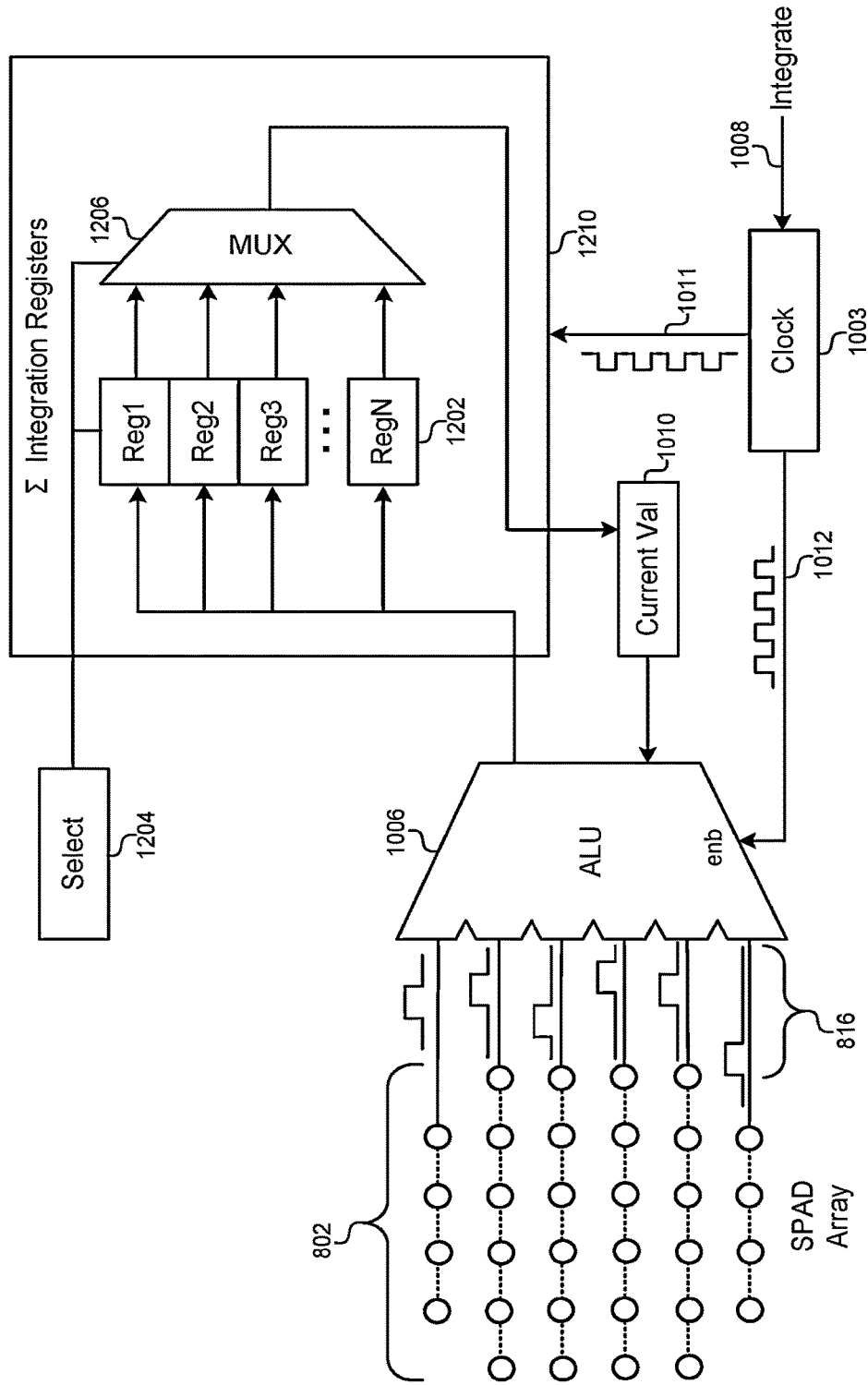
FIG. 12 illustrates timing graphs for the integration data path and the histogram data path, according to some embodiments.

Instead of using a single integration register, some embodiments may use a plurality of integration registers to increase the spatial resolution of image data captured in the integration register(s). FIG. 12 shows an integration data path with a plurality of integration registers 1202, according to some embodiments. The integration data path shown in FIG. 12 is similar to the integration data path shown in FIG. 10. However, instead of a single integration register 1004 that accumulates all photon counts received while the integration register 1004 is enabled, this integration data path includes a plurality of integration registers 1202. Instead of storing all photon counts in the single integration register 1004, the photon counts from the ALU 1006 may be stored in the plurality of integration registers 1202 based on various stimuli, such as timing, location, threshold, and so forth.

As shown in FIG. 12, the ALU 1006 can provide an output of photon counts in a current ALU clock cycle to the bank of integration registers 1210. The bank of integration registers 1210 may then select one of the integration registers 1202, and the selected integration register may then add the photon count received from the ALU 1006 during the current clock cycle to its current stored value. A select signal 1204 may be provided to the bank of integration registers 1210 and used to select and cycle through each of the integration registers 1202. The select signal 1204 may also be used by the bank of integration registers 1210 to select an output from the integration registers 1202 to use as the current value 1010 that is sent to the ALU 1006, and to select one of the integration registers 1202 to which the updated value from the ALU 1006 should be stored.

When the integrate signal 1008 triggers the beginning of an integration cycle on the integration data path, the bank of integration registers 1210 may select a first integration register in the plurality of integration registers 1202. For example, the select signal 1204 may be provided to a multiplexer 1206 that receives outputs from the plurality of integration registers 1202 and selects the output of one of those integration registers 1202 to be used as the current value 1010. As selected by the select signal 1204, this first integration register may provide its stored total of photon counts from previous ALU clock cycles to the ALU 1006, and the ALU 1006 can add this current value 1010 from the selected integration register to a current photon count from the photosensor 802. This updated value can then be provided back to the bank of integration registers.

When the bank of integration registers 1210 receives the updated value from the ALU 1006, the select signal 1204 can again be used to select the same integration register for which the output was selected by the multiplexer 1206 above. In some embodiments, the select signal 1204 may act as an enable signal individually for each of the integration registers 1202. The output of the ALU 1006 may be provided to an input of each of the integration registers 1202, and the select signal 1204 can select one of the integration registers 1204 to latch in the updated value from the ALU 1006. Although not shown explicitly in FIG. 12, some embodiments may alternatively or additionally include a demultiplexer or an inverse multiplexer to send the updated value from the ALU 1006 to the selected integration register.

The select signal 1204 may select the same integration register through multiple ALU clock cycles before selecting a different one of the integration registers 1202. While an integration register is selected, it can aggregate photon counts in the same manner described above for the integration data paths with only a single integration register. However, embodiments with a plurality of integration registers 1202 can switch to a new one of the integration registers 1202 during a single integration interval. For example, when the integrate signal 1008 is enabled to begin an integration cycle, the select signal 1204 may select a first one of the integration registers 1202 as described above. During the same integration cycle, and without requiring a new enablement of the integrate signal 1008, the select signal 1204 may be changed or incremented to select a second one of the integration registers 1202. Subsequently, this process may continue such that the select signal 1204 cycles through each of the integration registers 1202 during an integration cycle. This effectively splits the total photon count that was stored in a single integration register in FIG. 10 into a plurality of individual integration registers 1202 in the embodiment of FIG. 12.

A. Total Photon Counts From Integration Registers

When the select signal 1204 causes the integration operation to move from one of the integration registers 1202 to the next, and aggregated value stored in the previous one of the integration registers 1202 may be maintained. Thus, when a subsequent one of the integration registers 1202 is selected, previous integration registers in the integration register bank 1210 may maintain their values until the end of the integration cycle or until the beginning of a subsequent integration cycle. For example, when the integrate signal 1008 is enabled to begin a new integration cycle, the stored values in the integration registers 1202 can be reset to zero.

Figure 13:
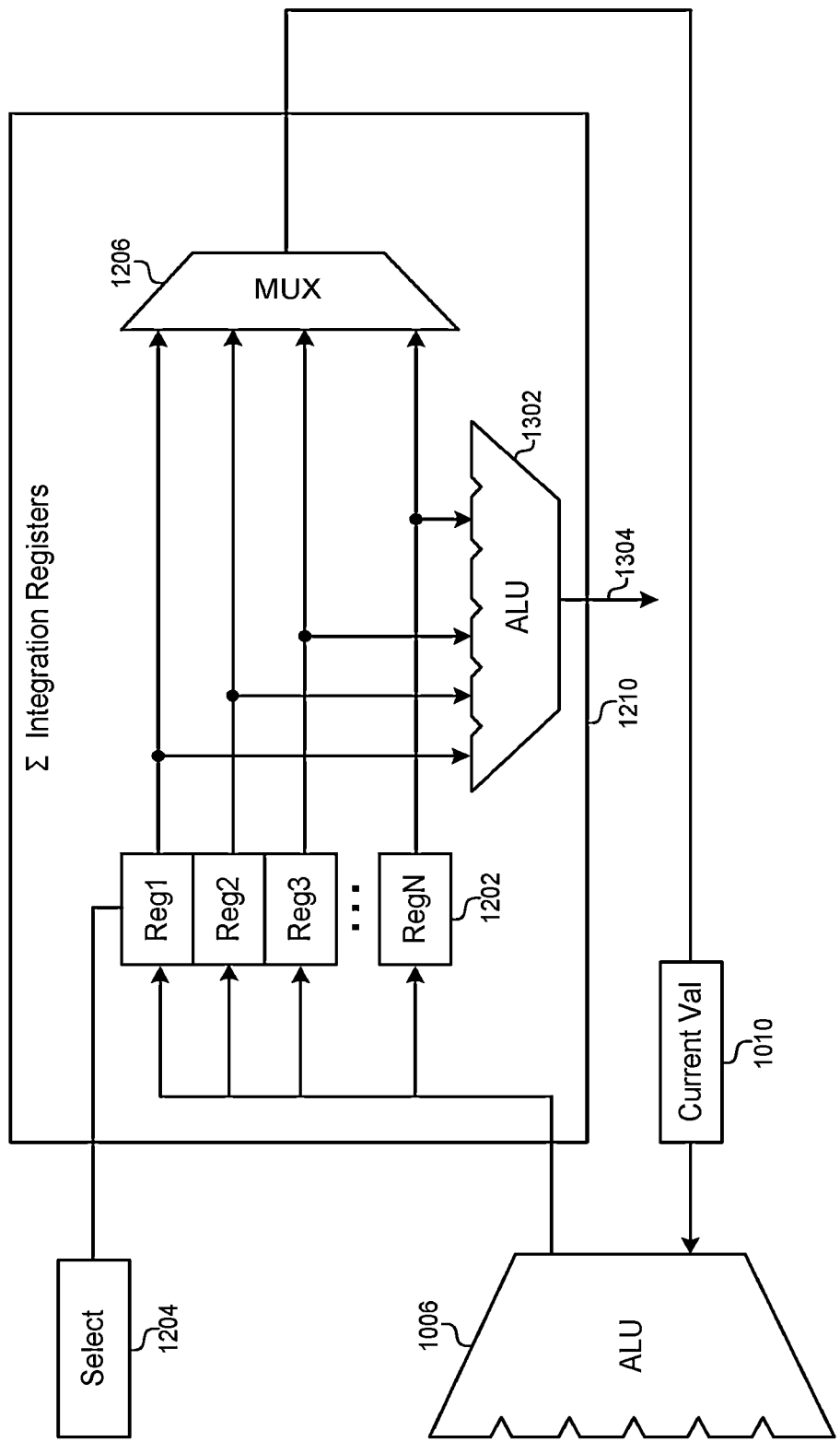
FIG. 13 shows an integration data path that includes an ALU for providing an aggregated total from all of the integration registers, according to some embodiments.

FIG. 13 shows an integration data path that includes an ALU 1302 for providing an aggregated total from all of the integration registers 1202, according to some embodiments. Because each of the integration registers 1202 maintains their stored values as the select signal 1204 progresses through the integration registers 1202, the aggregated sum from each of the integration registers 1202 at any point during the integration cycle may provide a total photon count up to that point in the integration cycle. After the integration cycle is complete, the values in the integration registers 1202 may still be maintained such that the aggregated total of the values in the integration registers 1202 may be used at any point prior to the start of a subsequent integration cycle.

To generate a total photon count 1304 for the integration cycle, the ALU 1302 may receive an output from each of the integration registers 1202. The output of the ALU 1302 may then represent the total photon count 1304. In some embodiments, the ALU 1302 may be asynchronous such that it provides a new total photon count 1304 dynamically as values are updated on the outputs of the integration registers 1202. In some embodiments, the ALU 1302 may be a synchronous ALU, and may be clocked using the same clock signal as the ALU 1006 for aggregating photon counts from the photosensor 802.

The total photon count 1304 may be provided as an output to be used by a control processor that generates the select signal 1204 and/or the integrate signal 1008 and processes the data from the histogram data path to identify reflected pulse trains. In some embodiments, the integration register bank 1210 may also include an additional register that receives the total photon count 1304 from the ALU 1302 and stores it each time the integration registers 1202 are updated and a new value is available from the ALU 1302. These embodiments may simultaneously provide photon counts from the individual integration registers 1204 as well as a register storing the total photon count 1304 for the entire integration cycle.

B. Relative Timing Between Data Paths

The integration data path can be distinguished from the histogram data path at least in part by the different timing of the enable, select, and/or clock signals used in each of the data paths, as well as the various time intervals and time bins. The select signal 1204, the clock signal 1012 for the ALU 1006, the integrate signal 1008, and the clock signal 1011 for the bank of integration registers 1210 in the integration data path may each individually be independent from any or all of the timing signals in the histogram data path. For example, each of the timing signals in the integration data path may be generated from a different source when compared to the timing signals in the histogram data path. However, some of these signals may be dependent upon each other in some embodiments, or at least temporarily aligned with each other. For example, the clock signals 1012 and 1011 may be shared between data paths when circuitry for the ALU 1006 is shared between data paths.

Figure 14:
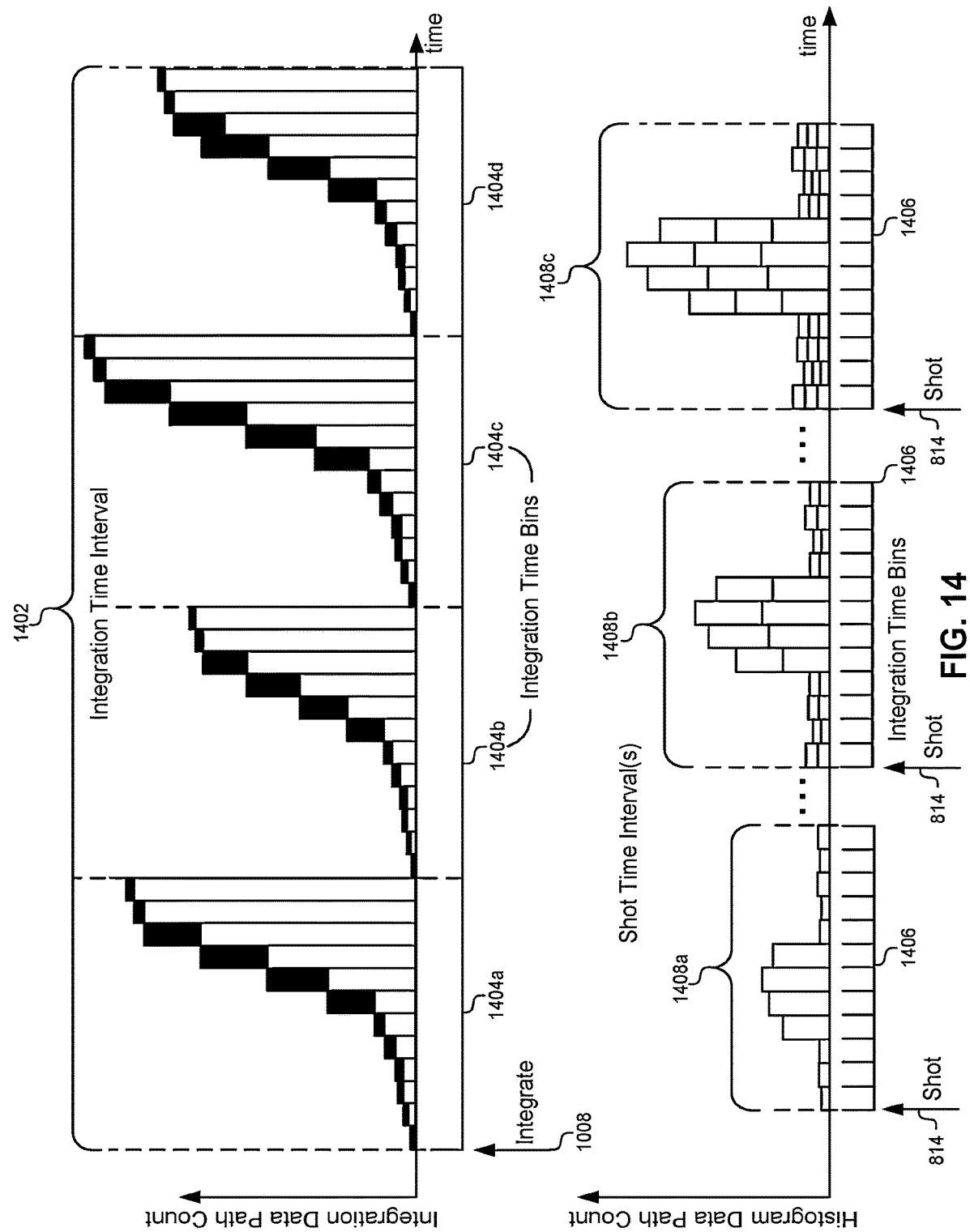
FIG. 14 shows relative timing diagrams for the integration data path and the histogram data path, according to some embodiments.

FIG. 14 shows relative timing diagrams for the integration data path and the histogram data path, according to some embodiments. Beginning with the histogram data path in the bottom graph, each measurement may be comprised of one or more "shots." A shot may be defined as a time interval during which a pulse train is transmitted from a light source and received by a corresponding photosensor. For example, FIG. 14 illustrates a plurality of shots, each of which occurs during shot time intervals 1408 (also referred to as "first time intervals"). A first shot in the measurement may take place during time interval 1408*a*, a second shot in the measurement may take place during time interval 1408*b*, a third shot in the measurement may take place during time interval 1408*c*, and so forth. Each of the shots in the measurement and the corresponding time intervals 1408 may be defined by a shot (or "start") signal 814 in the histogram data path.

Each of the shot time intervals 1408 may be subdivided into a plurality of shot time bins 1406 (also referred to as "first time bins"). Each of the shot time intervals 1408 may include the same number of time bins 1406, and each of the time bins may correspond to a register in the SRAM 806 in FIG. 8 of the histogram data path. For example, photon counts received in the first time bin in each of the shot time intervals 1408 may be aggregated in the same first register in the SRAM, photon counts received in the second time bin in each of the shot time intervals 1408 may be aggregated in the same second register in the SRAM, and so forth. To distinguish the registers in the SRAM from the registers in the bank of integration registers 1210, the registers in the SRAM may be referred to as a plurality of "first registers." As described above, because the time bins each aggregate values from a plurality of shot time intervals 1408, this set of registers in the SRAM may represent a histogram of values received over a plurality of shots during the measurement as a whole. Note that FIG. 14 illustrates a non-zero time interval between each of the shot time intervals 1408. Other embodiments may cause the shot time intervals 1408 to occur back-to-back, such that there is no delay between the shot time intervals 1408.

Turning to the integration data path illustrated in the top graph, instead of using a plurality of time intervals to define a measurement, the integration data path can use a single integration time interval 1402 (also referred to as a "second time interval") during which photon counts are aggregated in the bank of integration registers 1202 sequentially. The timescale of the top graph may be the same as the timescale of the bottom graph. The beginning of the integration time interval 1402 may be triggered by the integrate signal 1008 as described above. When this signal is received, the select signal 1204 may select the first one of the integration registers 1202 and begin integrating photon counts from the ALU as depicted in FIG. 14.

When the select signal changes/increments, the second one of the integration registers 1202 may begin receiving the photon counts from the ALU. This process may continue until each of the integration registers 1202 has been selected. Therefore, each of the integration registers 1202 may be associated with a corresponding time bin 1404 that subdivides the integration time interval 1402. These may also be referred to as "second time bins" to distinguish them from the first time bins in each of the shot time intervals of the histogram data path. For example, a first time bin 1404*a* in the integration data path may correspond to a first integration register in the bank of integration registers 1210. The first time bin 1404a may be much larger than the time bins 1406 in the histogram data path. Additionally, some embodiments may allow each of the integration time bins 1404 to be varying lengths. This may be true when the select signal 1204 is not governed by a timer, but is instead generated by an external stimuli, such as a position sensor.

The integration time bins 1404 need not be temporally aligned with any of the time bins 1406 or shot time intervals 1408 from the histogram data path. For example, the time bin 1404a may begin or end in the middle of a shot time interval 1408a, may include multiple shot time intervals 1408, and/or may aggregate photon counts that fall outside any of the shot time intervals 1408. In some embodiments, the time bins 1404 may be synchronized with the shot time intervals 1408 such that a certain number of shot time intervals 1408 fall within each of the integration time bins 1404. For example, some embodiments may be timed such that two or more shot time intervals 1408 fall evenly within each of the integration time bins 1404.

The duration of the integration time interval 1402 also need not be aligned with the shot time intervals 1408 that make up a single measurement of the optical measurement system. For example, the integration time interval 1402 may include shots from multiple measurements. The integration time interval 1402 may also include fewer shot time intervals 1408 than are in a single measurement. In some embodiments, multiple integration time intervals 1402 may fit within a single shot time interval and/or a single measurement. Some integration time intervals 1402 may begin before and extend beyond a measurement. Therefore, the integration time interval 1402 may aggregate photon counts into integration registers 1202 between shots, between measurements, and/or at other times during which pulse trains are not being transmitted from the light source.

VII. Selecting Integration Registers

As described above, the select signal 1204 may be used to progress through the integration registers 1202. The select signal 1204 may be generated from a variety of different sources, including defined-interval timers, as well as external stimuli that need not conform to precise timing requirements. The select signal 1204 may be generated on the same integrated circuit chip as the integration data path or may alternatively be generated off-chip.

A. On-Chip Signals

Figure 15:
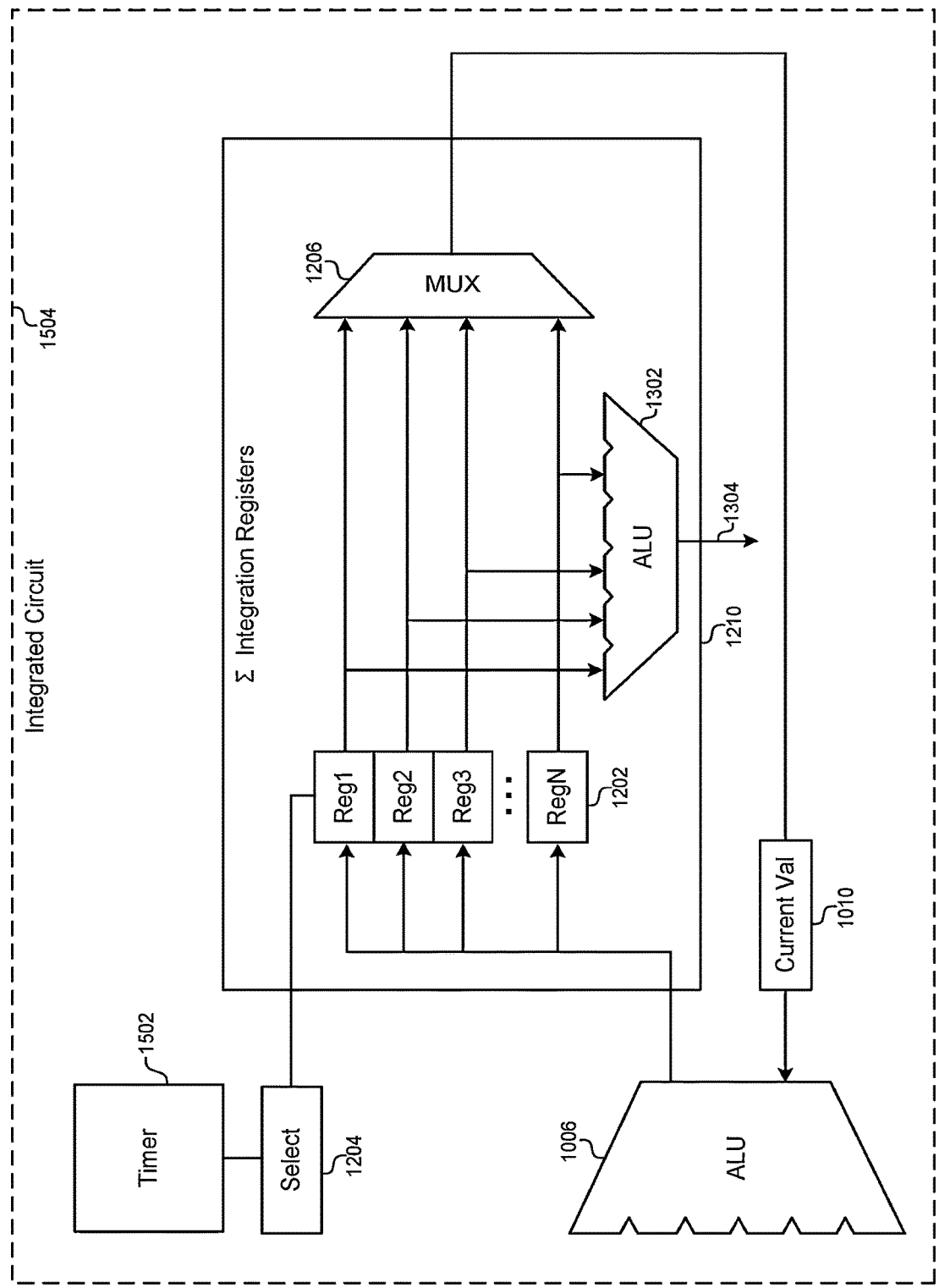
FIG. 15 shows an integration data path that generates the select signal on-chip, according to some embodiments.

FIG. 15 shows an integration data path that generates the select signal 1204 on-chip, according to some embodiments. The select signal 1204 may be generated by a timer 1502. The timer 1502 may be configured to generate the select signal 1204 at regular intervals such that each of the integration time bins (i.e., second time bins) may be uniform in length. The timer may define a length of each integration interval (i.e., second time interval) by subdividing the integration interval into integration time bins that add up to the desired length of the integration interval. For example, if the integration data path is being used to generate a total photon count for a pixel in an ambient image of the surrounding environment, the timer 1502 can be configured to generate time bins that add up to a length of time corresponding to that pixel. The time associated with each pixel may correspond to a rate at which the optical measurement system is physically rotated to scan the surrounding environment. The timer 1502 may then subdivide the time interval associated with each pixel by the number of integration registers 1202 in the bank of integration registers 1210 to generate the final period for the select signal 1204.

In some embodiments, the timer 1502 can be configured such that it corresponds to a length of time associated with each optical measurement. For example, if each measurement is configured to take approximately 1 µs, the timer may be configured to increment the select signal 1204 by dividing the time for each measurement by the number of integration registers 1202 in the bank of integration registers 1210. This configuration may be used when the integration interval should line up with a corresponding measurement. For example, when the integration value is used to estimate a background noise level to set a threshold for a measurement, the integration interval may be temporally aligned with to include the measurement.

The timer 1502 may also be used as a proxy for measuring position of the optical measurement system. Because the rate at which the optical measurement system may rotate around a central axis may be known, the timer 1502 can be configured to provide a predetermined spatial resolution for ambient light measurements. For example, if the optical measurement system rotates 360° around its central axis once every 100 ms, and the system should generate 1000 pixels, then the timer 1502 may be configured to increment the select signal 1204 every 100 µs divided by the number of integration registers 1202 in the integration register bank 1210 or every 25 µs. Thus, the timer can be used to generate an on-chip select signal 1204 based on an approximate angular position of the optical measurement system without requiring an off-chip external signal from an angular encoder.

B. Off-Chip Signals

Figure 16:
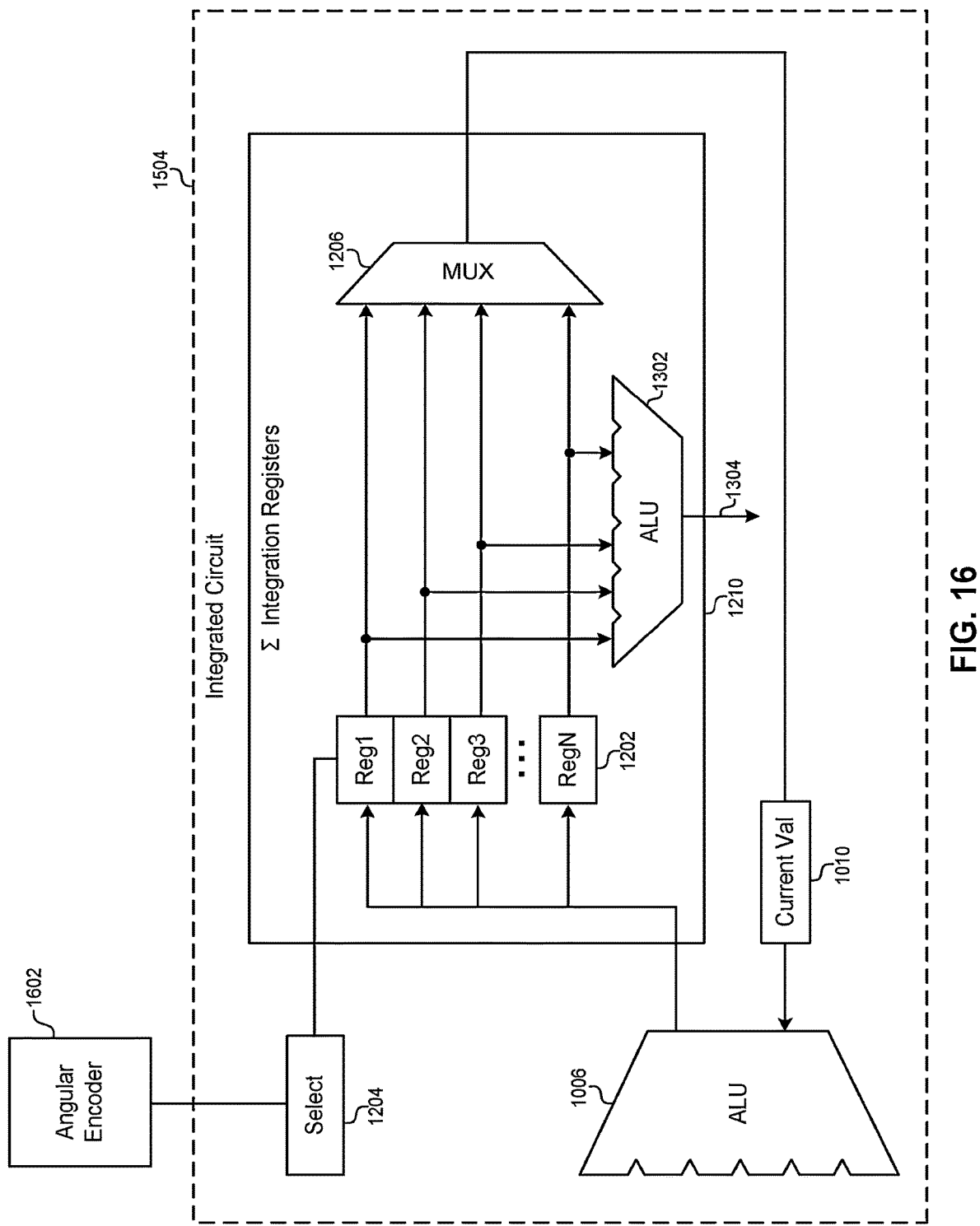
FIG. 16 shows an integration data path that receives the select signal from an off-chip source, according to some embodiments.

FIG. 16 shows an integration data path that receives the select signal 1204 from an off-chip source, according to some embodiments. When generated off-chip, and integrated circuit chip 1504 may receive an input from an external source, and that input may be translated into the select signal 1204 for the integration data path. For example, the input may be received on a pin as an interrupt for a control processor that interfaces with the integrated circuit 1504. The control processor may then generate the periodic signals that act as the select signal 1204 for incrementing the integration registers 1202. Thus, the external signal may define the length of the integration time interval, and the control processor may use the external signal to generate the select signal 1204, which in turn defines the length of the integration time bins for each of the integration registers 1202 as described above.

In some embodiments, the external signal may be generated by an angular encoder 1602. When the integration time interval is to be based on an angular position of the optical measurement system as it rotates around its central axis, an angular encoder 1602 may be used to determine a position of the optical measurement system during rotation. For example, an angular encoder 1602 may be included as described in U.S. patent application Ser. No. 15/980,509 filed on May 15, 2018 and entitled AUGMENTING PANORAMIC LIDAR RESULTS WITH COLOR, which is incorporated herein by reference. The angular encoder 1602 may be configured to generate a strobe signal every 0.36° of rotation (or $\frac{1}{1000}^{th}$ of a full rotation) that can be sent to the integration data path. Alternatively, the angular encoder 1602 may send a signal representing a value of the angular rotation to a control processor, which may in turn generate the select signal 1204 based on the received rotation angle.

Although the angular encoder 1602 is used in FIG. 16 as an example, other embodiments may use any other external source to generate the select signal 1204. For example, some systems may vary the speed of the integration cycle such that the integration interval is decreased in low-light conditions. This may result in higher-resolution ambient light images. Some embodiments may use the speed of a vehicle on which the optical measurement system operates to influence the frequency of the select signal 1204. For example, as a vehicle travels faster, the period of the select signal 1204 may be decreased, while the period may be increased when the vehicle waits at a stoplight. Other on-board vehicle systems may also provide inputs to the optical measurement system to influence the generation of the select signal 1204 including safety systems, collision detection systems, received weather forecasts, and other systems that measure and/or respond to the surrounding environment.

C. Increasing Spatial Resolution

Figure 17:
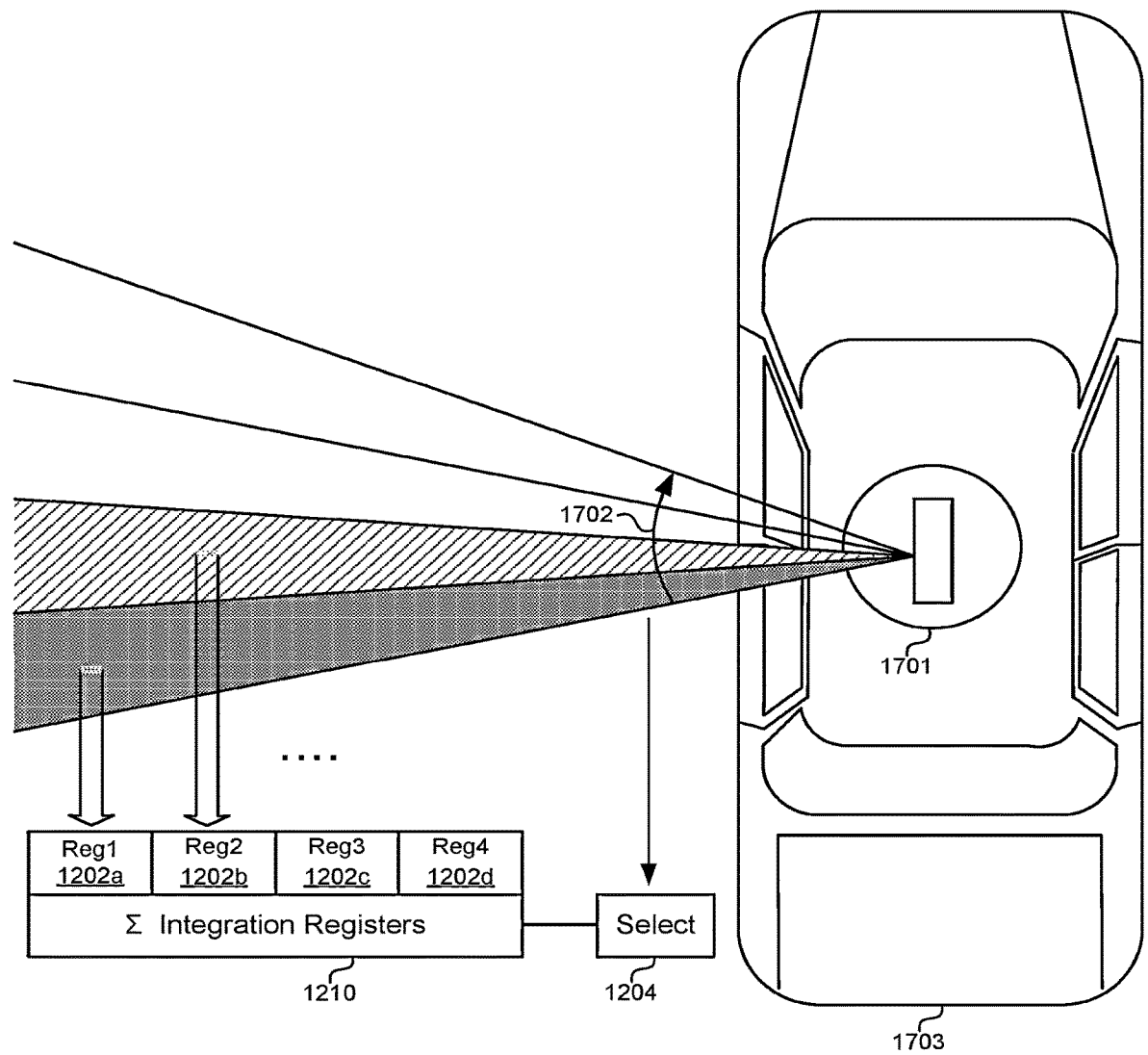
FIG. 17 illustrates an ambient light measurement using multiple integration registers for an electric vehicle, according to some embodiments.

One of the effects of subdividing each integration interval into a number of integration time bins, each of which is captured in a corresponding integration register, is to increase the spatial resolution of the ambient light measurement of the integration process. FIG. 17 illustrates an ambient light measurement using multiple integration registers for an electric vehicle 1703, according to some embodiments. In this example, the optical measurement system 1701 may be mounted on a top of the electric vehicle 1703. The optical measurement system 1701 may be configured to rotate around its central axis many times per second to scan the surrounding area and generate both a depth image and an ambient light image of the surrounding environment. Each integration interval may correspond to one pixel in the ambient light image.

In some embodiments, the measurements for the depth image captured by the histogram data path may be temporarily aligned with the ambient light measurements made by the integration data path as described above. Specifically, a single depth measurement may correspond to a single integration cycle such that the ambient light measurement may be used to estimate background noise, remove the background noise from the depth image, calculate thresholds for detecting reflected pulses, and so forth. When using only a single integration register, the spatial resolution of the ambient light image may thus be defined by the length of a measurement by the histogram data path, where the length may be defined either in terms of a length of time or a physical length of the field-of-view created as the system scans to capture a histogram.

However, when using multiple integration registers, the spatial resolution of the ambient light image from the integration data path can be increased based on the number of integration registers used. In the example of FIG. 17, the bank of integration registers 1210 includes four integration registers 1202. An increment of angular rotation 1702 corresponding to a measurement (and therefore to an integration cycle in this example) can be subdivided into four angular increments, each of which aggregates received photon counts in a corresponding one of the integration registers 1202a-1202d. This increases the spatial resolution of the ambient light image by a factor of four. As described above, the select signal 1204 may be generated by an angular encoder on the optical measurement system 1701, the select signal 1204 may be generated by a timer used as a proxy for position based on a known speed of rotation, or the select signal 1204 may be generated by any other position-sensing device.

VIII. Method for Using Multiple Integration Registers

Figure 18:
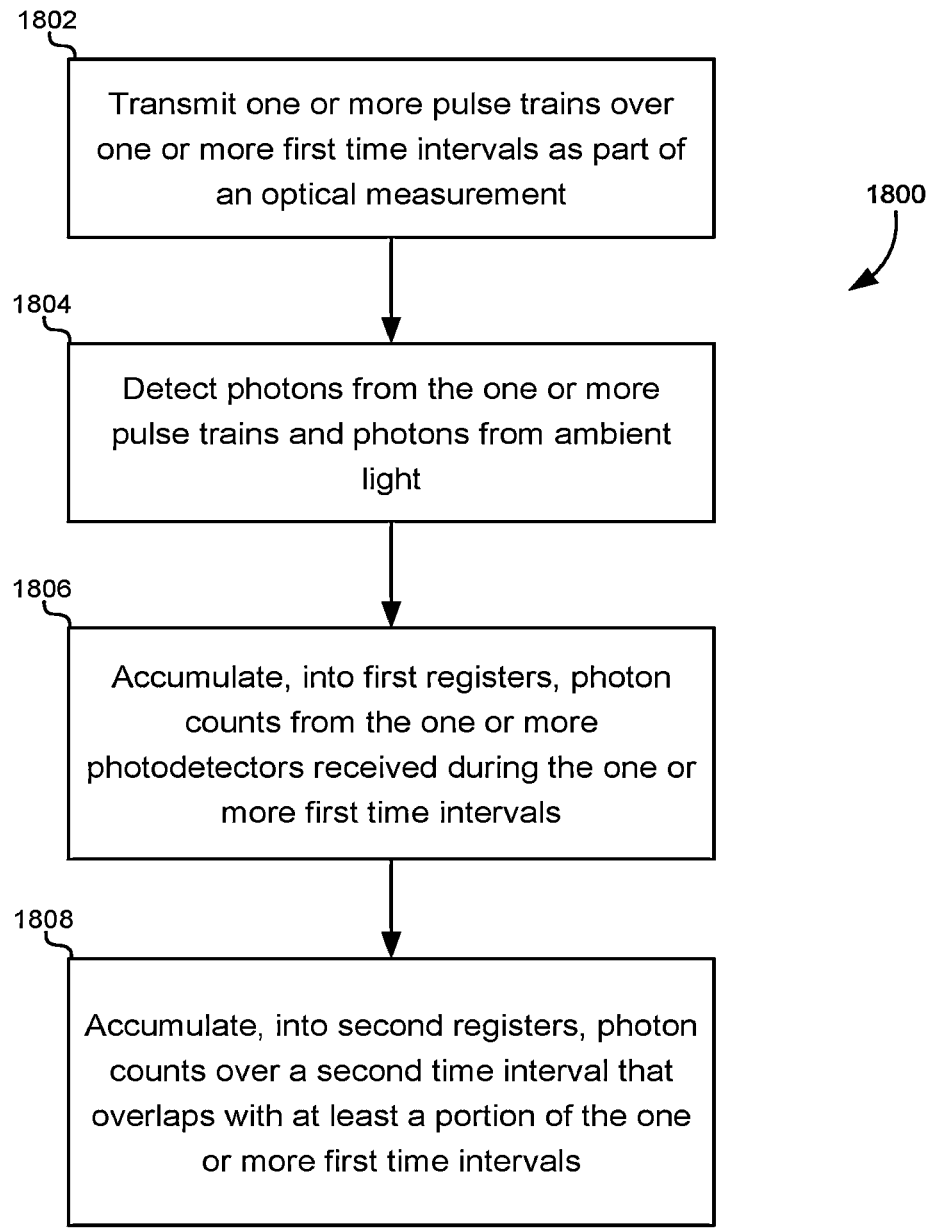
FIG. 18 illustrates a method for using an optical measurement system, according to some embodiments.

FIG. 18 illustrates a method for using an optical measurement system. At block 1802, the method may include transmitting one or more pulse trains over one or more first time intervals as part of an optical measurement. Each of the first time intervals may correspond to a shot time interval as described above, and each of the first time intervals may correspond to one of the pulse trains that are transmitted. These pulse trains may be transmitted by a light source of the optical measurement system and may each include one or more individual pulses.

At block 1804, the method may also include detecting photons from the one or more pulse trains and photons from ambient light. The pulse trains and ambient light may be detected using a plurality of photodetectors on a photosensor. The photodetectors may be implemented using single-photon avalanche diodes (SPADs). The photodetectors may generate signals when photons are received, and thresholding circuitry may generate positive signals to indicate that photons were received. An ALU may aggregate these positive signals during an ALU clock cycle to generate a photon count during the ALU clock cycle.

At block 1806, the method may additionally include accumulating photon counts from the one or more photodetectors during the one or more first time intervals. These photon counts may be accumulated in a first plurality of registers. The first plurality of registers may include the registers in an SRAM of a histogram data path as described above. Each of the first time intervals may be subdivided into a plurality of first time bins for the histogram. Corresponding time bins in each of the one or more first time intervals may be accumulated in single registers in the first plurality of registers. Each of the first time intervals may represent a shot, and together the one or more first time intervals may represent a measurement for the optical measurement system. Each of the first time intervals may be defined by a start signal or shot signal that resets the memory representing the histogram back to the first register in the histogram.

At block 1808, the method may additionally include accumulating photon counts over a second time interval that overlaps with at least a portion of the one or more first time intervals. These photon counts may be accumulated into a plurality of second registers. The second registers may be implemented using the multiple integration registers described above. The second time interval may correspond to the integration time interval described above, and the second time interval may include at least portions of one or more of the first time intervals for the histogram data path. The second time interval may also be subdivided into second time bins. Each of the second time bins may be defined by a select signal, and the second time bins may each correspond to individual integration registers in the plurality of second registers. Some embodiments may also include an arithmetic logic circuit, such as an ALU, that generates an aggregated total of the values stored in all of the second registers that represents a total photon count received during the integration interval. This total photon count can then be used to estimate background noise and generate thresholds for detecting reflected pulses.

IX. Histogram Register Saturation

The width of the histogram data path described above may not be excessively large, as the contents of the histogram memory may typically be reset at the beginning of each measurement. For example, some embodiments may use a 12-bit SRAM, where each 12-bit register can store unsigned values in the range of 0-4095. In normal situations, this provides enough memory that the photon counts in the shots from each measurement can be aggregated in the histogram registers without exceeding the 12-bit range. Other data path components in the histogram data path may be at least as wide as the registers in the histogram memory.

Under normal operating conditions, the registers in the histogram memory and/or other data path components may be large enough that saturation is not a common occurrence. However, in certain operating conditions, an excessive amount of ambient light may be present such that saturation can occur. Alternatively or additionally, high-reflective and/or retroreflective surfaces may be encountered that reflect a large amount of light emitted from the optical measurement system back into the corresponding photosensor. A retroreflective surface is a surface that reflects radiation, including light, back to its source with a minimum amount of scattering. Retroreflective surfaces may be commonly encountered in driving situations where the optical measurement system is installed on a vehicle. These retroreflective surfaces may include road signs, vehicle reflectors, safety clothing, safety barriers, and other objects with reflective surfaces. Optical measurement systems on vehicles may also encounter a large amount of ambient light in the form of vehicle headlights, construction lights, high-beam lights, streetlights, and/or other artificial light sources that illuminate the roadway. Optical measurement systems on vehicles may also experience a large amount of light received from natural sources, such as the sun. When the optical measurement system encounters any of these light sources and/or reflective surfaces, saturation of one or more of the histogram registers may occur.

As used herein, the term "saturate" may describe a situation where a photon count is received from the photosensor, and adding the received photon count to the existing value stored in a histogram register for that time bin would result in a value that exceeds the value that can be represented at least one component in the histogram data path. For example, some embodiments may use an unsigned 12-bit data path that can represent values in the range of 0-4095. This data path may saturate when the received photon count added to the existing value in a time-bin register exceeds 4095. For example, if the register stored a value of 3825 from photon counts in previous shots, and a current shot attempted to add an additional 425 photon counts to the register for that time bin, the data path would saturate in trying to aggregate and/or store a value greater than 4095. The behavior of the data path at saturation depends on the implementation of the ALU, the register, and other data path components. Some components may maintain a maximum value (e.g., 4095) when an attempt is made to aggregate or store a value greater than the maximum value. Some components may reset the value to 0. Some components may restart the count at 0 and add the amount over the maximum value to 0 (e.g., 3825+425=155). Regardless of the component behavior, the actual value that exceeds the maximum value of the register will be lost when the data path saturates.

In some embodiments, the registers in the histogram memory may form a separate component from the ALU, which accumulates the photon counts in a current shot and adds that value to an existing value in the register. As illustrated in FIG. 8, the ALU 804 may retrieve the current value 820 from the histogram memory 806 and add that value to the photon count in the current shot. Therefore, some embodiments may include the ALU 804 as a saturation-limited component. For example, a 12-bit ALU may generate a "carry" output or other indication that the result of a current "add" operation exceeds the 12-bit capacity of the output of the ALU 804. Generally, the output of the ALU 804 will start the count over as described above, and the remainder value—counting up from zero—will be stored as the current value 820 in the histogram memory 806. Some ALUs with signed outputs will roll over and begin counting up from the lowest negative number represented by the ALU. Some embodiments may use an accumulator memory that combines the ALU 804 and the histogram memory such that the memory interface for the histogram memory 806 performs the accumulation function of the ALU 804. Regardless of the particular implementation, either the histogram memory 806, the ALU 804, the memory interface for the histogram memory 806, or some other data path component may be limited to a certain number of bits, and the accumulation operation where photon counts are added to a current value 820 may exceed the width of that data path component. When this occurs in any component, it may be considered a saturation.

Figure 19:
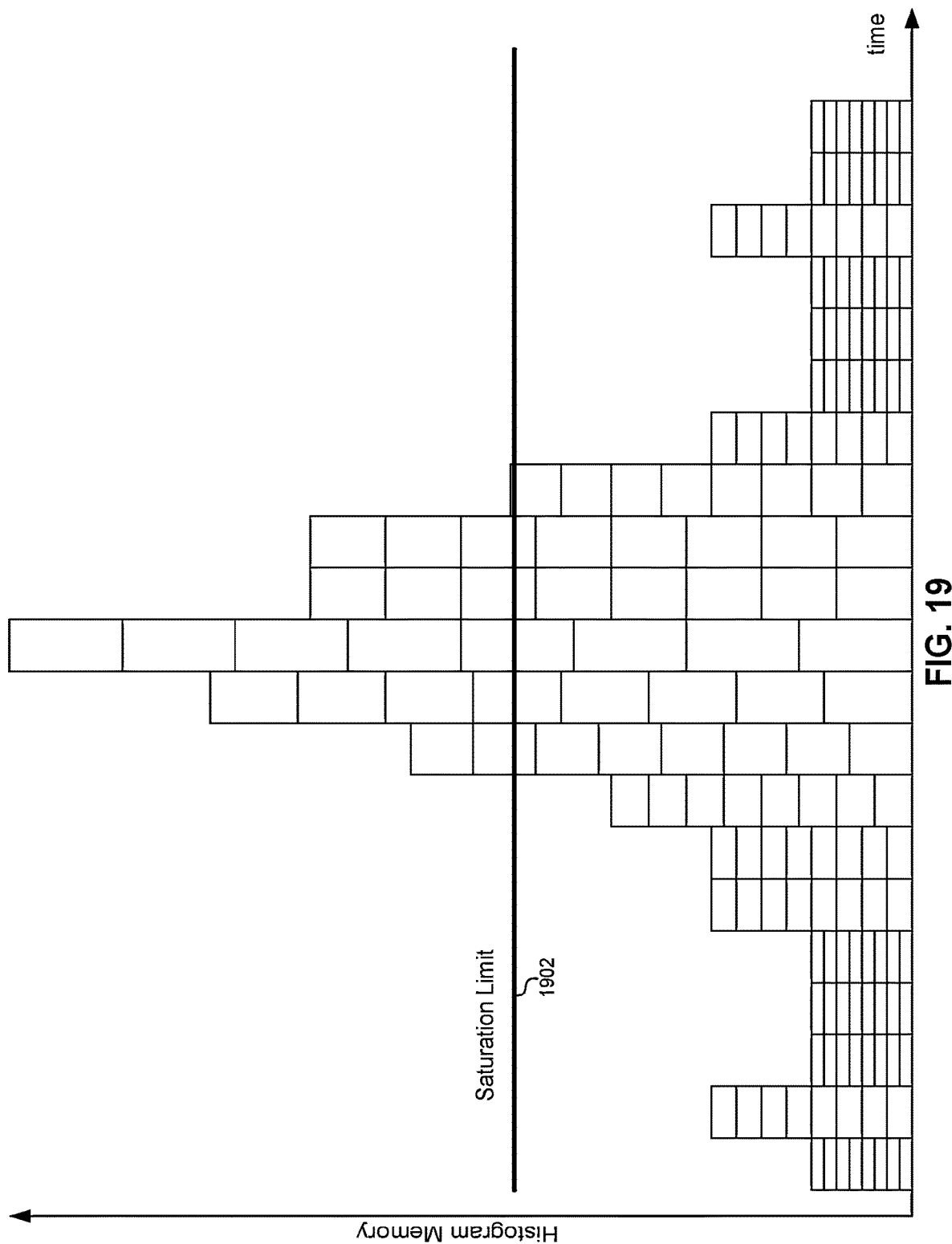
FIG. 19 shows the contents of the histogram memory when saturation occurs, according to some embodiments.

FIG. 19 shows the contents of the histogram memory when saturation occurs, according to some embodiments. Each of the vertical bars in the graph represents a single time bin stored in a register in the histogram memory. The horizontal divisions in each bar represent values accumulated in the register during each shot. In this example, eight shots have occurred in the optical measurement. As described above, the photon counts from each shot may be added to an existing value of photon counts accumulated in the register from previous shots. Each register representing a time bin may be implemented using an N-bit register, where N is an integer value such as 8, 10, 12, 16, 24, 32, 64, and so forth. Typically, registers need not store any indication as to which photon counts were received during particular shots. Therefore, the vertical divisions in each bar need not be represented in the value stored in the register itself, but are rather included for illustrative purposes to show how photon counts can be accumulated over time in registers in the histogram memory.

The horizontal line in FIG. 19 represents a saturation limit 1902 that may be applied to each of the registers in the histogram memory. As described above, the saturation limit 1902 may be a limit that is derived from a bit-width of any data path component in the histogram data path. The saturation limit 1902 may represent a maximum unsigned value that may be stored by each individual register. For example, the saturation limit 1902 may be a value of 4095 for a 12-bit register. The saturation limit 1902 may also represent a maximum width of the output of the ALU in the histogram data path, such that after exceeding the saturation limit 1902, the ALU generates a carry output and/or begins counting up from a lower ALU limit. Due to a high level of ambient light and/or due to a very reflective surface, the histogram in FIG. 19 includes a peak that exceeds the saturation limit 1902 such that multiple time bins will store saturated values rather than actual photon counts.

Regardless of the particular data path component that saturates, such saturation may occur when a new photon count is received by the ALU and an attempt is made to add the new photon count to an existing value. New photon counts may be added to a register for a particular time bin in the histogram memory multiples times during each shot. The clock signal for the ALU may be toggled at regular intervals during the time bin to capture positive indications from the individual photodetectors in the photosensor when photons arrive. Therefore, saturation may occur at any point during a time bin since the accumulation operation is regularly adding new photon counts during the time bin rather than adding a cumulative photon count at the end of the time bin. Some embodiments may accumulate all of the photon counts for a duration of the time bin, then attempt to add the number of total photon counts during the time bin to the corresponding register in the histogram memory. In either case, saturation may occur during the accumulation operation by the ALU and/or when the updated total photon count is sent to the histogram memory for storage.

Figure 20:
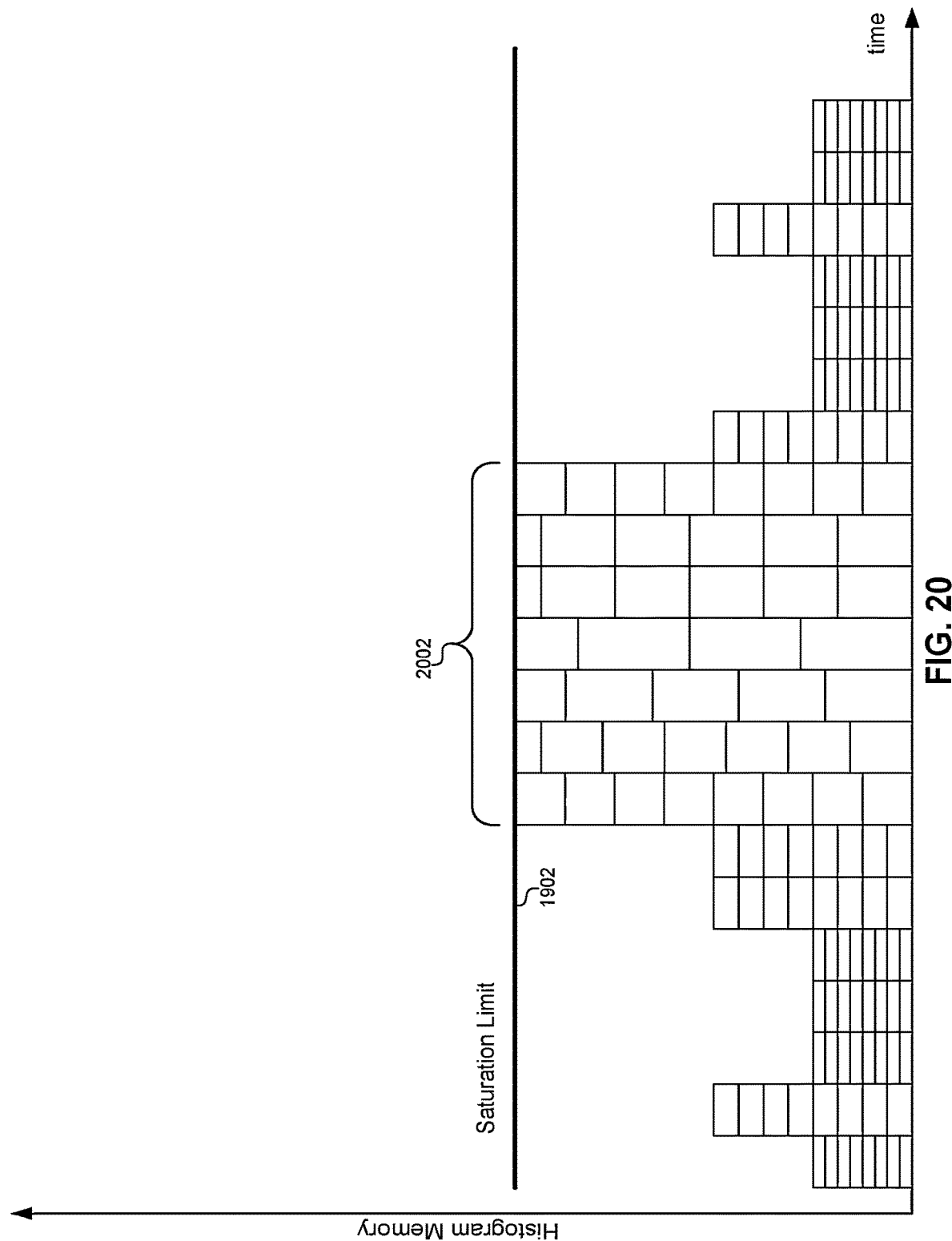
FIG. 20 shows the effect that saturation may have on the overall shape of the received photon count histogram, according to some embodiments.

FIG. 20 shows the effect that saturation may have on the overall shape of the received photon count histogram, according to some embodiments. As described above in this disclosure, the width, height, and shape of a received pulse can be processed by a matched filter to identify light pulses that have been emitted by the light source of the optical measurement system, reflected by the surrounding environment, and received by the photosensor. The matched filter can distinguish between reflected pulses and incidental or background light received from the ambient environment. The shape of the pulse is also important in determining the exact location of the pulse. The location of the pulse (i.e., the time bin in which the pulse peak is located) may be used to determine a distance between the optical measurement system and the reflecting object in the surrounding environment.

FIG. 20 shows the contents of the registers in the histogram memory when the saturation in FIG. 19 occurs. Instead of accurately representing the magnitude of the photon count received in the pulse time bins 2002, the registers in the histogram memory may be saturated at their maximum value. For example, 12-bit unsigned registers may be saturated with a value of 4095. Because the individual registers typically store only a value representing a total photon count for the measurement, they do not distinguish between when individual photons arrived during the measurement within a particular time bin. Therefore, the histogram data path does not know the true magnitude of a saturated register. For example, there is no way to tell whether the register saturated by only a few photon counts and is therefore fairly accurate, or whether the register saturated by many photon counts in the middle of the measurement and is therefore fairly inaccurate. Register saturation not only affects the accuracy with which individual registers represent total photon counts, it also fails to store any information that indicates when in the measurement the saturation occurred.

In addition to the inaccuracy of individual registers, the saturation depicted in FIG. 20 also changes the shape of the received light pulse. Because the registers for the rest of the time bins in the measurement are not saturated, they continue to accumulate photon counts accurately until the measurement is over. Because the photon counts in the pulse time bins 2002 are saturated, the relative distance between recorded top of the pulse and the background noise is reduced. This results in a lower signal-to-noise ratio (SNR) and thus decreases the confidence in the measurement by making the peak less distinguishable from the background noise. Saturation also has the effect of "flattening" the pulse. Instead of a well-defined pulse peak location that can be identified in a single time bin, the pulse time bins 2002 of FIG. 20 are indistinguishable from each other after saturation. The peak of the pulse could be anywhere in the pulse time bins 2002. This uncertainty reduces the accuracy with which the peak can be located, and consequently reduces the accuracy with which the distance to the reflecting object can be calculated in the surrounding environment. Changing the shape of the reflected pulse in the pulse time bins 2002 also affects the accuracy with which the matched filters can identify the pulse.

A. Counter Based Saturation Scaling

In order to solve these and other technical problems associated with saturation in the histogram data path, the data path may include a counter that counts a number of shots and/or exposures during the measurement. As described above, a "shot" begins with a start/shot signal and includes recording photon counts in a plurality of time bins in the histogram memory. A shot populates one layer of the histogram that is incrementally accumulated over the course of a multi-shot measurement. Each aggregation of a photon count in a time bin within a shot may be referred to as an "exposure," and a shot may include a plurality of exposures where the ALU and the histogram memory are clocked to aggregate and store an updated photon count in a single time bin. When a saturation occurs and is detected, the aggregation and storing of additional photon counts during the measurement for all registers in the histogram memory for that photosensor can be disabled. The counter can store a number of shots and/or exposures that took place up to the saturation, and this number with the total number of shots and/or exposures in the measurement for the entire measurement may be used to scale the incomplete photon counts in the histogram memory. This preserves the overall shape of the reflected pulse and allows its true magnitude to be estimated.

Figure 21:
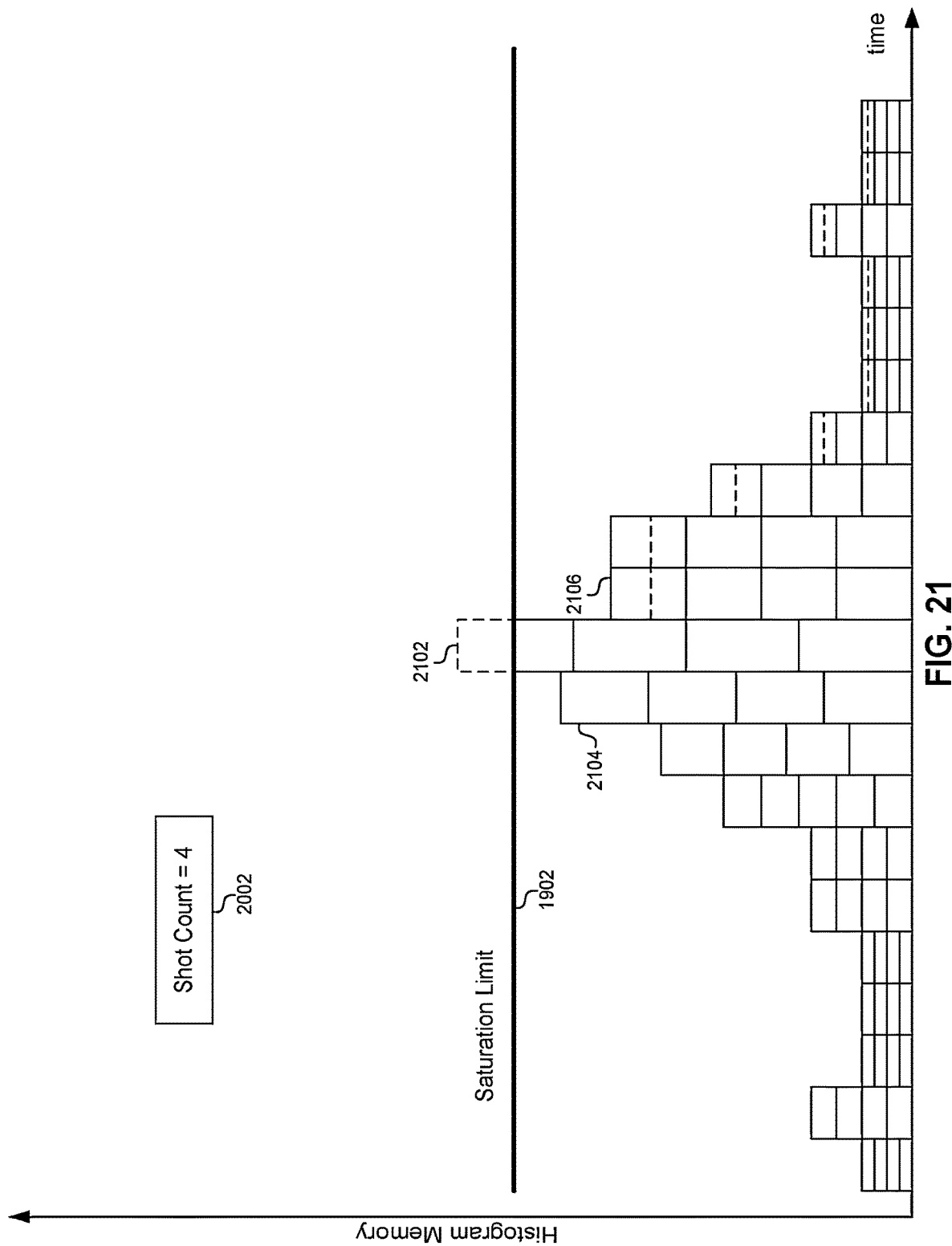
FIG. 21 shows the contents of the histogram memory from the measurement depicted in FIG. 19 when a detected saturation causes the histogram data path to stop accumulating and storing new photon counts.

FIG. 21 shows the contents of the histogram memory from the measurement depicted in FIG. 19 when a detected saturation causes the histogram data path to stop accumulating and storing new photon counts. When a single saturation is detected for a particular photosensor in a single time bin, the accumulation and storing of new photon counts can be disabled for the rest of the measurement for all registers in all time bins for that photosensor. Disabling the photosensor after saturation need not have any effect on other photosensors in the photosensor array. This allows saturation to be detected and handled individually at each photosensor without affecting other photosensors. For example, if a few photosensors receive a large light pulse that causes saturation, this event could be isolated to only the affected photosensors. Furthermore the affected photosensors can have their results scaled such that they are comparable to the results of the unaffected photosensors as described below.

The histogram data path may include an event counter 2002 the counts a number of events occurring between the start of a measurement and when a saturation occurs. The "events" may include a number of shots, a number of exposures accumulated by the ALU, and/or any other timing event that occurs periodically during the measurement. In this example, the event counter 2002 may represent a number of shots since the beginning of a measurement. However, this is not meant to be limiting, and any other event may be used in a similar fashion.

For each event, the event counter 2002 may be incremented. In this example, the event counter 2002 may be incremented at the beginning or at the end of each shot. For example, the start signal that causes the clock to begin sending pulses to the ALU and the histogram memory may also cause the event counter 2002 to increment. Each shot after the beginning of the measurement may continue to increment the event counter 2002 until a saturation in the histogram data path occurs or until the measurement is over. The component that causes a saturation or otherwise detects the saturation can send a signal to the event counter 2002 that causes the event counter 2002 to stop incrementing with subsequent start signals at the beginning of subsequent shots. Therefore, at the end of the measurement, the value in the event counter 2002 may represent a number of shots that occurred on the start of the measurement until the saturation occurred in the histogram data path.

As described above in relation to FIG. 19, each of the vertical bars in the histogram of FIG. 21 represents an accumulated total of photon counts stored in a register representing a single time bin that is repeatedly populated over a plurality of shots in a measurement. Each of the sections within the vertical bars represents photon counts received within a single shot. Therefore, this example shows a total of four shots that were accumulated and stored in the histogram memory before saturation occurred.

In this example, the register associated with time bin 2102 reaches saturation during the fourth shot. As described above, this may include saturation at the ALU, saturation in the register of the histogram memory, and/or saturation in any other component of the histogram data path. The result of the saturation is that the total photon count during the fourth shot may not be accurately accumulated and/or represented in the associated register. When the saturation is detected, the photon counts for the remainder of the current shot can be handled in a number of different ways. In some embodiments, the current register can be disabled for the remainder of the shot, while the other registers in the histogram memory continue to accumulate photon counts until the end of the current shot. After the end of the current shot, then the remaining registers in the histogram memory can be disabled. When this occurs, the periodic clock signal that causes the ALU to increment and the histogram memory to update can be turned off. In this example, the full photon count for each register may be accumulated and stored except for the portion of the photon count for time bin 2102 above the saturation limit 1902.

Alternatively, some embodiments may cause the ALU to stop accumulating and the histogram memory to stop storing new values immediately when a saturation occurs in any of the histogram registers. A saturation event only needs to occur on a single register in the histogram data path for a photosensor. Instead of stopping the accumulation for that single register, all accumulation and storing of new photon counts in the photosensor can be disabled. This can happen immediately such that when saturation occurs in the middle of the shot, photons will no longer be accumulated in any register for the remaining time bins for the rest of the measurement. In this example, the time bins up until time bin 2104 may include full photon counts for the current shot, time bin 2102 would include a partial photon count for the current shot, and time bins from time bin 2106 onward would include no photon counts from the current shot. This would remove the top block from time bin 2106 onward in FIG. 21.

In some embodiments, an exposure counter may be used in addition to, or in the place of the shot counter. When saturation occurs in time bin 2102, the exposure counter may record the number of exposures in the current shot that were stored in the register for time bin 2102. While time bins before timing 2104 may include a full photon count for the current shot, registers for time bin 2106 and onward may count photons up to the number of exposures in the current shot that were successfully executed prior to the saturation in time bin 2102. Thus, time bin 2106 and onward may accumulate photon counts for a portion of the current shot that matches the fraction of the current shot captured in time bin 2102 before saturation. This portion is represented by the dashed line in each of the time bins after time bin 2106. For example, if the updated time bin 2104 saturates, and only 50% of the photons counted in the current exposure can be represented in the histogram register for time bin 2104, then photon counts in subsequent histogram registers from time bin 2106 and forward may also be reduced by 50% for the current shot.

Other embodiments may use different methods for stopping the accumulation and storing of new photon counts when saturation occurs during a shot. Any combination of the methods described above may be used. Specifically, each time bin may be handled independently of other time bins in the measurement. For example, time bin 2102 where saturation occurs can stop accumulating immediately, while time bins prior to time bin 2004 and after time bin 2106 may store full and/or partial photon counts for the current shot, or may be disabled entirely after the saturation in time bin 2102 occurs. These different methods may be used in any time bins in any combination and without limitation in various embodiments.

Because accumulation and storing of new photon counts may stop when saturation occurs, the overall shape of the histogram stored in the histogram memory may approximate the overall shape of the histogram that would have been captured without the saturation limit 1902 as depicted in FIG. 19. Because the overall shape is preserved, the SNR is not as adversely affected as it would be when the accumulation and storing of photon counts is not stopped as shown in FIG. 20. Additionally, preserving the shape of the histogram makes it more likely that the matched filters will correctly identify reflected pulses corresponding to pulse trains emitted from the light source of the optical measurement system.

Although the overall shape may be preserved, the magnitude of the pulse captured by the histogram memory may be significantly less than the actual magnitude of the pulse received by the photosensor during the entire measurement. However, because the event counter 2002 records a number of events that occurred prior to saturation, and because the number of total events for the measurement may also be known and/or recorded in a separate counter, the value stored in the event counter 2002 can be used to scale (or otherwise normalize) the shape of the histogram such that the magnitude approximates what would have been received, accumulated, and stored without the saturation limit 1902.

Figure 22:
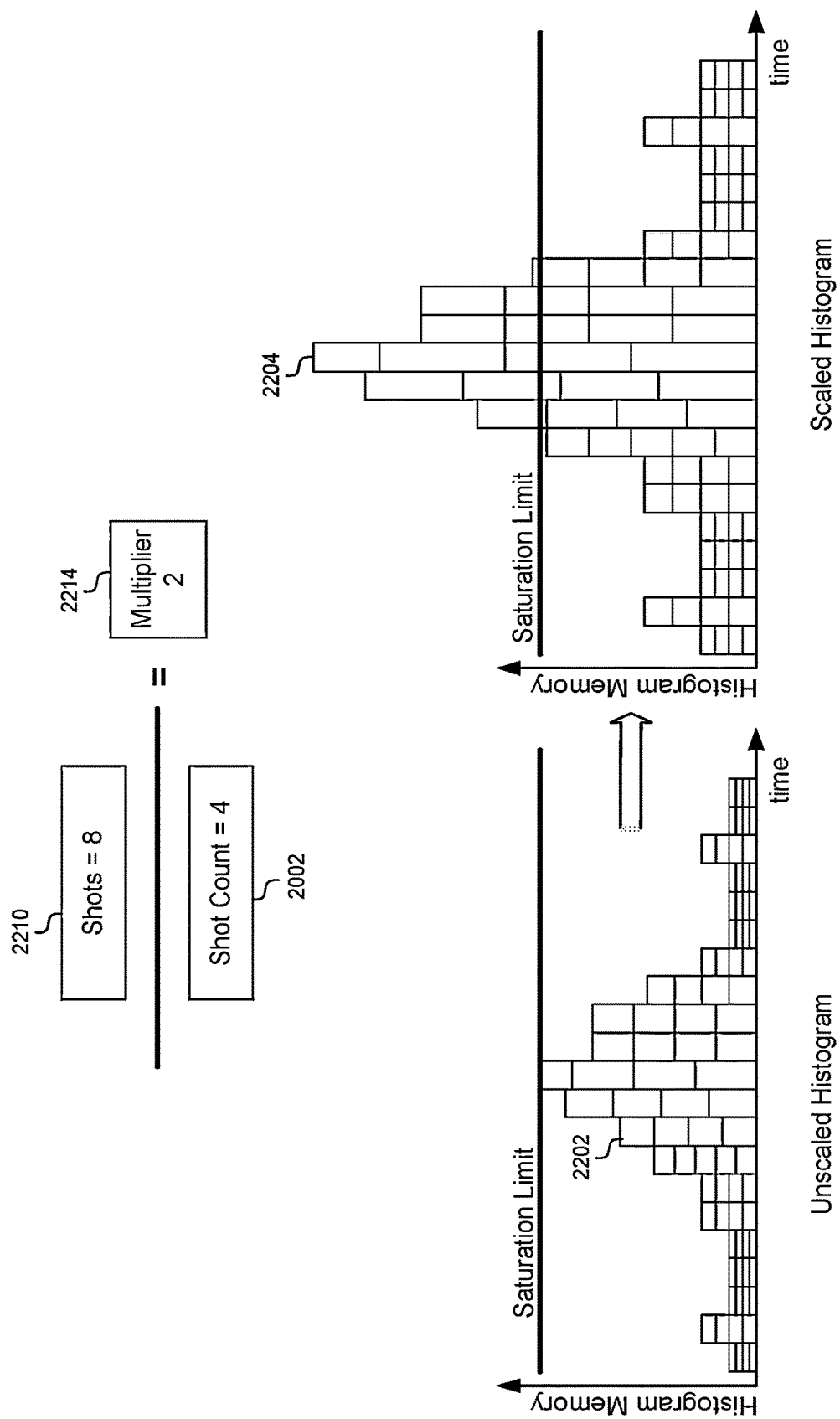
FIG. 22 shows a process for scaling a saturated histogram memory using an event counter, according to some embodiments.

FIG. 22 shows a process for scaling a saturated histogram memory using an event counter, according to some embodiments. This example continues using the number of shots in a measurement as the value stored in the event counter 2002, i.e., four shots as described above. The total number of shots may be stored in a separate counter 2210 or may otherwise be a known value within the optical measurement system. For example, a control process that provides the start signals may store a number of start signals to be sent during each measurement. The total number of events may be divided by the value in the event counter 2002 to generate a multiplier 2214 for scaling the histogram 2202 stored in the histogram memory after saturation. In this example, the measurement may include a total of 8 shots in counter 2210, and the value of 4 shots in the event counter 2002, resulting in a multiplier of 2.

In some embodiments, the multiplier 2214 can be passed off chip with the values of the peak identified in the histogram memory. An auxiliary processor can then scale the values in the histogram 2202 by the multiplier 2214 to obtain a magnitude for the values in the histogram 2202. FIG. 22 illustrates how the values in the histogram 2202 can be scaled by the multiplier 2204, resulting in the values illustrated in histogram 2204. The processor may include memory registers that are much larger than the registers used by the on-chip histogram memory, and may therefore be able to represent these values after being scaled by the multiplier 2214 accurately without saturation. Note the similarity of the shape of the histogram 2204 after saturation and scaling in comparison to the shape of the received photon counts in FIG. 19 without regard to saturation. Some embodiments may also perform the scaling and normalization functions on-chip.

Properly scaling the values in the histogram memory by the multiplier 2214 also allows for the calculation of background noise levels and threshold values for peak detection. Without the multiplier 2214, the background noise recorded in histogram 2202 may not be accurate. However, when scaled by the multiplier 2214, the background noise can be more accurately estimated and used to set a threshold for detecting peaks in the current measurement.

B. Histogram Saturation Circuit

Figure 23:
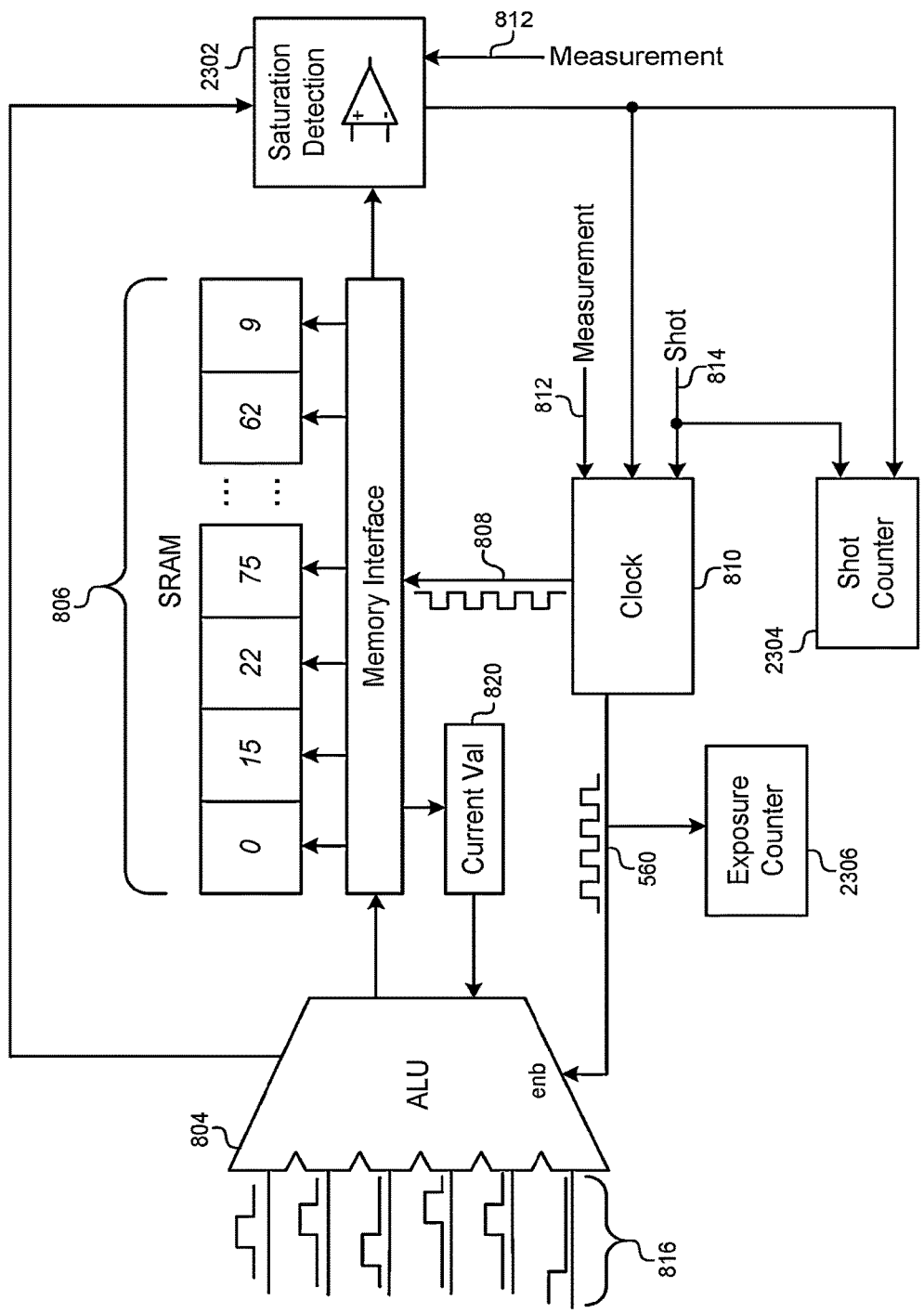
FIG. 23 shows a circuit diagram of the histogram data path with saturation detection, according to some embodiments.

FIG. 23 shows a circuit diagram of the histogram data path with saturation detection, according to some embodiments. FIG. 23 is similar in operation to the histogram data path shown in FIG. 8, however the histogram data path of FIG. 23 includes various counters and components for detecting data path saturation. These additional components allow the histogram data path to detect when a saturation along the data path occurs, stop the ALU 804 and/or histogram memory 806 from accumulating/storing additional photon counts in response to detecting the saturation, and record a number of events (e.g., shots, exposures, etc.) that occurred during the current measurement until the saturation occurred.

The histogram data path may include a shot counter 2304 that increments with each shot in a measurement. When a new measurement begins, the shot counter 2304 may be reset. Each time the shot input 814 triggers the beginning of a new shot, the shot counter 2304 may be incremented. For example, the shot input 1804 may be provided as an input to the shot counter 2304, and the shot counter 2304 may increment the value stored therein in response to a rising edge on the shot input 814. Some embodiments may include more than one counter in the shot counter 2304. For example, the shot counter 2304 may include a first shot counter that counts shots until a saturation occurred, along with a second shot counter that counts a total number of shots in the measurement regardless of saturation. This allows each photosensor to provide both a count for the total number of shot inputs received along with a count for the total number of shots prior to saturation.

As described above, any events may be counted to determine when a saturation occurs. In addition to the shot counter 2304, some embodiments may include additional counters that increment with other events in the histogram data path. For example, some embodiments may include an exposure counter 2306 that counts the number of exposures captured by the photosensor in a current measurement. The clock 810 may generate a periodic signal 560 that causes the ALU 804 to aggregate received photon counts together with the current value 820 in the register for the current time bin. This periodic signal 560 may also be provided to the exposure counter 2306 to increment the value stored in the exposure counter 2306 with each exposure. The exposure counter 2306 may be implemented with a design similar to the shot counter 2304 in that the exposure counter 2306 includes a plurality of individual counters. For example, a first exposure counter may count a number of exposures until a saturation occurs, while a second exposure counter may count a total number of exposures in the current measurement. By counting both values, the exposure counter 2306 may also be used to generate a multiplier for scaling the final values in the histogram memory.

The histogram data path may also include a saturation detection circuit 2306 that detects a saturation along the histogram data path and provides an output signal that causes the ALU 804 and/or histogram memory 806 to stop aggregating new photon counts after saturation. Because a saturation can occur in a number of different places in the histogram data path, the saturation detection circuit 2302 may use different implementations in different embodiments. For example, if saturation occurs when the ALU 804 overflows, the ALU may provide carry output that indicates the result of the ALU 804 has exceeded its bit width. This output may be sent to the saturation detection circuit 2302 and used as an enable signal for the clock 810 and/or the shot counter 2304. Alternatively, when saturation occurs in the histogram memory 806, the memory interface may send a signal to the saturation detection circuit 2302 that can similarly be used as an enable signal for the clock 810 and/or the shot counter 2304. Some embodiments may also use comparators in the saturation detection circuit 2302 to determine when higher-order bits in the histogram data path have nonzero values, indicating that the current aggregated value may exceed the bit width of the histogram memory 806. The saturation detection circuit 2302 may latch a value that indicates the current saturation state of the histogram data path (e.g., a logic '1' when a saturation has occurred), and this value can be sent with the values in the event counters when the histogram memory is processed for peak detection to indicate saturation occurred. When a new measurement signal 812 is received, the saturation detection circuit 2302 can reset this state value for a new measurement.

In response to a saturation detection by the saturation detection circuit 2302, the output signal from the saturation detection circuit 2302 can cause the histogram data path for this single photosensor to stop aggregating new photon counts. In some embodiments, the output may be used as an enable signal for the clock 810 that generates the periodic signals 560, 808 that trigger the ALU 804 and the histogram memory 806. If the saturation detection circuit 2302 disables the clock 810, then these periodic signals 560, 808 may no longer be provided to the ALU 804 and the histogram memory 806, which in turn may prevent them from aggregating and storing new photon counts for the rest of the measurement. Note that turning off the clock 810 also stops the exposure counter 2306 from incrementing. Similarly, any other event counters used in the histogram data path can be selectively disabled by the output of the saturation detection circuit 2302.

The saturation detection circuit 2302 may include one or more delay elements or a counter that causes the saturation detection circuit 2302 to insert a delay between a time when a saturation occurs and a time when the aggregation and/or storing of new photon counts should stop. As described above, various embodiments may cause the histogram data path to continue functioning normally until the end of the current shot, while other embodiments may cause the histogram data path to shut down immediately in response to a saturation. Depending on the embodiment, the saturation detection circuit 2302 can wait until the next shot signal 814 is received before turning off the clock 810 or otherwise disabling the histogram data path.

X. Integration Register Saturation

As described above, the optical measurement system may include a plurality of parallel data paths that operate simultaneously for each photosensor. The plurality of parallel data paths may include both the histogram data path and the integration data path. Although these data paths are not shown together in FIG. 23, it should be understood that they may both be connected to the same photosensor and operate simultaneously in parallel.

The integration data path may face similar saturation problems as described above for the histogram data path. Specifically, the integration data path may have bit-width limitations that can be saturated due to a high level of ambient light and/or reflected light received by the photosensor during an integration interval. Although the source of the problem is the same, the circuit solution for detecting and handling saturation may include some differences from the histogram data path.

A. Counter Based Saturation Scaling

As described in detail above, the integration data path can aggregate photon counts that are received by the photosensor over a "second time interval" that may include all or some of the time intervals, or shots, used by the histogram data path. The total photon count can be stored in one or more individual integration registers, and the total photon count can be used to estimate a background noise level, to set peak-detection thresholds, to remove background noise from detected peaks, and/or generate ambient-light images of the surrounding environment.

Figure 24:
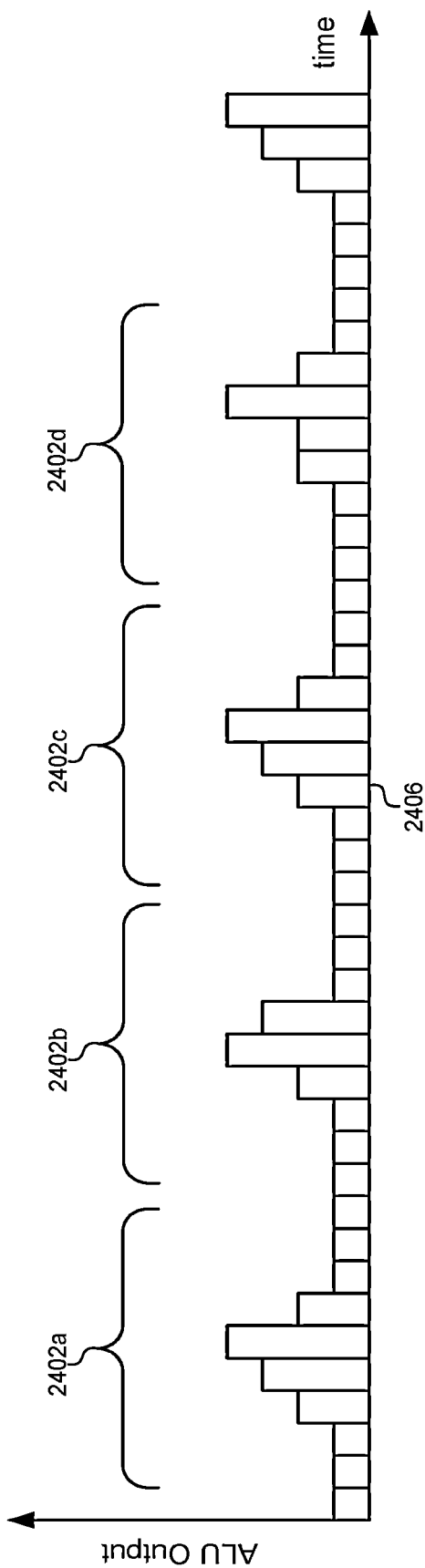
FIG. 24 illustrates a timeline of photon counts received during a measurement for an integration data path, according to some embodiments.

FIG. 24 illustrates a timeline of photon counts 2406 received during a measurement for an integration data path, according to some embodiments. Instead of subdividing the photon counts into shots, the photon counts for the integration data path can be received as a continuous stream of photons that are aggregated by the ALU in the integration data path. The time interval for the integration data path may overlap and/or encompass the shot intervals from the histogram data path, which are represented by intervals 2402 in FIG. 24. Therefore, photon counts may be continuously aggregated by the integration data path before, during, between, and/or after shots taking place simultaneously in the histogram data path.

Figure 25:
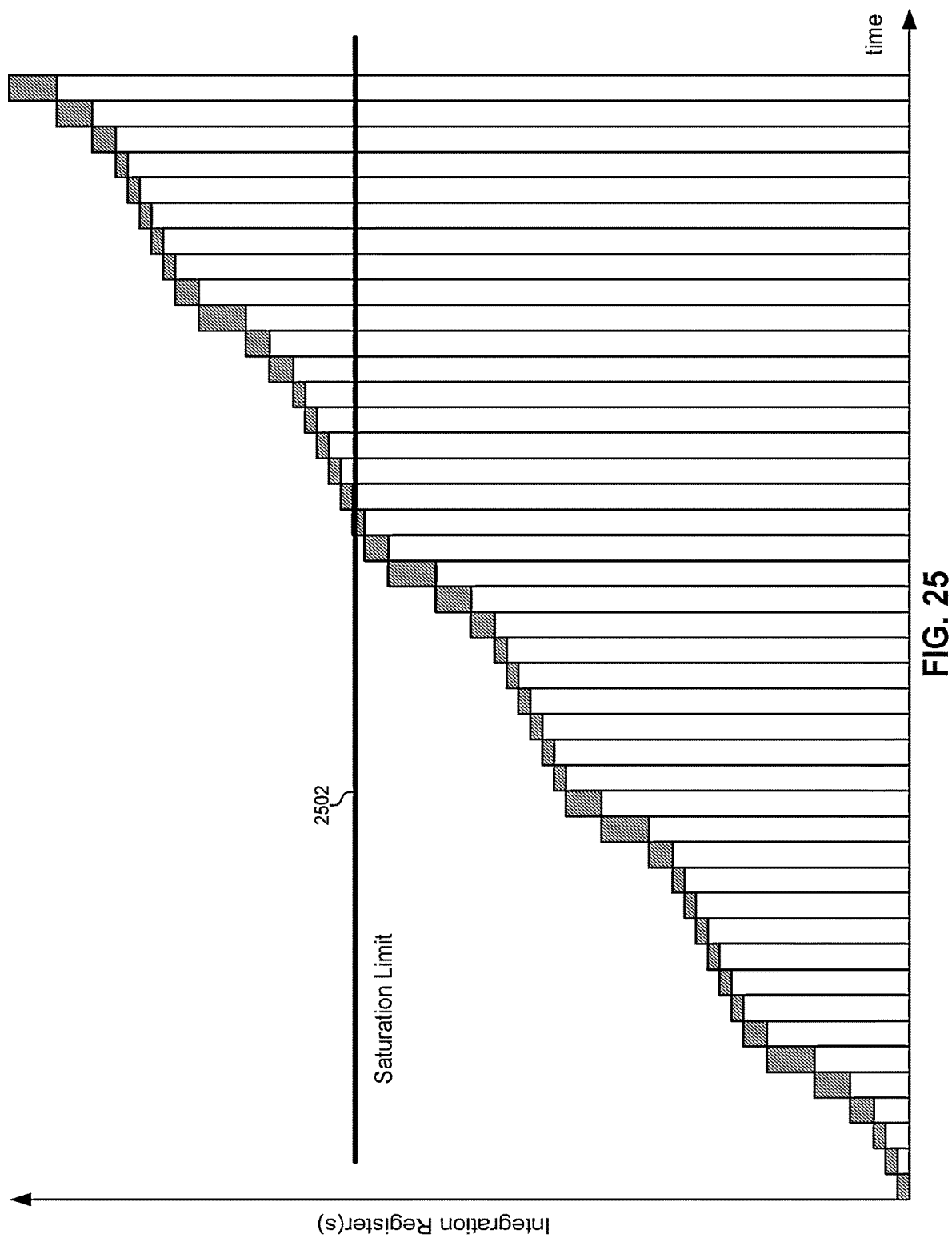
FIG. 25 illustrates how a photon count can be aggregated continuously in the one or more integration registers during a measurement, according to some embodiments.

Because the integration data path continuously aggregates photon counts, the total photon count represented in the one or more integration registers may be significantly higher than any of the photon counts represented in the registers of the histogram memory in the histogram data path. FIG. 25 illustrates how a photon count can be aggregated continuously in the one or more integration registers during a measurement, according to some embodiments. In this example, the incremental photon counts received over time illustrated in FIG. 24 are continuously added to the value of the integration registers in FIG. 25. Each vertical bar represents the aggregated total photon count represented by the integration registers as time moves on during the integration interval. The dark portion of each vertical bar represents the photon count added during the current aggregation operation from the ALU in the integration data path.

Similar to the situation described above for the histogram data path, the integration data path may include a saturation limit 2502 that may be imposed by any of the components in the integration data path. For example, the ALU in the integration data path may include a maximum bit width for any output results. Although the integration registers may typically be larger than the registers used by the histogram memory (e.g., 64 bit), the integration registers may still have a saturation limit that defines the largest photon count that can be stored in the integration registers. Although not drawn to scale, the saturation limit 2502 illustrates how the continued aggregation of photon counts into the integration registers can cause a saturation in some portion of the integration data path. When the saturation occurs in the integration data path, the integration registers may face similar problems to those experienced in the histogram data path. For example, the total photon count represented by the integration registers may no longer be accurate, making it difficult to accurately estimate a background noise level or generate ambient images of the surrounding environment for that particular pixel.

Figure 26:
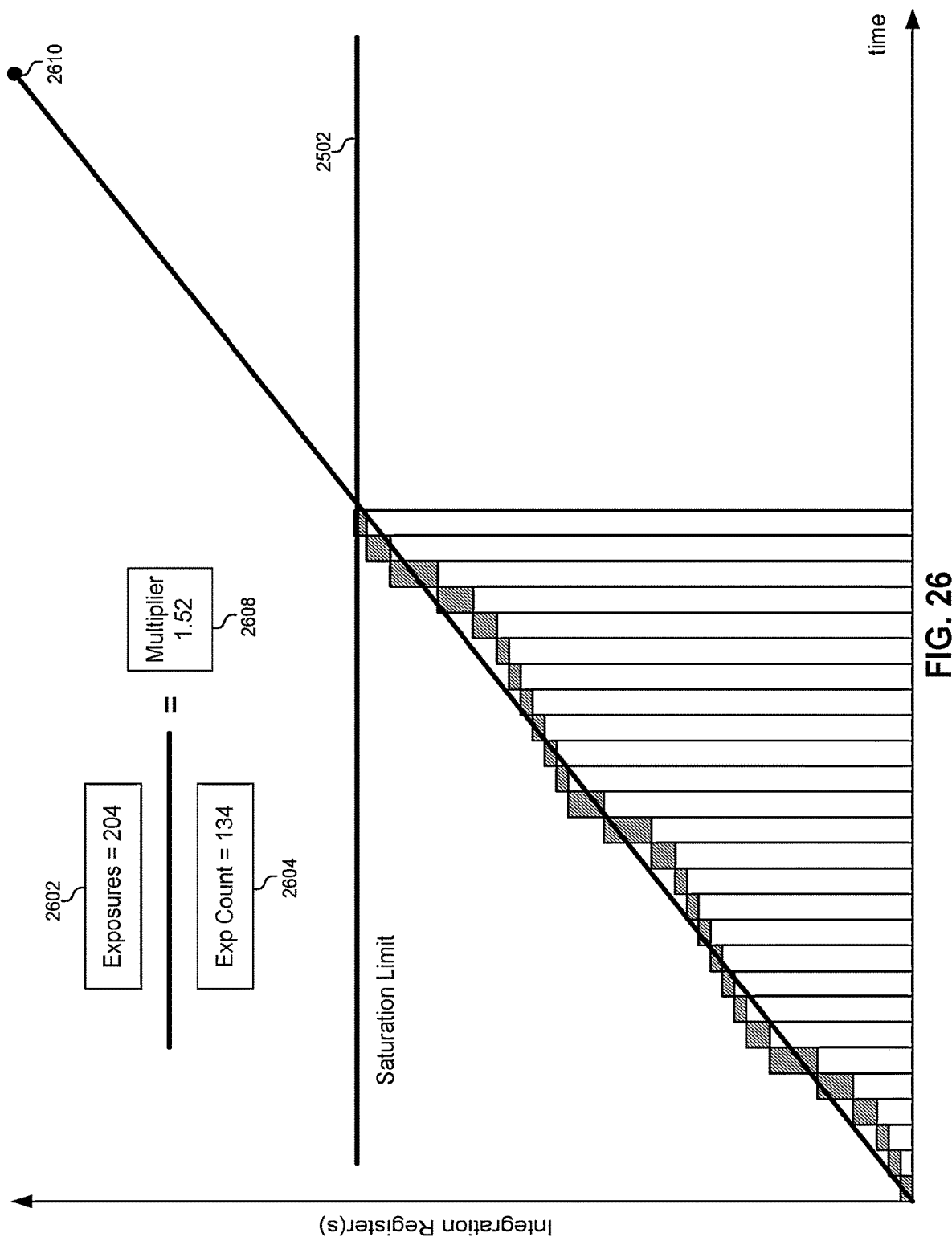
FIG. 26 shows how the aggregation of photon counts into the integration registers can be stopped when the saturation occurs, according to some embodiments.

FIG. 26 shows how the aggregation of photon counts into the integration registers can be stopped when the saturation occurs, according to some embodiments. A saturation detection circuit can also be implemented in the integration data path such that when a saturation occurs the integration data path can stop adding new values to the integration registers and instead maintain the current value throughout the rest of the integration interval. When the saturation limit 2502 is reached by one or more components in the integration data path, the value in the integration registers can be preserved. As described above for the histogram data path, an event counter can count a number of events that occur from the start of the integration interval until the saturation occurs. In this example, the events being counted may include exposures where the integration ALU aggregates a new photon count from the photosensor and updates a value in the integration registers. A total number of exposures 2602 can be divided by the exposure count 2604 to calculate a multiplier 2608, which can then be applied to the value stored in the integration registers to generate a total photon count 2610 for the integration interval.

Although the total photon count stored in the integration register may be inaccurate for the full integration interval due to the saturation, the scaled total photon count may be an accurate estimate of a total number of photons received by the photosensor during the integration interval. Therefore, the scaled total photon count may be used to estimate a background noise level, set a detection threshold, remove background noise from detected peaks, and/or generate ambient images of the surrounding environment as described in in detail below.

B. Integration Saturation Circuit

Figure 27:
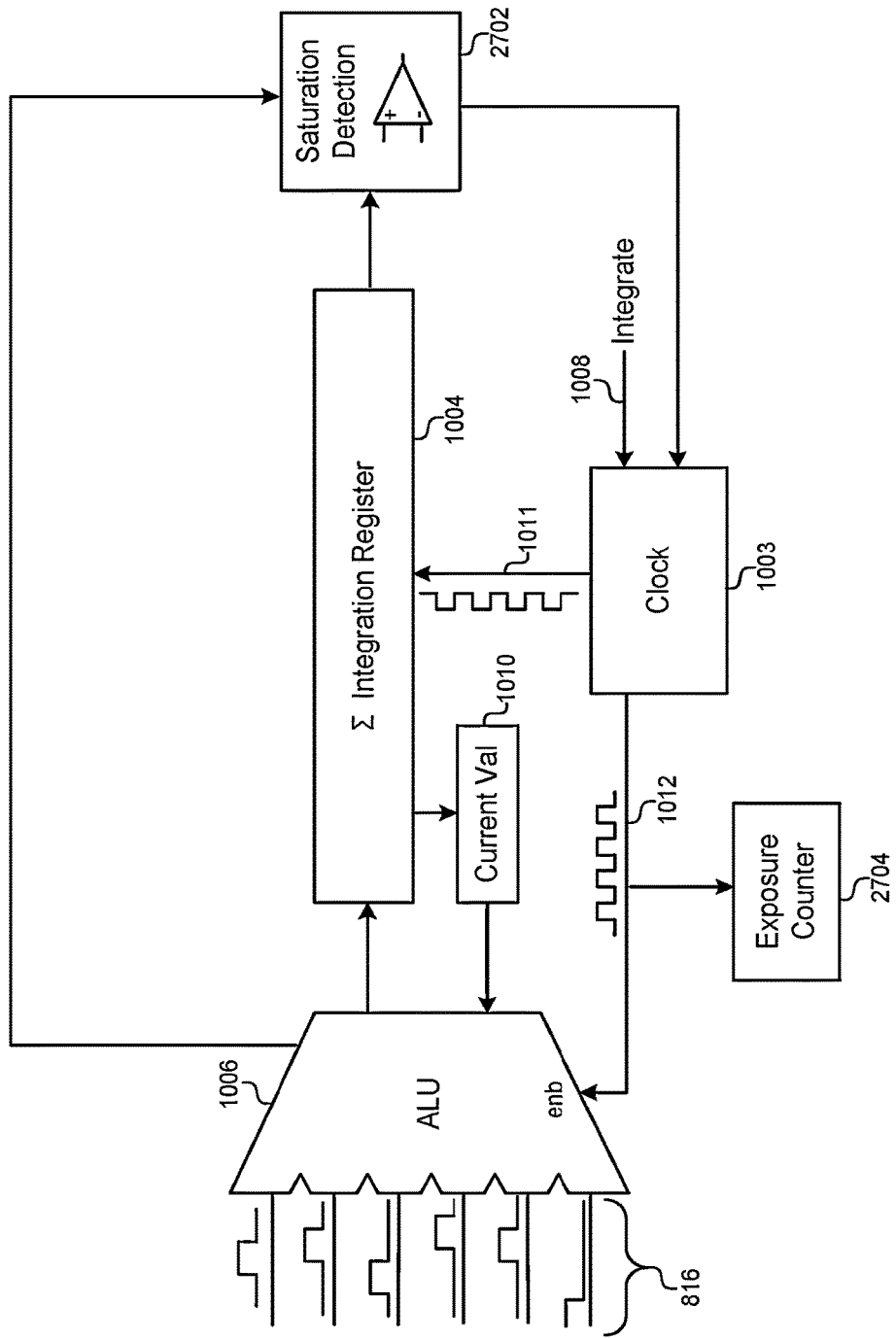
FIG. 27 illustrates an integration data path with saturation protection, according to some embodiments.

FIG. 27 illustrates an integration data path with saturation protection, according to some embodiments. The integration data path may include one or more event counters, such as an exposure counter 2704 that increments with each exposure captured by the ALU 1006. The exposure counter may be incremented using the periodic signal 1012 generated by the clock 1003 that operates continuously during the integration interval. This allows the exposure counter 2704 to count each exposure between when the integration interval begins with the integrate signal 1008 and when the saturation occurs.

The integration data path may also include a saturation detection circuit 2702 that operates in a similar manner to the saturation detection circuit 2302 in FIG. 23 for the histogram data path. For example, the saturation detection circuit 2702 may receive a carry or overflow indication from the ALU 1006. The saturation detection circuit 2702 may also receive a signal from the integration register 1004 indicating that a value to be stored in the integration register 1004 is larger than an allowed bit width. The saturation detection circuit 2702 may also include one or more comparators that compare values at various points in the integration data path to a saturation limit. The saturation detection circuit 2702 may use any of these inputs to generate an output signal to the clock 1003. This signal (e.g., a logic '0') may act as a disable signal for the clock 1003 and cause the clock 1003 to stop generating the periodic signals 1012, 1011. Once the periodic signals 1012, 1011 are disabled, the ALU 1006 and the integration register 1004 may stop aggregating and storing new photon counts for the rest of the integration interval. Additionally, the exposure counter 2704 will stop incrementing and thereby store a number of exposures that occurred prior to the saturation.

XI. Method for Handling Memory Saturation

Figure 28:
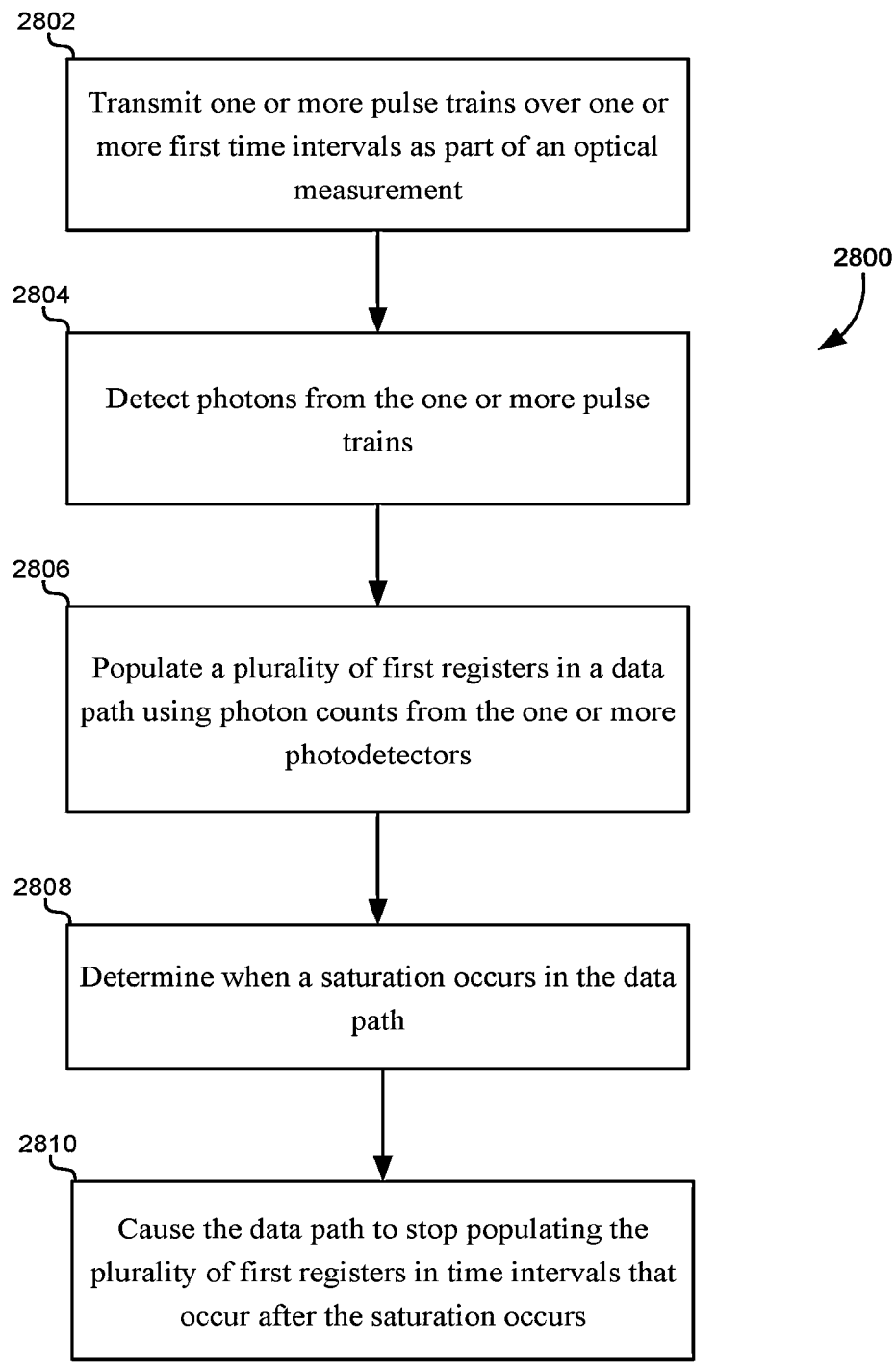
FIG. 28 shows a flowchart of a method for using an optical measurement system to handle saturation, according to some embodiments.

FIG. 28 shows a flowchart of a method for using an optical measurement system to handle saturation, according to some embodiments. At block 2802, the method may include transmitting one or more pulse trains over one or more first time intervals as part of an optical measurement. Each of the first time intervals may correspond to a shot time interval as described above, and each of the first time intervals may correspond to one of the pulse trains that are transmitted. These pulse trains may be transmitted by a light source of the optical measurement system and may each include one or more individual pulses.

At block 2804, the method may also include detecting photons from the one or more pulse trains and photons. Photons from ambient light may also be detected. The pulse trains and ambient light may be detected using a plurality of photodetectors on a photosensor. The photodetectors may be implemented using single-photon avalanche diodes (SPADs). The photodetectors may generate signals when photons are received, and thresholding circuitry may generate positive signals to indicate that photons were received. An ALU may aggregate these positive signals during an ALU clock cycle to generate a photon count during the ALU clock cycle.

At block 2806, the method may additionally include populating a plurality of first registers in the data path using photon counts from the one or more photodetectors. The first plurality of registers may include registers in an SRAM of a histogram data path as described above. Each of the first time intervals may be subdivided into a plurality of first time bins for the histogram. Corresponding time bins in each of the one or more first time intervals may be accumulated in single registers in the first plurality of registers. Each of the first time intervals may represent a shot, and together the one or more first time intervals may represent a measurement for the optical measurement system. Each of the first time intervals may be defined by a start signal or shot signal that resets the memory representing the histogram back to the first register in the histogram. The photon count may be aggregated by an arithmetic logic circuit in the data path, such as the ALU described above.

At block 2808, the method may further include determining when a saturation occurs in the data path. Saturation may be determined by receiving a signal indicating an overflow or carry operation from the arithmetic logic circuit. Saturation may also be determined by receiving an indication from the first plurality of registers that a value to be stored in the first plurality of registers is too large. Saturation may also be determined by comparing any value at any point in the data path with a predetermined saturation limit.

At block 2810, the method may also include causing the data path to stop populating the plurality of first registers in time intervals in the one or more first time intervals that occur after the saturation occurs. The data path may include a saturation detection circuit that generates a disable signal for a clock circuit that, when disabled, causes the arithmetic logic circuit and/or the plurality of first registers to stop accumulating photon counts. The method may cause the data path to stop populating the plurality of first registers immediately when detecting a saturation, or alternatively may wait until the end of a current time interval (e.g., the end of a current shot) to stop populating registers.

In some embodiments, the method may additionally include counting a number of events that occur prior to causing the data path to stop populating the plurality of first registers. The data path may include an event counter, such as a shot counter and/or an exposure counter that is incremented with each shot and/or exposure. The value in the event counter may then be used with a total number of events during the measurement to scale the histogram in the plurality of first registers as described above.

XII. Multiple Peaks in the Histogram

The examples in this disclosure have often used a single peak being transmitted from a light source and detected by a photosensor as examples of how light measurements can be used to determine distance between the optical measurement system and objects in the surrounding environment. However, these examples are not meant to be limiting. In addition to the intended peak caused by the pulse train reflecting off an object of interest, the histogram memory may also include other peaks resulting from more immediate, unintended reflections of the pulse train, as well as peaks that do not necessarily result from the pulse train at all. For example, additional peaks may correspond to light sources, reflections, or other ambient light phenomena in the surrounding environment. An initial peak may result from a reflection of the pulse train off of a housing of the optical measurement system or off of an unanticipated, blocking object in front of the LIDAR system. In these cases, instead of only detecting a single peak, the optical measurement system may detect multiple peaks that may consequently be present in the histogram memory. Each of these peaks can then be passed to a processor for further analysis to determine which peak corresponds to the intended reflected pulse train and which peaks result from other sources or unintended objects.

A. Excluding Initial Peak of Multiple Peaks in the Histogram

The embodiments described herein may use various methods to accurately detect multiple peaks in the histogram memory. These methods may include detecting and masking an initial peak resulting from the photons from the light source that are reflected off the housing of the optical measurement system. This may be used to exclude the initial peak from the saturation detection described above and to exclude the initial peak from the analysis of light reflected from the surrounding environment outside of the optical measurement system. After masking the initial peak, subsequent peaks can be detected recursively or iteratively by a peak detection circuit that is configured to identify a maximum peak in the histogram memory. Once a maximum peak is identified, it can be masked such that it is excluded from any subsequent executions of the peak detection circuit, thereby allowing new peaks to be identified with each execution.

Figure 29:
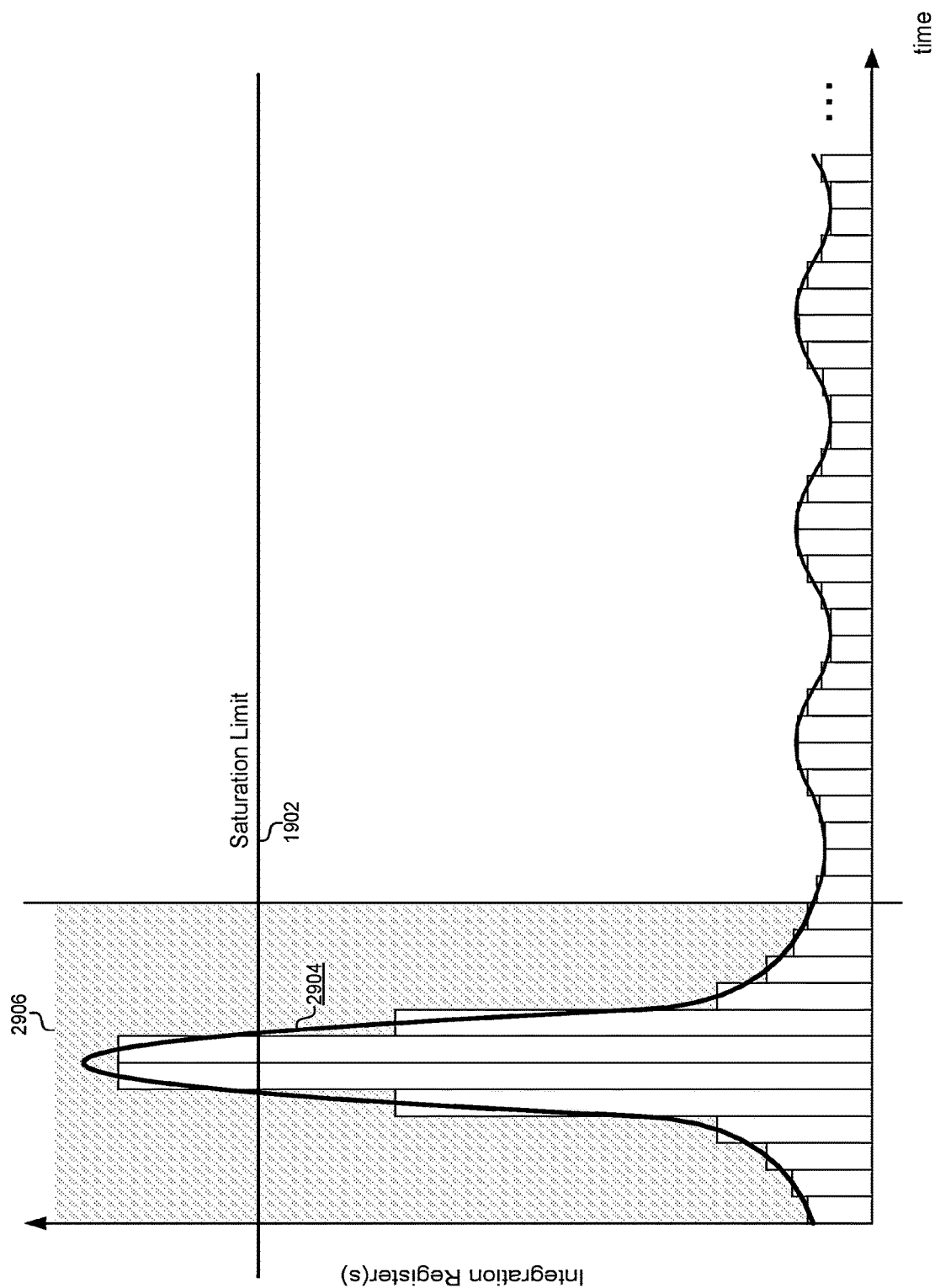
FIG. 29 shows an initial peak that can be identified and masked according to some embodiments.

FIG. 29 shows an initial peak 2904 that can be identified and masked according to some embodiments. The graph in FIG. 29 illustrates the values stored over time in the registers of the histogram memory. Each vertical bar in the histogram corresponds to a register or time bin in the histogram memory as described in detail above. A continuous curve has been superimposed over the vertical bars in FIG. 29 to show the general shape of the histogram for purposes of clarity, but it should be understood that the continuous curve in FIG. 29 need not be actually stored as a separate value by the histogram data path. Additionally, FIG. 29 only illustrates an initial portion of the histogram memory. The subsequent contents of the histogram memory may continue off the right side of the graph in FIG. 29.

As illustrated in FIG. 29, the initial portion of the histogram memory may include an initial peak 2904 that results from the emission of photons from the light source on the optical measurement system. As described above, the light source for the optical measurement system can emit photons that are reflected from the surrounding environment and received by the photosensor. When photons are initially emitted, at least a portion of those photons may be immediately detected by the photosensor after reflecting from a housing of the optical measurement system without being reflected off of the surrounding environment outside of the optical measurement system. In some cases, the initial peak may also be caused by an object that is in close proximity to the photosensor that blocks the normal emission, reflection, and reception of photons with the surrounding environment. For example, a plastic bag or other object may inadvertently become attached to the optical measurement system, causing a large portion of the light emitted by the light source to be immediately reflected back onto the photosensor. Each of these situations may generate the initial peak 2906 that is detected at the beginning of a shot and stored in an initial portion of the histogram memory. However, this initial object is not the desired object to ultimately be detected.

Because of the proximity of this early reflection (e.g., from housing or covering object), the intensity of the initial peak 2904 may be very large. As described above, some embodiments may detect when a saturation occurs in any time bin in the histogram memory. Detecting a saturation in one time bin may cause the histogram data path to stop populating the histogram memory for that photosensor during other time bins in subsequent shots. Because the initial pulse 2904 may be very large, receiving the initial pulse in the initial portion of the histogram memory may cause the histogram data path to saturate early in a measurement. This saturation may occur early enough in the measurement such that relatively few shots are received for detecting reflected photons from the surrounding environment.

To prevent the initial pulse 2904 from causing the histogram data path to saturate, some embodiments may exclude the initial pulse 2904 from saturation detection and/or peak detection. Because the initial peak 2904 may predictably occur in the initial portion of the histogram memory, the initial time bins may be excluded from saturation detection. For example, a mask interval 2906 may be used that excludes a predetermined number of time bins from saturation detection. If a saturation occurs in the histogram data path during the mask interval 2906, the histogram data path can ignore the saturation and allow the photosensor to continue collecting and accumulating photon counts in the histogram memory.

Turning back briefly to FIG. 23, the saturation detection circuit 2302 may receive an input from the clock 810 after a predetermined number of clock cycles have elapsed. The signal from the clock 810 may be used as an enable signal for the saturation detection circuit 2302, such that it does not detect a saturation during the initial portion of each shot. Some embodiments may alternatively use an internal counter in the saturation detection circuit 2302 that is reset and started by the shot signal 814. The output of the internal counter can be fed into a comparator that compares the internal counter value to a predetermined number of clock cycles during the initial portion of each shot. The saturation detection circuit 2302 can be enabled by the output of the comparator when the predetermined number of clock cycles has elapsed.

The number of clock cycles that are excluded by the mask interval 2906 can be set based on a length of each time bin and a predetermined distance from the optical measurement system. For example, some embodiments may exclude initial pulses that are reflected within 2 feet of the optical measurement system. The number of registers in the mask interval 2906 can be determined by dividing the time it takes for photons to travel back and forth within the 2 foot range by the time represented by each time bin. Other embodiments may use different ranges besides 2 feet depending on how and where the optical measurement system is installed. For example, other embodiments may use ranges such as 1 foot, 2 feet, 3 feet, 5 feet, and so forth. Some embodiments may also allow the range represented by the mask interval 2906 to be set/adjusted dynamically during operation based on various factors, such as a speed at which a vehicle carrying the optical measurement system travels, weather conditions, traffic conditions, and/or any other factor that may cause a large initial peak 2904.

B. Detecting Multiple Peaks

In addition to being excluded from saturation detection as described above, the initial peak 2904 may also be excluded when detecting additional peaks received in subsequent time bins of the histogram memory. In practice, the large initial peak 2904 may be followed by multiple peaks that represent photons reflected from objects in the surrounding environment. The multiple peaks following the initial peak can be used to determine a distance between the optical measurement system and the reflecting objects. Therefore, to avoid interfering with the accuracy of these distance measurements, some embodiments may include a peak detection circuit that is able to exclude previously detected peaks, such as the initial peak 2904.

1. Recursive Masking of Previous Peaks

Figure 30:
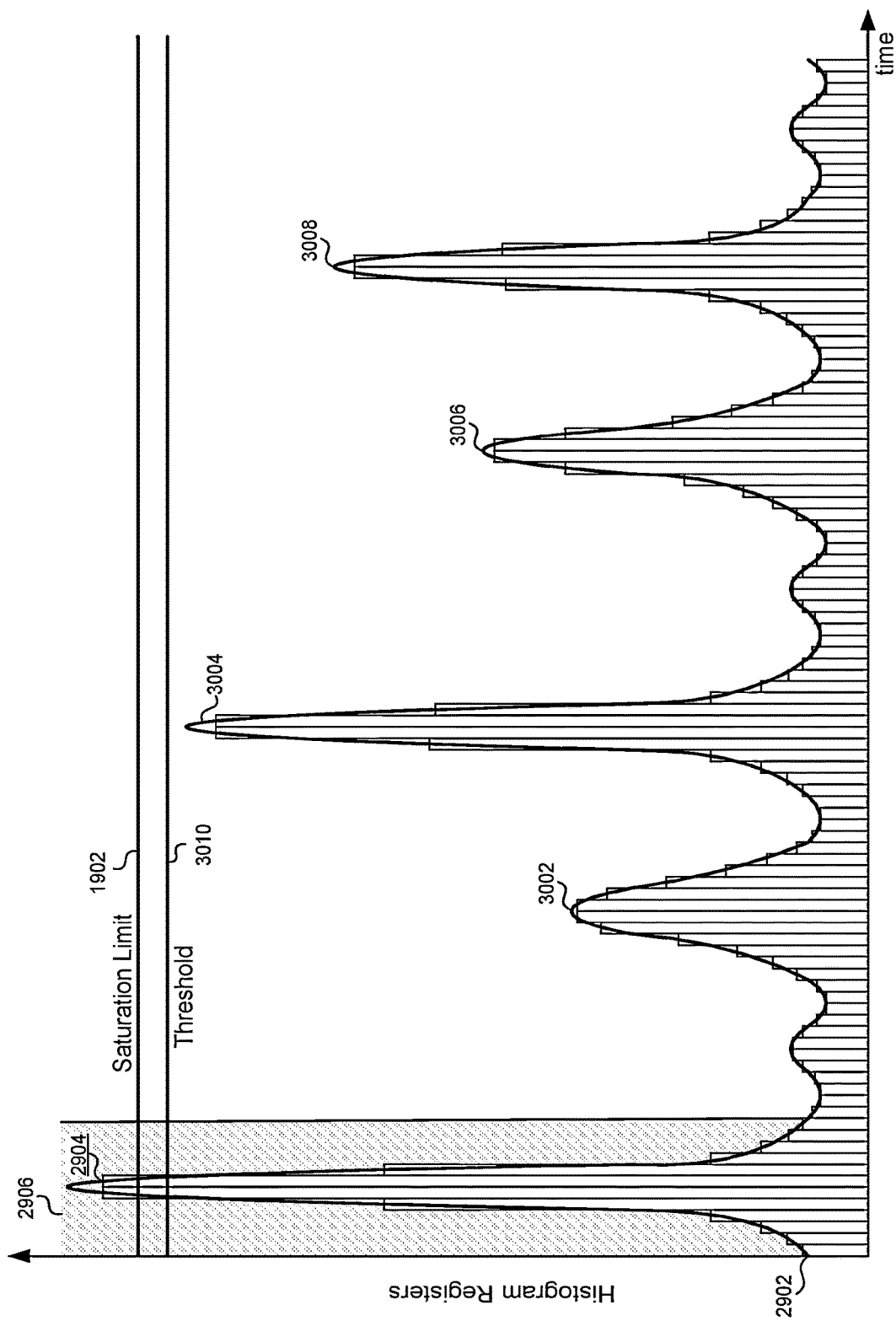
FIG. 30 shows a plurality of peaks represented in the histogram memory, according to some embodiments.

FIG. 30 shows a plurality of peaks represented in the histogram memory, according to some embodiments. The histogram memory may include the initial peak 2904 described above that exceeds the saturation limit 2902 of the histogram data path. Additionally, the histogram memory may include a plurality of subsequent peaks 3002, 3004, 3006, 3008 representing photon counts resulting from reflections off of objects in the surrounding environment. To accurately calculate a distance, a peak detection circuit may cycle through the registers of the histogram memory to identify each peak while excluding previously detected peaks from being identified more than once.

As described above, the raw histogram data can undergo one or more filtering operations before being analyzed to detect peak values. Some embodiments may use a low-pass filter on the raw histogram data to eliminate any transient signals, to smooth the data, and/or to expand the width of any reflected peaks. Some embodiments may also use a matched filter that corresponds to the pulse trains emitted by the light source of the optical measurement system. The matched filter may change the shape of the data stored by the histogram memory to generate peaks that are more readily identifiable than signals in the raw data. The matched filter may also be used to distinguish between reflected pulse transient and/or ambient background light received by the photosensor.

The embodiments described herein for detecting multiple pulses and masking an initial pulse may be used with any type of data in the histogram memory. For example, these embodiments may be used with unfiltered data to detect peaks in the raw data. These embodiment may also be used with filtered data, such as data that has undergone a low-pass filtering operation and data that has been filtered using a matched filter. Filters may be applied to the data both before and after peaks have been detected by the peak detection circuit without affecting its operation. Portions of the histogram memory identified as peaks may also be sent to a processor in filtered and/or unfiltered formats.

Some embodiments may use a method of recursive masking to exclude the initial peak 2904 and any peaks that were previously identified by the peak detection circuit. The peak detection circuit may be configured to cycle through the registers in the histogram memory and identify a maximum value. For example, the peak detection circuit may successively traverse each register in the histogram memory to detect a maximum value stored in the register. Because the value stored in each histogram register represents an accumulated photon count during each of the shots of an optical measurement, this maximum value may represent a maximum number of photons received during any single time bin.

Once a maximum value has been identified, a portion of the histogram memory surrounding the maximum value may be identified as a peak. Some embodiments may identify a predetermined number of time bins around the maximum value that may be designated as a peak. For example, a number of time bins, such as 5 time bins, 9 time bins, 15 time bins, 17 time bins, and so forth, maybe identified and centered around the maximum value to represent the whole peak. Some embodiments may identify surrounding time bins with values within a percentage of the maximum value. This may result in a variable number of time bins that may be used to represent a peak depending on the width of the peak. For example, time bins surrounding the maximum value may be included in the peak when their values are within 25% of the maximum value. The width of a peak may be used when masking an identified peak in a later iteration to identify further peaks.

In FIG. 30, a narrow peak, such as peak 3004 may include the 6 time bins surrounding the maximum value, while a wider peak, such as peak 3002, may include the 12 time bins surrounding the maximum value. Some embodiments may also exclude maximum values where the resulting peak would be too narrow. For example, a maximum value that would result in a peak that is only three time bins wide may be considered a transient peak rather than reflected peak. These relatively narrow peaks may be excluded by the peak detection circuit since it is unlikely that they resulted from photons reflecting from an object at that particular distance in the surrounding environment. Using any of these methods, the peak detection circuit may identify a number of time bins to represent the peak, and the value in these time bins may be sent to a processor to calculate a distance to the reflecting object.

Each operation or execution by the peak detection circuit may detect the maximum value in the histogram memory. Without modification, each execution of the peak detection circuit would likely identify the same maximum value and return the same peak. Therefore, some embodiments may use a masking circuit that is coupled to the peak detection circuit to detect multiple peaks as the peak detection circuit makes multiple passes through the histogram memory. The masking circuit can use peaks previously detected by the peak detection circuit to cause the peak detection circuit to exclude these peaks from subsequent execution cycles. This allows each execution of the peak detection circuit to identify a new peak that was not considered the maximum peak in previous iterations.

In FIG. 30, the initial peak 2904 may be a known peak or one that was previously detected. Therefore, the masking circuit may provide a mask to the peak detection circuit to exclude the time bins in the mask interval 2906. For example, the masking circuit may provide values to the peak detection circuit that identify the first 12 (or other number) time bins in histogram memory as time bins that should be excluded from the execution of the peak detection circuit. When the peak detection circuit executes, any maximum values identified in the mask interval 2906 can be excluded from the current execution cycle. For example, the peak detection circuit can skip over time bins in the mask interval 2906. Instead of skipping over time bins in the mask interval 2906, the peak detection circuit can alternatively ignore any values identified as a maximum value within the mask interval 2906. For the initial peak 2904, the mask interval 2906 can be used by the peak detection circuit during a first execution of the peak detection circuit such that the initial peak 2904 is not identified as a peak corresponding to photons reflected from an object in the surrounding environment.

When the initial peak 2904 is excluded from the execution of the peak detection circuit, the next-largest peak in the histogram memory can be identified. In the example of FIG. 30, peak 3004 may be identified as a peak during the first execution of the peak detection circuit. Peak 3004 may include a maximum value that is larger than any other remaining value in the histogram memory. The peak detection circuit may continue cycling through the registers until the end of the histogram memory, then determine that the maximum value in histogram memory corresponds to peak 3004. The peak detection circuit may then determine a peak resulting from the maximum value that includes, for example, the 9 time bins surrounding this maximum value in order to define peak 3004. An indication of these time bins can then be passed to a set of registers that stores identified peaks and/or to the masking circuit such that the peak 3004 can be excluded from subsequent executions of the peak detection circuit.

Figure 31:
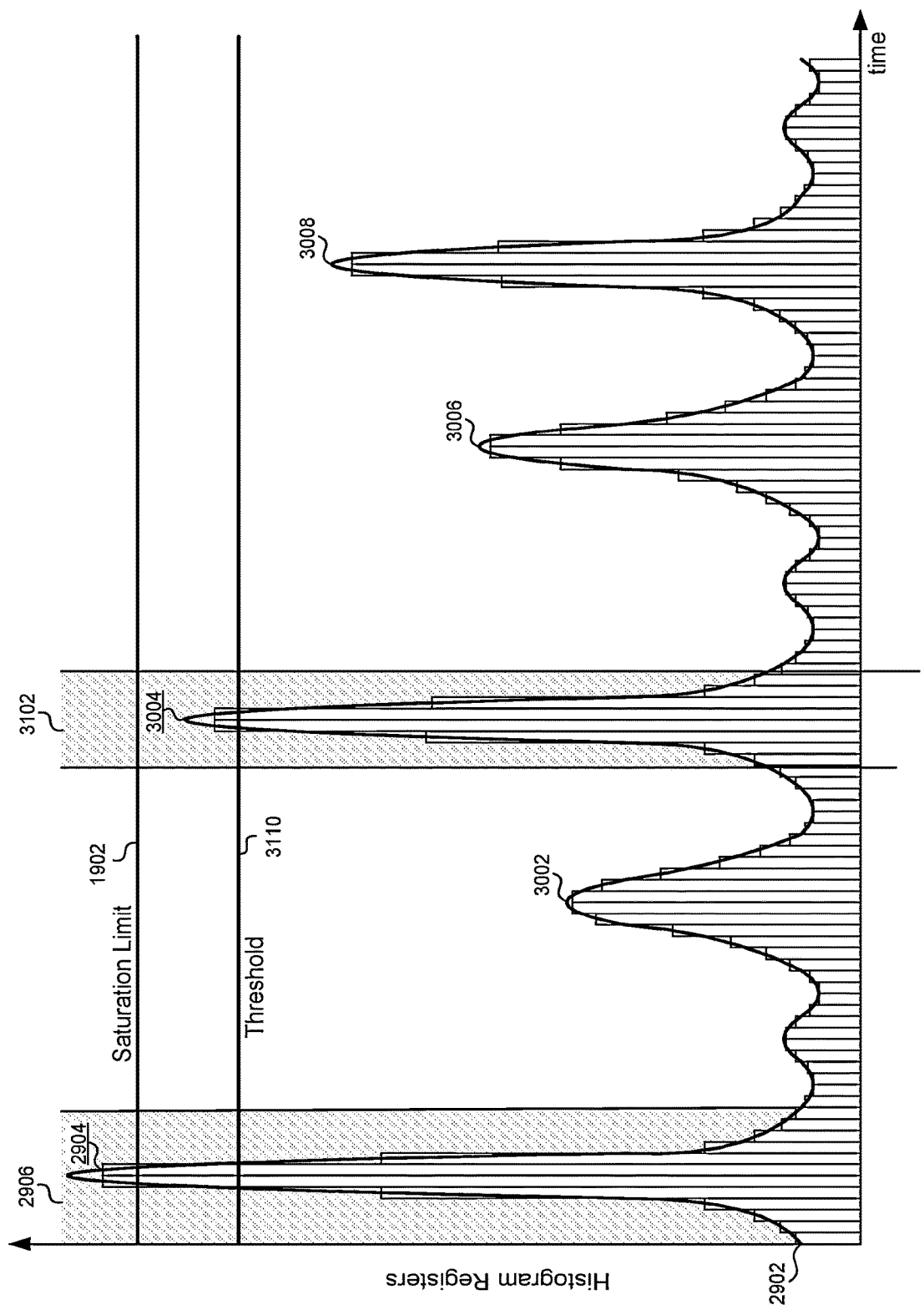
FIG. 31 shows a previously detected pulse being masked for subsequent executions of the peak detection circuit, according to some embodiments.

FIG. 31 shows a previously detected pulse being masked for subsequent executions of the peak detection circuit, according to some embodiments. After identifying peak 3004 during a first execution of the peak detection circuit (which used mask 2906), the masking circuit can generate a mask interval 3102 that identifies the time bins associated with peak 3004. These time bins can be provided in addition to the time bins from mask interval 2906 associated with the initial peak 2904. During a second execution of the peak detection circuit, maximum values identified in mask interval 2906 and mask interval 3102 may be excluded from consideration. Alternatively, any time bins in mask interval 2906 or mask interval 3102 need not have their values examined for consideration as a maximum value and may be skipped by the peak detection circuit.

During the second execution of the peak detection circuit, the next largest remaining peak can be identified. In the example of FIG. 31, peak 3008 may be identified by virtue of having the largest valid maximum value remaining in the histogram memory. As described above, the time bins surrounding peak 3008 may be identified by the peak detection circuit and stored in a set of registers and/or passed to the masking circuit such that the time bins associated with peak 3008 are excluded from consideration during subsequent executions of the peak detection circuit.

Figure 32:
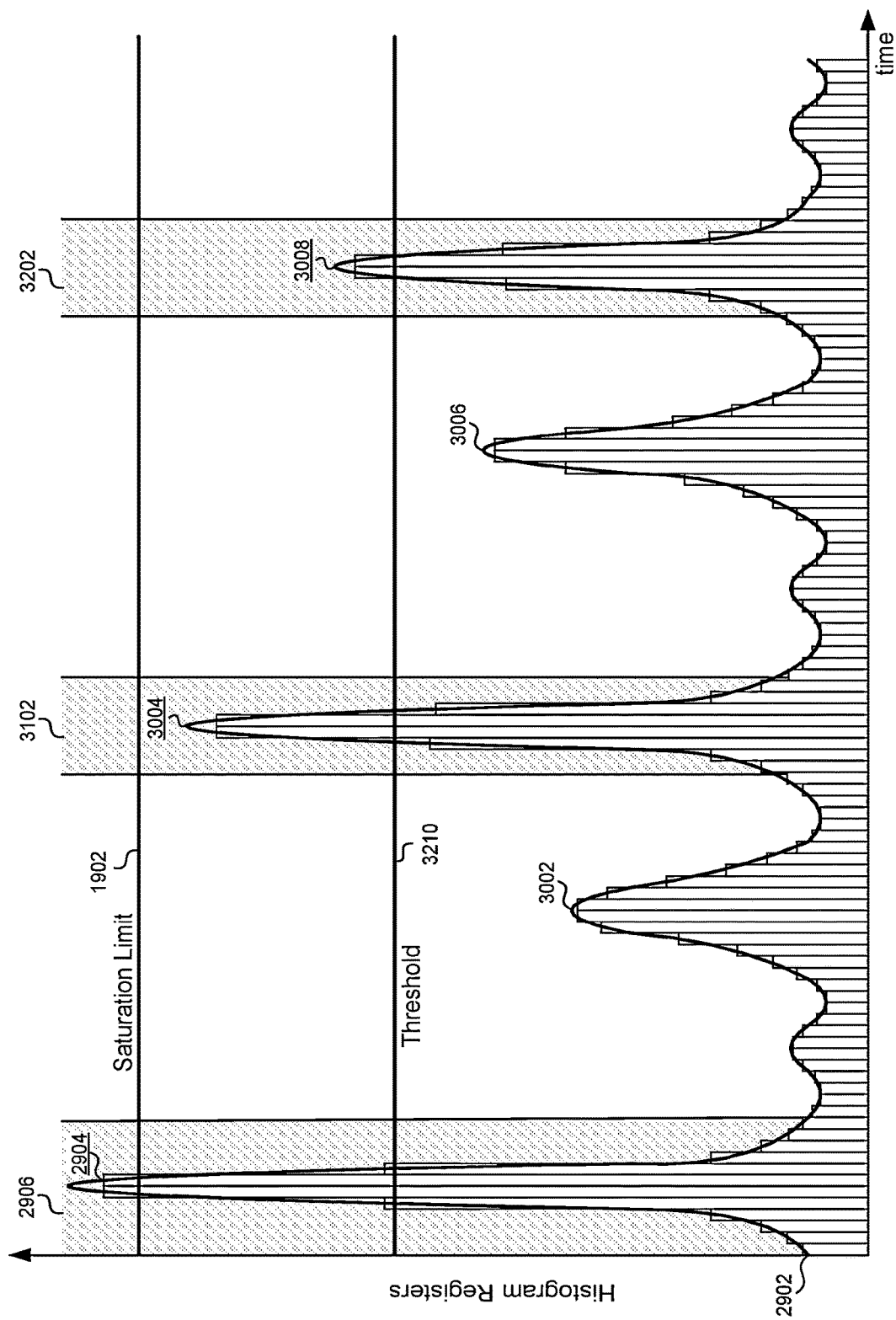
FIG. 32 illustrates how the masking circuit may continuously generate new masks as additional peaks are identified by the peak detection circuit, according to some embodiments.

FIG. 32 illustrates how the masking circuit may continuously generate new masks as additional peaks are identified by the peak detection circuit, according to some embodiments. After detecting peak 3008, the masking circuit may generate a mask interval 3202 that identifies the time bins associated with peak 3008. The masking circuit may pass the mask interval 3202 to the peak detection circuit such that those time bins are excluded from subsequent executions of the peak detection circuit. For example, during a third execution of the peak detection circuit, the time bins associated with mask interval 2906, mask interval 3102, and mask interval 3202 may be excluded from the search for maximum values. As more peaks are identified during subsequent executions of the peak detection circuit, the number of time bins that need to be considered by the peak detection circuit decreases. This may increase the speed with which subsequent executions of the peak detection circuit can cycle through the histogram memory and may reduce the overall time for detecting multiple peaks in a measurement.

FIGS. 30-32 illustrate how the peak detection circuit can be executed as a recursive process where the results from a previous execution are used to affect each subsequent execution. The masking process described above allows the peak detection circuit to be executed any number of times, and thus any number of peaks may be detected in the histogram memory. Some embodiments may detect a predefined number of peaks in each measurement. For example, for a system configured to find three peaks in each measurement, the peak detection circuit may execute three times, with each execution detecting a new peak as previously detected peaks are masked off. In FIG. 32, after detecting peak 3004 and peak 3008, the peak detection circuit can be executed a third time to detect peak 3006. Having identified three peaks for the current measurement, the peak detection circuit can complete its execution cycles for the current measurement.

Some embodiments need not identify a predetermined number of peaks, but may instead identify a number of peaks that satisfy a threshold. Generically, the "threshold" may include the predetermined number of peaks described above. Additionally, the "threshold" may include a variable number of peaks that satisfy certain criteria. Some embodiments may identify any peaks with maximum values above a threshold value. Some embodiments may identify any peaks with maximum values within a threshold percentage of a maximum value of the largest peak. For example, once a largest peak is identified, additional peaks may be identified that have maximum values within 50% of the maximum value of the largest peak. Some embodiments may identify a predetermined number of peaks that are identified within a predefined time interval from a first detected peak. For example, the peak detection circuit may identify a first peak, then identify peaks that occur within 50 time bins after the first peak. In any of these cases, once the threshold for identifying pulses is met, the peak detection circuit can conclude its executions for the current measurement.

2. Thresholding of Previous Peaks

The examples described above use mask intervals to exclude time bins from consideration by subsequent executions of the peak detection circuit. However, some embodiments may use alternative methods to exclude previously identified peaks from consideration. For example, instead of identifying specific time bins to be excluded, the masking circuit may adjust a maximum threshold for peaks detected by the peak detection circuit. Using a threshold may provide the advantage that only a single value needs to be stored and/or updated between the masking circuit and the peak detection circuit for subsequent executions.

Referring back to FIG. 30, the initial peak 2904 may be excluded by virtue of a threshold 3010 rather than (or in addition to) the mask interval 2906. The threshold 3010 may be set at or below the saturation limit 1902. The peak detection circuit may then exclude any peaks with maximum values that meet or exceed the threshold 3010. For example, when analyzing the initial peak 2904, the peak detection circuit may determine that at least one of the time bins for the initial peak 2904 meets the saturation limit 1902. The peak action circuit may then identify time bins surrounding any time bins that meet or exceed the threshold 3010 and eliminate those time bins from consideration during the current peak execution cycle. The time bins surrounding the time bins that meet or exceed the threshold 3010 may be identified using any of the methods described above for determining the mask interval 2906.

After setting the threshold 3010 to be at or near the saturation limit 1902, the first execution of the peak detection circuit can identify peak 3004 using the maximum value approach described above. Specifically, a time bin in peak 3004 may include a maximum value in the histogram memory, and the surrounding time bins can be identified to define peak 3004 for both the processor and the masking circuit.

Referring again to FIG. 31, a threshold 3110 can be set to exclude both the initial peak 2904 and peak 3004. For example, the threshold 3110 may be set at or below a maximum value found in peak 3004. As described above, when a maximum value is encountered that exceeds the threshold 3010, the peak detection circuit can exclude both the maximum value and any time bins surrounding the maximum value. Because each subsequent peak identified by the peak detection circuit will necessarily be smaller in magnitude than any of the previously identified peaks, the threshold 3110 can continuously move down to exclude peaks as they are identified. Peak 3008 may be identified by the peak detection circuit as a maximum value that does not meet or exceed the threshold 3110. The time bins surrounding peak 3008 can then be identified for the processor and the masking circuit.

A threshold 3210 can be set to exclude the most recently identified peak 3008. The threshold 3210 may also exclude peak 3004 and the initial peak 2904 because they were also previously identified and thus larger in magnitude than peak 3008. This process can continue iteratively until a threshold number of peaks have been identified. As described above for recursive masking, this threshold may indicate a number of peaks meeting a predefined criteria, and/or any other type of threshold.

XIII. Peak Detection Circuit

Figure 33:
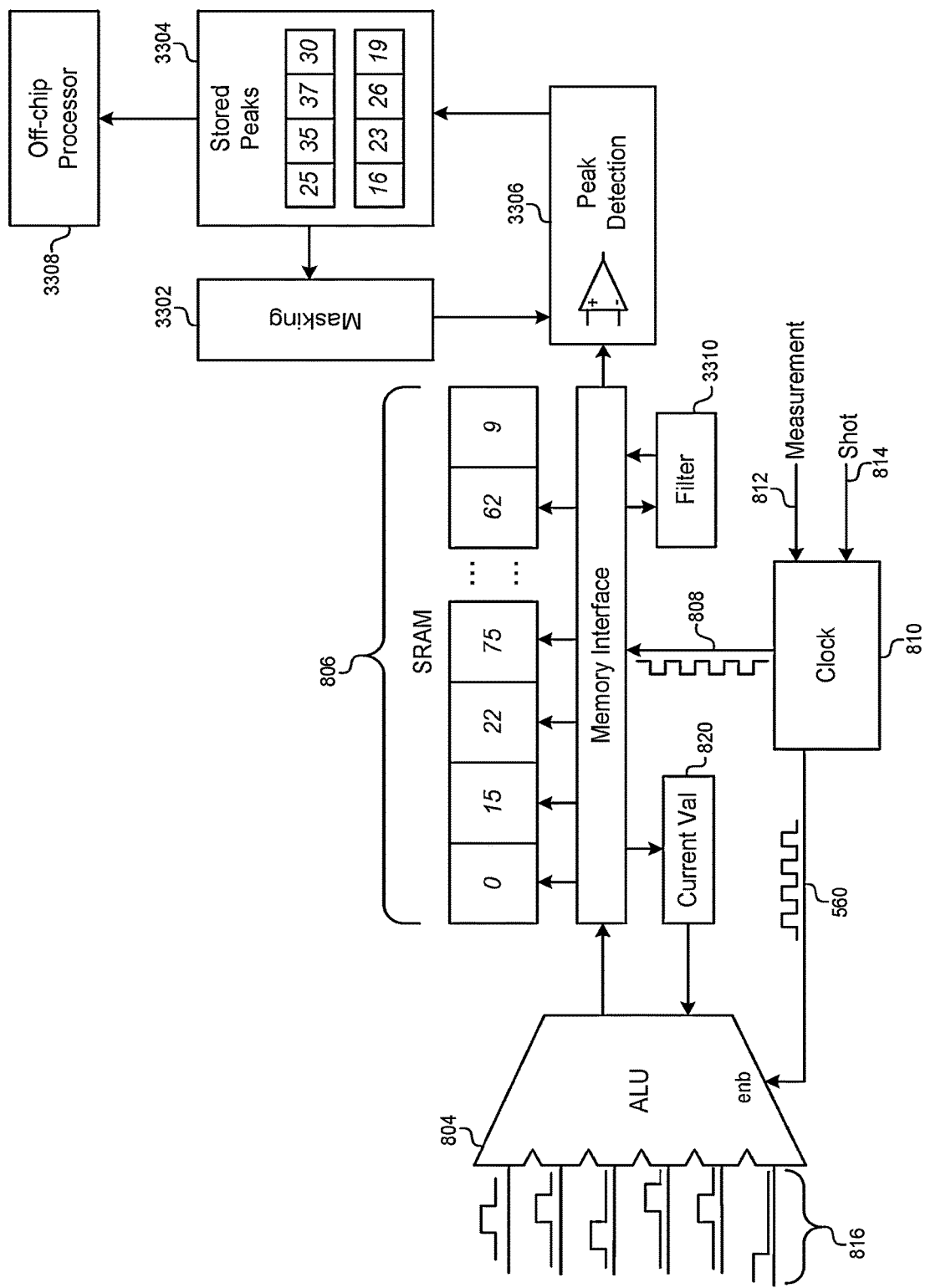
FIG. 33 shows a circuit for detecting multiple peaks in a histogram memory, according to some embodiments.

FIG. 33 shows a circuit for detecting multiple peaks in a histogram memory, according to some embodiments. This circuit is similar to the histogram data paths described above in FIG. 8 and FIG. 10. This circuit may include a peak detection circuit 3306 that may communicate with the memory interface of the histogram memory 806. The peak detection circuit 3306 may operate as described above to cycle through each of the registers in the histogram memory 806 to identify maximum values and surrounding registers representing time bins to define each peak. The peak detection circuit 3306 may include one or more comparators to identify values in the histogram memory 806 as maximum values, one or more registers designating masks and/or thresholds that should be excluded from consideration, and an addressing unit that requests information from the histogram memory 806.

The circuit may also include a plurality of registers 3304 that stores peaks identified by the peak detection circuit 3306. Peaks may be stored as a series of time bins with associated values that are read from the histogram memory 806. For example, values from the histogram memory 806 may be copied into the plurality of registers 3304 to represent the identified peaks in the histogram memory. The plurality of registers 3304 may also represent peaks as addresses or memory locations in the histogram memory 806. When sending the identified peaks to a processor for distance calculations, the registers 3304 may read values from the histogram memory 806 and send the read values from the histogram memory 806 to the processor. In addition to storing values for each time bin and/or references to time bins in the histogram memory 806, the registers 3304 may also store relative time information that indicates a location in time for each of the identified peaks. For example, the registers 3304 may store a relative time bin number (e.g. time bin 45) that can be used to estimate a time for the time bin from the beginning of a shot. Fractions of a time bin can also be stored, e.g., when interpolation filters are used. The plurality of registers 3304 may also be referred to herein as a "plurality of second registers" to distinguish them from the "plurality of first registers" in the histogram memory.

The plurality of registers 3304 may pass the stored peaks to a processor 3308. The processor may correspond to the ranging system controller 250 in FIG. 2. In some embodiments, the processor 3308 may be an off-chip processor. For example, the processor 3308 may be implemented in an integrated circuit chip that is physically separate and distinct from an integrated circuit chip on which the peak detection circuit 3306 is implemented. The processor 3308 may receive each of the stored peaks in the plurality of registers 3304 for each measurement and may perform distance and/or timing calculations to determine a distance between the optical measurement system and a reflecting object in the surrounding environment. As an example, processor 3308 may apply interpolation filters to the histogram portions (or filtered portions) of the stored peaks. In some embodiments, the registers 3304 may send an unfiltered version of the data to the processor 3308. For example, the processor 3308 may receive raw data from the histogram memory 806 that has not been low-pass filtered or matched filtered. In other embodiments, the filtered data may instead be passed to the processor 3308.

A masking circuit 3302 can use the stored peaks in the plurality of registers 3304 to cause the peak detection circuit 3306 to exclude peaks that have already been detected from subsequent executions of the peak detection circuit 3306. In some embodiments, the masking circuit 3302 can send a range of time bins comprising a range of addresses in the histogram memory 806 that can be excluded from the execution of the peak detection circuit 3306. In some embodiments, the masking circuit 3302 can send a threshold value such that peaks that exceed the threshold value can be excluded from the execution of the peak detection circuit 3306. In some embodiments, the masking circuit 3302 may be integrated with the peak detection circuit 3306, such that the masks and/or thresholds are stored internally in the peak detection circuit 3306. In other embodiments, the masking circuit 3302 and the peak detection circuit 3306 may separate their functionality into different areas on an integrated circuit.

This circuit may optionally include a filter 3310 that is used to apply one or more filters to data values stored in the histogram memory 806. These filters may include a low pass filter to smooth transition signals, increase the signal-to-noise ratio (SNR), increase the width of any peaks, and so forth. These filters may also include a matched filter that is configured to identify pulse train patterns emitted from the light source. Any filter 3310 may be applied before, after, or during the operation of the peak detection circuit 3306. For example, the peak detection circuit 3306 may operate on the raw histogram data as received from the ALU 804. In some embodiments, the peak detection circuit 3306 may operate on registers in the histogram memory after one or more of the filters 3310 have been applied. Some embodiments may allow the peak detection circuit 3306 to process filtered data, and then pass unfiltered data corresponding to the filtered peaks to the off-chip processor 3308.

XIV. Methods for Multi-Peak Detection

Methods for iteratively or recursively detecting multiple peaks in the histogram memory may include a top-level process that includes transmitting pulse trains, receiving reflected signals and ambient light signals, accumulating photon counts in the histogram memory, and identifying peaks in the histogram. These methods may also include a lower-level process that includes executing the peak detection circuit multiple times to incrementally detect peaks in the histogram memory. This section will first describe the lower-level process for executing the peak detection circuit multiple times. This section will then describe the top-level process for completing a measurement using the lower-level process.

Figure 34:
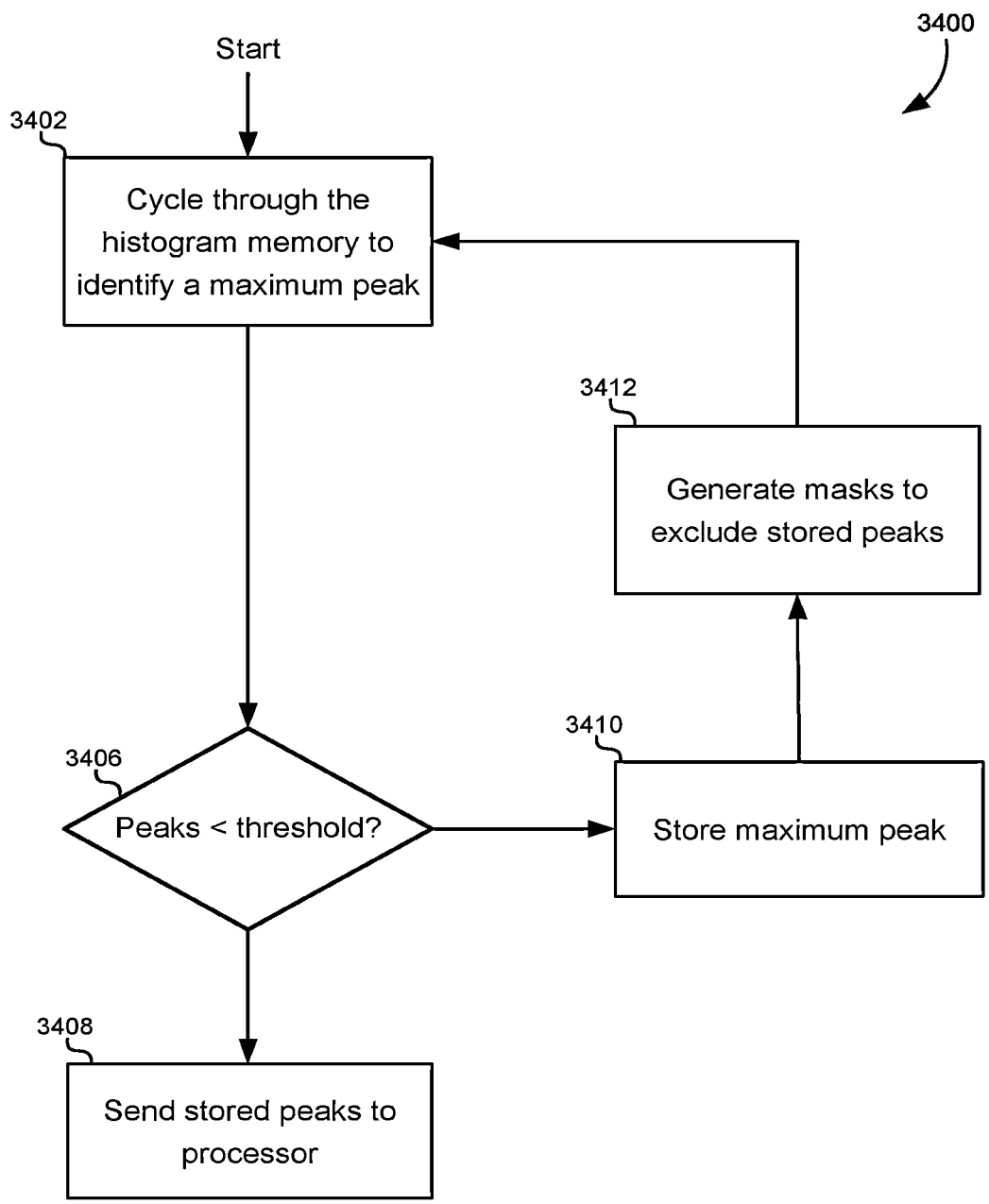
FIG. 34 illustrates a flowchart of a method for detecting multiple peaks in a measurement, according to some embodiments.

FIG. 34 illustrates a flowchart of a method for detecting multiple peaks in a measurement, according to some embodiments. This method may be executed by the peak detection circuit described above.

At block 3402, the method may begin by cycling through the histogram memory to identify a maximum peak. For example, the peak detection circuit may successively send addresses or ranges of addresses to the histogram memory to retrieve values stored in the histogram memory. Each value retrieved from the histogram memory can be compared to a stored maximum value to locate an overall maximum value in the histogram memory. Using the methods described above, the peak detection circuit may then define a peak surrounding the maximum value in histogram memory, which may include a plurality of time bins in the histogram memory surrounding a time bin with the maximum value.

At block 3406, the method may optionally determine whether the peaks detected in a current execution of the peak detection circuit along with peaks detected in previous executions of the peak detection circuit meet or exceed a threshold. As described above, this threshold may include a predefined number of peaks and/or a variable number of peaks that meet predefined criteria, such as peaks falling within a predetermined time interval, peaks within a threshold percentage of a maximum value of the largest peak, and so forth. If thresholding is not performed, the method may proceed to block 3410. In some implementations, instead of thresholding, block 3406 can determine whether the number of peaks has reached a maximum.

At block 3408, if the detected peaks meet or exceed the threshold, the method may continue and send the stored peaks to a processor for distance and/or timing calculations.

At block 3410, if the number of detected peaks does not yet meet or exceed the threshold, then the method may continue by storing the maximum peak from the current execution of the peak detection circuit with any peaks detected from previous executions of the peak detection circuit.

At block 3412, the method may include generating masks and/or thresholds to exclude each of the stored peaks from subsequent executions of the peak detection circuit. As described above, the masks and/or thresholds may cause the peak detection circuit to disregard maximum values that fall within a range of time bins that belong to previously identified peaks. The masks and/or thresholds may also cause the peak detection circuit to disregard maximum values that meet or exceed the threshold values. The method may then continue at block 3402 and again cycle through the histogram memory to identify another maximum peak outside of the previously identified maximum peaks.

Figure 35:
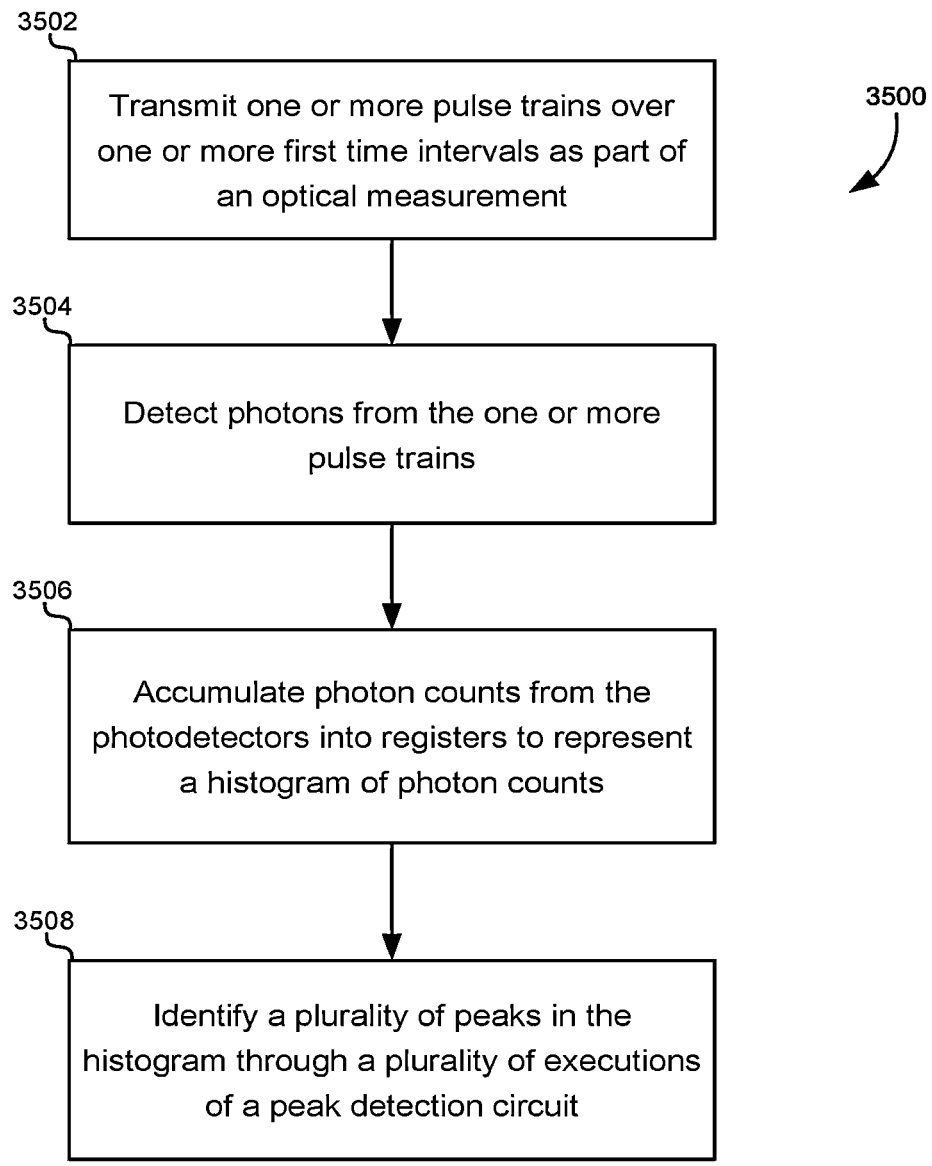
FIG. 35 shows a method for using an optical measurement system to detect multiple peaks, according to some embodiments.

FIG. 35 shows a method for using an optical measurement system to detect multiple peaks, according to some embodiments. At block 3502, the method may include transmitting one or more pulse trains over one or more first time intervals as part of an optical measurement. Each of the first time intervals may correspond to a shot time interval as described above, and each of the first time intervals may correspond to one of the pulse trains that are transmitted. These pulse trains may be transmitted by a light source of the optical measurement system and may each include one or more individual pulses.

At block 3504, the method may also include detecting photons from the one or more pulse trains and photons. Photons from ambient light may also be detected. The pulse trains and ambient light may be detected using a plurality of photodetectors on a photosensor. The photodetectors may be implemented using single-photon avalanche diodes (SPADs). The photodetectors may generate signals when photons are received, and thresholding circuitry may generate positive signals to indicate that photons were received. An ALU may aggregate these positive signals during an ALU clock cycle to generate a photon count during the ALU clock cycle.

At block 3506, the method may additionally include accumulating photon count from the photodetectors into registers to represent a histogram of photon counts in a plurality of first registers. The plurality of first registers may include registers in an SRAM of a histogram data path as described above. Each of the first time intervals may be subdivided into a plurality of first time bins for the histogram. Corresponding time bins in each of the one or more first time intervals may be accumulated in single registers in the first plurality of registers. Each of the first time intervals may represent a shot, and together the one or more first time intervals may represent a measurement for the optical measurement system. Each of the first time intervals may be defined by a start signal or shot signal that resets the memory representing the histogram back to the first register in the histogram. The photon count may be aggregated by an arithmetic logic circuit in the data path, such as the ALU described above.

At block 3508, the method may further include identifying a plurality of peaks in the histogram represented by the first plurality of registers through a plurality of executions of a peak detection circuit. Each execution of the peak detection circuit may identify a maximum peak in the histogram. As described above, the peak detection circuit may traverse the time bins in the histogram memory to identify a maximum value, and then identify a plurality of time bins that represent the peak with the maximum value. Additionally, peaks identified as maximum peaks during previous executions of the peak detection circuit may be excluded from being identified as maximum peaks during subsequent executions of the peak detection circuit. These previously identified peaks may be excluded using time bin masks and/or thresholds as described in detail above.

XV. Calculating Thresholds With the Integration Register

Some of the embodiments above describe systems and methods for recursively or iteratively detecting one or more peaks in a measurement. These recursive or iterative methods may be useful for identifying peaks without additional information regarding the surrounding environment in which a measurement is made. Specifically, no information is needed regarding an ambient light level, background noise, reflected light intensity, and so forth. Instead, these methods use the iterative or recursive circuitry described above to successively identify the largest remaining unidentified peak in the measurement until criteria have been met, such as identifying a predetermined number of peaks in the measurement.

Instead of using iterative or recursive methods, some embodiments may instead calculate a threshold value using information measured from the surrounding environment. For example, a background noise level may be measured from the surrounding environment using the integration register or registers described above. Because the integration register(s) represent a total photon count received during a measurement, this total photon count can be divided by a total time during which the integration register was enabled to calculate a background noise level representing ambient light photons at or near the wavelength of the LIDAR light source that are received from the surrounding environment. Some embodiments may optionally remove any reflected light peaks resulting from the one or more pulse trains emitted by the optical measurement system from the calculation of the background noise level. This background noise level can then be used to calculate a threshold for detecting peaks in the measurement in which the threshold was derived.

A number of technical advantages may be realized by calculating a threshold for detecting peaks in a measurement. For example, the threshold allows each measurement to set a measurement-specific threshold based on the background noise level present during that measurement. It also allows a single threshold to be used for detecting multiple peaks in the measurement, and thus the threshold only needs to be calculated a single time. Furthermore, the single threshold allows the peak detection circuit to make a single pass through the histogram memory. Making multiple passes through the histogram memory requires additional time and power for each pass. Instead of requiring a pass through the histogram memory for each identified peak, these methods allow multiple peaks to be identified with only a single pass, thereby reducing the time and power required to identify multiple peaks.

The threshold for identifying multiple peaks can be calculated using a number of different techniques. For example, an estimate of the background noise level can be obtained or calculated by the optical measurement system. This estimate of the background noise level can then be used to set the threshold as described in greater detail below. Estimating the background noise level may also be accomplished using a number of different techniques. Some embodiments may use statistical sampling of the light received between shots in a measurement to estimate the background noise level. Other embodiments may utilize the integration register(s) described above.

A. Estimating Background Noise

Figure 36:
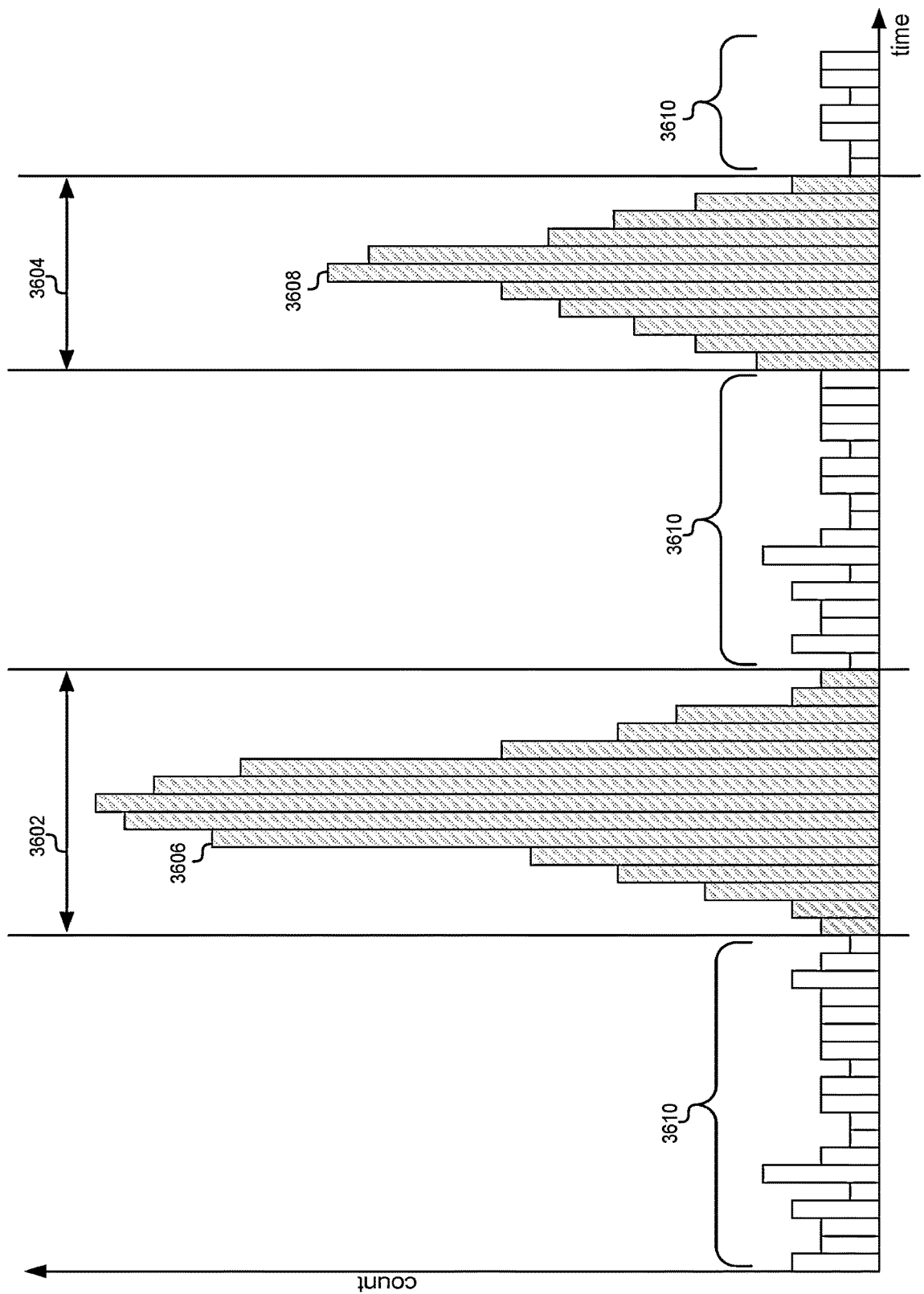
FIG. 36 shows a graph of light detected at the optical measurement system resulting from a plurality of shots, according to some embodiments.

FIG. 36 shows a graph of light detected at the optical measurement system resulting from a plurality of shots, according to some embodiments. In this example, each of the shots may receive at least a first peak 3606 and a second peak 3608. Note that additional peaks may be received as time continues beyond the right side of the graph which are not explicitly shown in FIG. 26. The first peak 3606 and/or the second peak 3608 may result from photons from one or more pulse trains that were previously emitted from the light source of the optical measurement system. In some environments, the first peak 3606 and/or the second peak 3608 may also result from other reflections or light sources in the surrounding environment.

As described above, some embodiments may apply various filters to the contents of the histogram memory prior to identifying peaks in the histogram. For example, a low-pass filter may be applied to the histogram data. Some embodiments may additionally or alternatively apply a matched filter to the histogram data. These embodiments for identifying multiple peaks with a threshold may be used on both filtered and unfiltered data. Therefore, the graph in FIG. 36 may be considered either filtered or unfiltered histogram data interchangeably without restriction.

The vertical axis of the graph may represent the photon count received by one photosensor in an array of photosensors. The horizontal axis may represent time. These photons may have been received over a plurality of shots to store a digitized representation of the signals the histogram memory. Therefore, each of the vertical bars in FIG. 36 may represent a single time bin in the histogram memory. Note that the values stored in each of the time bins in the histogram memory shown in FIG. 36 may also be aggregated in one or more integration registers over the course of a measurement. Instead of showing the value of the integration register(s), it should be understood that the integration register(s) may operate as described above to include the photon count in each of the vertical bars of the graph, along with any photon counts that occurred before, between, and/or after shots in the measurement.

As described above, some embodiments may include a single integration register, while other embodiments may include a plurality of integration registers. Either integration register configuration is compatible with these methods for estimating a background noise level and generating a peak-detection threshold. Therefore, this description may use the term "integration register" to refer to a single integration register and to refer to a plurality of integration registers that provide an aggregate total of photon counts over a measurement.

The first peak 3606 may be associated with a first window 3602 that includes a plurality of time bins as described above. The second peak 3608 may also be associated with a second window 3604 in the same manner. The time bins in the first window 3602 and the second window 3604 may therefore be associated with the first peak 3606 and the second peak 3608, respectively. The remaining time bins outside of the first window 3602 and the second window 3604 may be referred to as background time bins 3610. The background time bins 3610 may represent the background noise received during each of those time bins, as they are not associated with a reflected pulse train as part of the measurement or other strong light sources or reflections.

The background noise level may be determined by the values in the background time bins 3610. For example, the background noise level may be estimated using a standard deviation analysis of the histogram data. This analysis may remove outlier time bins that occur in the first window 3602 and the second window 3604 and average the values found in the background time bins 3610 to calculate the background noise level. Alternatively, samples may be taken of histogram values for the background time bins 3610 outside of the first window 3602 and the second window 3604 as an estimate of the background noise.

Instead of relying only on the contents of the histogram memory, some embodiments may additionally or alternatively use the total photon count of the integration register to calculate the background noise level. The total value stored in the integration register may provide a more accurate and computationally inexpensive method of estimating the background noise level in the measurement. Because the integration register stores an overall total of all photons received by the photosensor over a known time interval, this value can be divided by the total time interval during which the integration operation took place to estimate the background noise. For example, a number of clock cycles for the periodic signals that clock the integration ALU and/or the integration registers may be tracked along with the total photon count in the integration register. The total photon count can then be divided by the number of clock cycles to calculate the background noise level.

Some embodiments may also compensate for any peaks 3606, 3608 recorded by the integration register when calculating the background noise level. Note that FIG. 36 is not drawn to scale with respect to time. Actual return pulses generally make up only a small fraction of the overall integration value recorded in the integration register. Therefore, the photons received due to the return pulses may be considered negligible compared to the overall number of photons received due to background noise throughout the measurement. The extent to which the photons in the peaks affect the estimation of the background noise level may depend on the size of the windows 3602, 3604 compared to the overall integration time. If the size of the windows 3602, 3604 is small compared to the overall integration time (e.g., less than 5%) then their effect on the background noise estimation may be considered negligible, and the total signal photon count may be used to estimate the background noise level.

However, if the size of the windows 3602, 3604 makes up more than a negligible portion of the total integration time (e.g., more than 10%), then additional steps may be taken to more accurately estimate the background noise level. For example, the photons received during the windows 3602, 3604 can be subtracted from the value in the integration register. The photon count in the histogram registers during the time bins in the windows 3602, 3604 can be subtracted from the value in the integration register. Additionally, the length of the windows 3602, 3604 can be subtracted from the overall integration time. The modified value for the total photon count in the integration register can then be divided by the modified integration time to better estimate the background noise value. This may allow the optical measurement system to reduce the effect that multiple strong peaks would otherwise have when calculating the background noise level.

Figure 37:
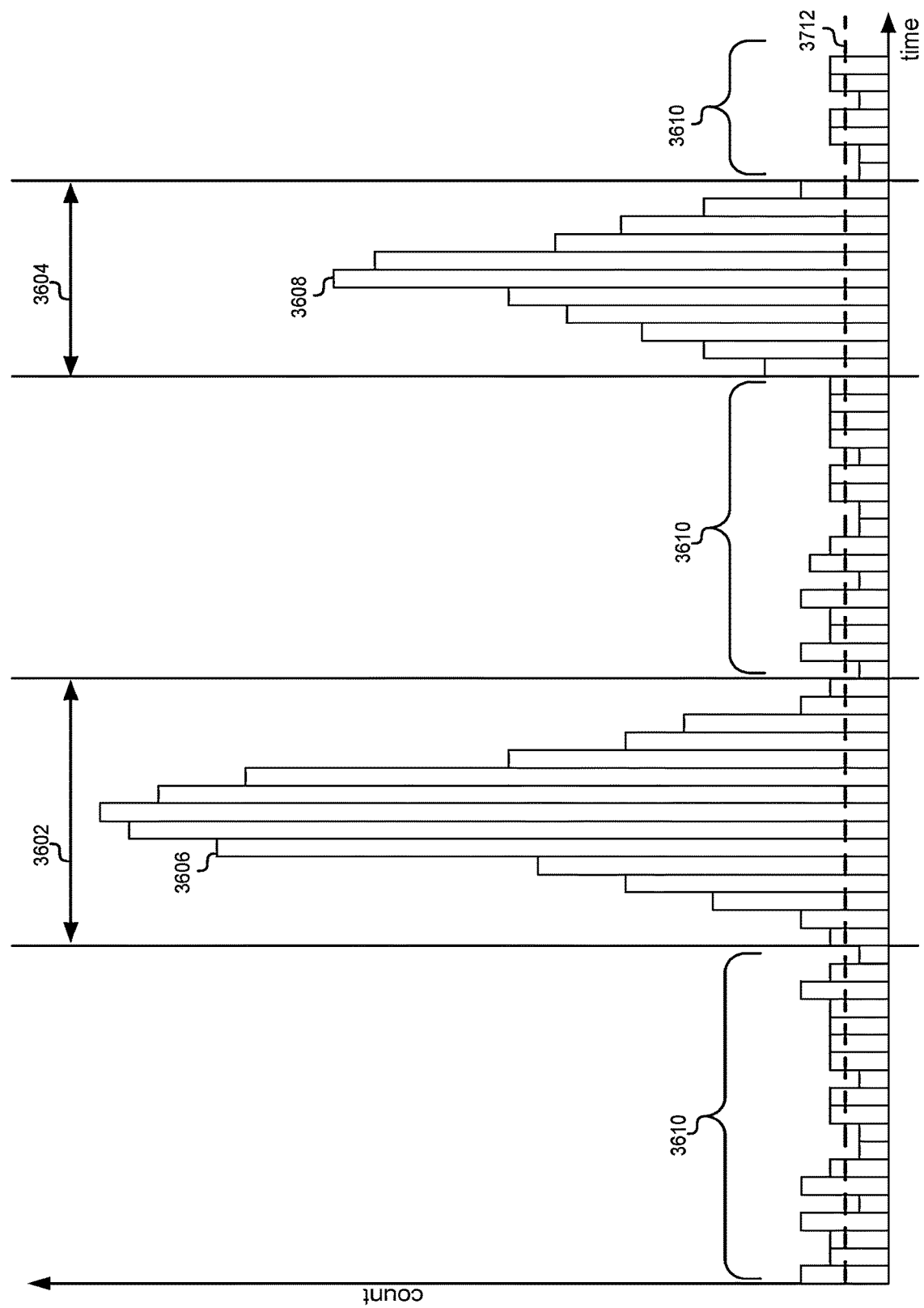
FIG. 37 illustrates the estimated background noise level compared to the received photon counts in the histogram memory, according to some embodiments.

FIG. 37 illustrates the estimated background noise level 3610 compared to the received photon counts in the histogram memory, according to some embodiments. Using any of the processes described above, the background noise level 3712 may be calculated for the measurement. Optionally, the photon count received during the first interval 3602 and/or the second interval 3604 may be removed from the estimation procedure by subtracting the photon counts received during the first window 3602 and/or the second window 3604 as described in the section above. This may result in an estimated background noise level 3712 that is very close to the actual average of the background noise levels stored in the background time bins 3610.

The estimated background noise level 3712 may be used by the optical measurement system for a number of different signal processing procedures. In some embodiments, the estimated background noise level 3712 can be subtracted from each of the peaks 3606, 3608 before they are analyzed for distance measurements. For example, the estimated background noise level may be subtracted from each time bin in the histogram registers that falls within time windows associated with identified peaks, such the time bins in the first window 3602 and the second window 3604. Subtracting out the background noise level may reduce the photon count in each of the time bins associated with identified peaks, which may provide a more accurate magnitude measurement for the peaks.

Some embodiments may implement the histogram data path and the integration data path in an integrated circuit chip that may detect peaks in the histogram memory and pass information describing those peaks to a separate processor for distance calculations, data visualization, and other data analysis operations. Some implementations may pass information regarding the signal strength of the peaks 3606, 3608, and the strength (i.e., magnitude) of these peaks may be used in addition to their temporal location. Before passing the peak data from the integrated circuit, the estimated background noise level 3712 can be used as a signal floor and subtracted from the peaks 3606, 3608. This may provide a more accurate characterization of the pulse magnitude by removing the background noise level before the shape and/or height of those peaks 3606, 3608 are analyzed.

B. Setting a Detection Threshold

Figure 38:
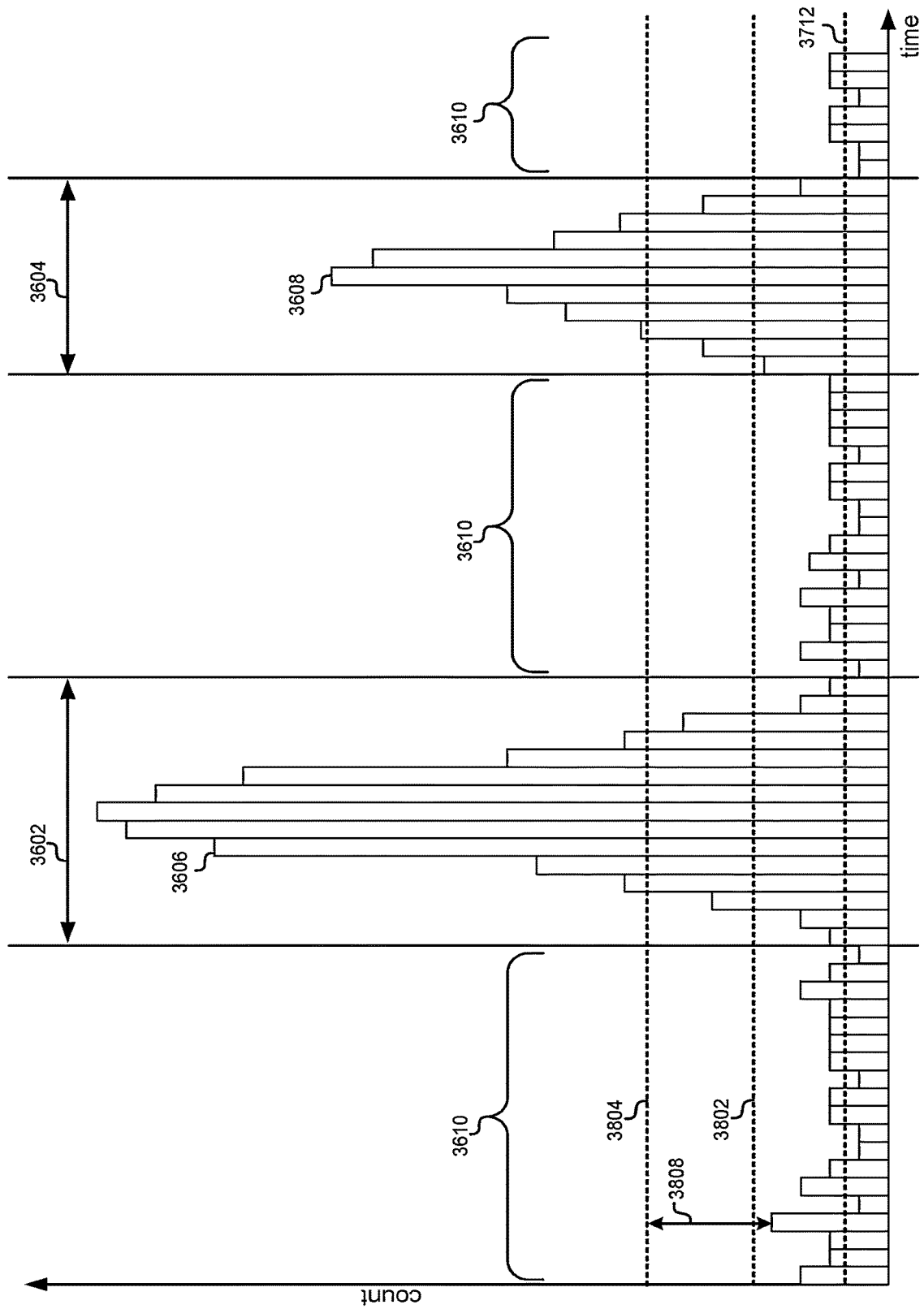
FIG. 38 shows a graph where the estimated background noise may be used to set a signal threshold for detecting peaks in the histogram memory, according to some embodiments.

FIG. 38 shows a graph where the estimated background noise may be used to set a signal threshold for detecting peaks in the histogram memory, according to some embodiments. After estimating the background noise level 3712, that estimation may be used as a baseline for setting a threshold 3802 for detecting peaks in the histogram memory, such as peak 3606 and/or peak 3608. By using the background noise level 3712 as a baseline, the threshold can be set such that any background noise identified in the background time bins 3610 can be excluded as peaks by setting the threshold a distance above the background noise level 3712.

Some embodiments may begin with the estimated background noise level 3712 and add a predetermined percentage of the background noise level 3712 to calculate a desired threshold. The predetermined percentage by which the background noise level 3712 may be increased may be 10%, 20%, 30%, 40%, 50%, 75%, 100%, 125%, 150%, and so forth. For example, FIG. 38 illustrates a threshold 3802 set by increasing the background noise level 3712 by approximately 125%. This allows the threshold for each measurement to be scaled according to the magnitude of the background noise level 3712. In environments with more background noise, the threshold 3802 may increase proportionally to provide a greater margin in noisy environments.

Some embodiments may also add a predetermined value to the background noise level 3712 to generate the threshold 3802 instead of increasing the background noise level 3712 by a certain percentage. For example, the threshold 3802 in FIG. 38 may be set by adding a predetermined photon count to the background noise level 3712. This may provide a constant margin above the background noise level 3712 that is constant with respect to various levels of background noise.

Instead of using an estimate of the average background noise level as described above, some embodiments may find a maximum value in the background time bins 3610 and generate the threshold based on that maximum value. For example, a maximum value may be identified in the background time bins 3610, and the threshold may be set using any of the methods described above based on the maximum value rather than an average or mean value. This may generate a threshold 3804 that is higher than the threshold 3802 that was based on an average or mean value. The higher threshold 3804 may ensure a margin 3808 that is calculated to exclude all of the background time bins 3610 in the measurement.

XVI. Single-Pass Peak Detection

Once a threshold has been determined for a measurement, that threshold can be used by a peak detection circuit to make a single pass through the histogram memory to identify any peaks in the measurement. The iterative and/or recursive methods described above identify peaks incrementally by generating a threshold, and thus may require multiple passes through the histogram memory to identify multiple peaks. In contrast, these embodiments that calculate a threshold beforehand may identify multiple peaks using a single pass through the histogram memory.

A. Detecting Peaks

Referring again to FIG. 38, any of the depicted thresholds may be used to identify peaks. To identify one or more peaks, a peak detection circuit may make a pass through the histogram memory. As used herein, the term "pass" may refer to an operation or set of operations that successively accesses memory locations in the histogram memory and evaluates the photon counts stored in the memory locations against the threshold. For example, a pass through the histogram memory may include providing addresses or address ranges to the histogram memory, retrieving a photon count from those addressed locations, and/or comparing those photon counts to one or more thresholds.

In the example of FIG. 38, each of the time bins represented by the vertical bars in the graph may represent a location in the histogram memory. As described above, these locations may be referred to as a "plurality of first registers" that store a histogram of the received photon counts over a plurality of shots. The values of these memory locations depicted by the vertical bars in the graph may be sequentially accessed in the histogram memory and compared to a threshold, such as threshold 3804. When a memory location includes a value that exceeds the threshold 3804, that memory location may be identified as belonging to a peak. For example, the nine middle memory locations (or other number) in peak 3606 may be identified as belonging to a peak because the photon counts stored in each of those memory locations exceed threshold 3804.

Once one or more memory locations in the histogram memory have been identified as belonging to a peak, a peak window may be determined surrounding those memory locations using the techniques described in detail above. For example, once the central memory locations of peak 3606 are identified as surpassing the threshold 3804, the first window 3602 may be determined by various methods described above. These methods may include designating a predetermined number of time bins surrounding the peak as part of the first window 3602, designating surrounding time bins that exceed a lower threshold as part of the first window 3602, and so forth.

B. Passing Peaks Off-Chip

The peak detection methods described above may be executed on an integrated circuit that includes the histogram memory, the peak detection circuit, and a threshold detection circuit. This integrated circuit may be implemented in a single chip package that is separate and distinct from a processor that analyzes the detected peaks for distance calculations, image generation, image processing, and so forth. Therefore, some embodiments may detect peaks in the histogram memory, designate windows of time bins that include those peaks, and pass information describing those peaks off the integrated circuit to the separate processor.

Figure 39:
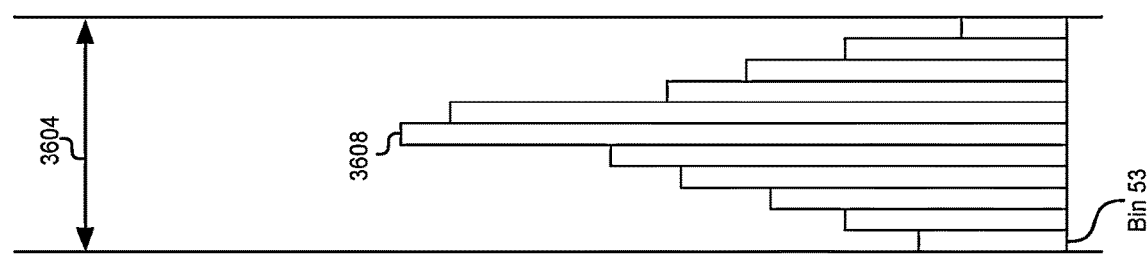
FIG. 39 shows peak windows detected by the threshold operation that may be passed off-chip to a processor, according to some embodiments.
Figure 39:
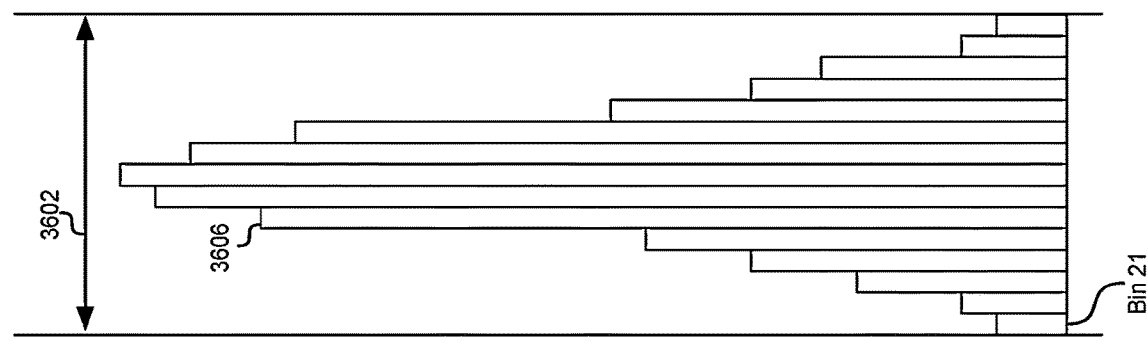

FIG. 39 shows peak windows detected by the threshold operation that may be passed off-chip to a processor, according to some embodiments. In this example, the first window 3602 and the second window 3604 that include the detected peaks from FIG. 38 may be extracted from the rest of the histogram memory. Recall that the time window that include peaks may be relatively small compared to the overall time representing shots and/or measurements in the histogram memory. Therefore, on-chip peak detection greatly reduces the amount of memory that may need to be streamed off of the integrated circuit to the processor.

Some embodiments may read values from the histogram memory that have been identified as belonging to a peak and pass those values to the off-chip processor. For example, a stream of numbers representing photon counts belonging to time bins of peak 3606 may be sent to the processor. Additionally, some embodiments may send an identifier that provides relative timing information for the beginning/end of the detected peak. For example, a time bin number, memory location address, or other identifier may be used to designate where in a measurement the identified peak starts/ends.

As described above, the data values in the histogram memory that represent the identified peaks may be passed off-chip to the processor in filtered and/or unfiltered formats, depending on the embodiment. For example, the raw histogram values representing photon counts received from the photosensor may be sent to the processor. Any filtering that takes place on the integrated circuit can then be duplicated by the processor if needed. This allows the processor to use the unfiltered data, while still allowing the processor to separately filter the unfiltered data if any operations require the filtered data. Some embodiments may alternatively or additionally send data that has been filtered using any of the filtering options described above, including low-pass filters, matched filters, and so forth.

XVII. Threshold and Peak Detection Circuit

Figure 40:
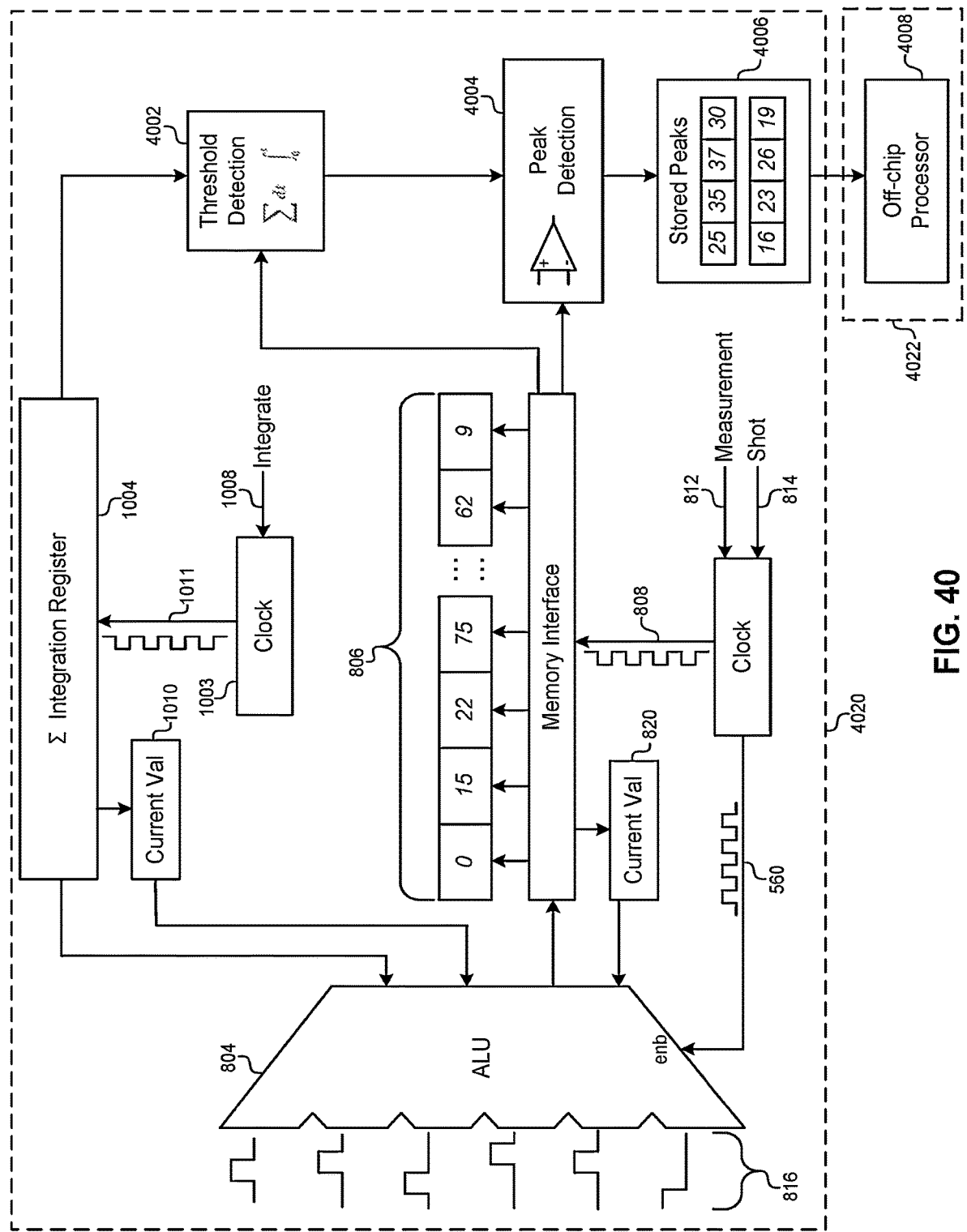
FIG. 40 shows circuits for calculating a threshold and detecting one or more peaks in the histogram memory, according to some embodiments.

FIG. 40 shows circuits for calculating a threshold and detecting one or more peaks in the histogram memory, according to some embodiments. This example shows how the histogram data path and the integration data path can be combined in the same integrated circuit. The histogram data path may include any of the circuit elements depicted in FIG. 8, including the histogram memory 806, the clock 810, the shot signal 814, the measurement signal 812, the periodic signals 560, 808 and so forth. The histogram data path may include any of the circuit elements depicted in FIG. 10, including the integration register 1004, the clock 1003, the periodic signal 1011, the integrate signal 1008, and so forth. The integration register 1004 may also include a plurality of individual registers as depicted in FIG. 12. In this embodiment, the integration data path and the histogram data path may share the ALU 804. For example, a first stage of the ALU 804 may aggregate the positive signals 816 from the photodetectors, and one or more second stages of the ALU 804 may add this value to a current value 820 of a time bin in the histogram memory 806 and to a current value 1010 in the integration register 1004. The integrate signal 1008 may be timed independently from the measurement signal 812 and/or the shot signal 814.

When a measurement is complete, a threshold detection circuit 4002 may use the various methods described above to calculate one or more thresholds for peak detection. For example, the threshold detection circuit 4002 may receive or aggregate a total photon count from the integration register 1004 to estimate the background noise level. Alternatively, the threshold detection circuit 4002 can sample or use other statistical methods to derive a background noise level from the contents of the histogram memory 806 from background time bins that do not correspond to reflected peaks. The threshold detection circuit 4002 may scale the background noise level or add a value to the background noise level to generate one or more thresholds.

The threshold detection circuit 4002 may pass the one or more calculated thresholds to a peak detection circuit 4004. The peak detection circuit may make a pass through the histogram memory 806 using the one or more thresholds calculated by the threshold detection circuit 4002 to identify one or more peaks in the histogram. Some embodiments may use only a single pass through the histogram memory 806 to identify multiple peaks. The peak detection circuit 4002 may then identify windows or intervals surrounding identified peaks using the methods described above.

The elements of the histogram data path, the elements of the integration data path, the threshold detection circuit 4002, and the peak detection circuit 4004 may be implemented in a first integrated circuit 4020. For example, the first integrated circuit 4020 may include each of these individual circuits implemented in a unit of semiconductor material that is physically separate and distinct from other integrated circuit chips in the optical measurement system.

In some embodiments, the peak detection circuit 4004 may pass the intervals representing peaks to an off-chip processor 4008. The off-chip processor 4008 may correspond to the ranging system controller 250 in FIG. 2. The off-chip processor 4008 may be implemented in a second integrated circuit 4022. The second integrated circuit 4022 may be physically separate and distinct from the first integrated circuit 4020. For example, communication between the first integrated circuit 4020 and the second integrated circuit 4022 may include transmitting signals between pins or pads of the integrated circuits 4020, 4022 via □. The method of claim REF_Rard.

In some embodiments, the peak detection circuit 4004 may pass the intervals representing peaks to an off-chip processor 4008 as they are detected by the peak detection circuit 4004. Other embodiments may store each of the identified peaks and transmit the peaks to the off-chip processor 4008 together once they have all been detected. For example, a second set of registers 4006 may store information representing the identified peaks as they are identified by the peak detection circuit 4004. The second set of registers 4006 may store address ranges in the histogram memory 806, values from the histogram memory 806, time bin numbers from the histogram memory 806, and so forth. The second set of registers 4006 may be significantly smaller in size than the histogram memory 806. While the histogram memory 806 may store the entire contents of the histogram of photon counts, the second set of registers 4006 may only need to store information (or references to information) representing a limited number of peaks in the histogram. Consequently, because the information stored in the second set of registers 4006 is significantly less than the information stored in the histogram memory 806, the bandwidth and memory required to pass this information between the first integrated circuit 4020 and the second integrated circuit 4022 may be greatly reduced by these embodiments.

Although depicted as separate circuit elements in FIG. 40, the threshold detection circuit 4002, the peak detection circuit 4004, and/or the second set of registers 4006 may be implemented in any combination without limitation. For example, the threshold detection circuit 4002 may be an integrated part of the peak detection circuit 4004 without any functional separation between the two circuits. Alternatively, the threshold detection circuit 4002 and the peak detection circuit 4004 may be functionally separated in the data path.

XVIII. Method for Threshold Peak Detection

Figure 41:
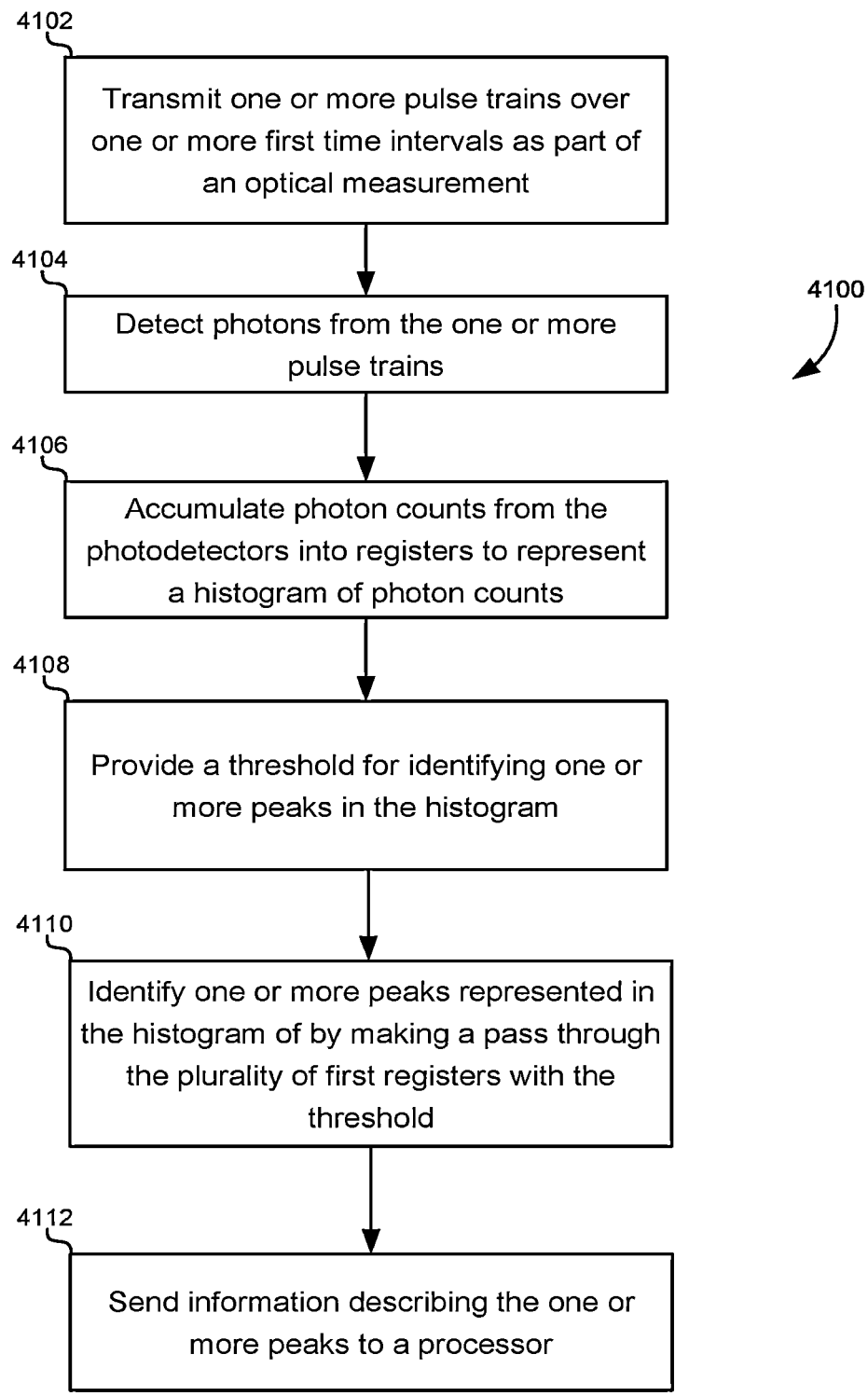
FIG. 41 shows a method for using an optical measurement system to detect multiple peaks, according to some embodiments.

FIG. 41 shows a method for using an optical measurement system to detect multiple peaks, according to some embodiments.

At block 4102, the method may include transmitting one or more pulse trains over one or more first time intervals as part of an optical measurement. Each of the first time intervals may correspond to a shot time interval as described above, and each of the first time intervals may correspond to one of the pulse trains that are transmitted. These pulse trains may be transmitted by a light source of the optical measurement system and may each include one or more individual pulses.

At block 4104, the method may also include detecting photons from the one or more pulse trains and photons. Photons from ambient light may also be detected. The pulse trains and ambient light may be detected using a plurality of photodetectors on a photosensor. The photodetectors may be implemented using single-photon avalanche diodes (SPADs). The photodetectors may generate signals when photons are received, and thresholding circuitry may generate positive signals to indicate that photons were received. An ALU may aggregate these positive signals during an ALU clock cycle to generate a photon count during the ALU clock cycle.

At block 4106, the method may additionally include accumulating photon count from the photodetectors into registers to represent a histogram of photon counts in a plurality of first registers. The plurality of first registers may include registers in an SRAM of a histogram data path as described above. Each of the first time intervals may be subdivided into a plurality of first time bins for the histogram. Corresponding time bins in each of the one or more first time intervals may be accumulated in single registers in the first plurality of registers. Each of the first time intervals may represent a shot, and together the one or more first time intervals may represent a measurement for the optical measurement system. Each of the first time intervals may be defined by a start signal or shot signal that resets the memory representing the histogram back to the first register in the histogram. The photon count may be aggregated by an arithmetic logic circuit in the data path, such as the ALU described above. Accumulating the photon count from the photodetectors may be performed on a first integrated circuit. The plurality of first registers may also reside on the first integrated circuit.

At block 4108, the method may further include providing a threshold for identifying one or more peaks in the histogram. In some embodiments, the threshold may comprise a default threshold that does not require any calculation during the current measurement. For example, the threshold may be reused from previous measurements or maybe calculated based on threshold values used in previous measurements. The threshold may also default threshold that is used unless a threshold that is specific to the current measurement is calculated.

In some embodiments, a background noise level may be determined and used to calculate the threshold. The background noise level may be determined using an integration register that accumulates a total photon count present in a time interval that overlaps with the measurement. For example, the total photon count may be divided by a time during which the integration register was enabled. Multiple integration registers may be used and aggregated to calculate a total photon count. The background noise level may later be removed from any identified peaks. Additionally, the background noise level may be used to generate the threshold. For example, the threshold may be calculated such that it is a predetermined percentage of, or value above the background noise level. These operations may be carried out using any of the methods described above, including those performed by the peak detection circuit 4004 and threshold detection circuit 4002 from FIG. 40. The threshold may be provided by a circuit implemented on the first integrated circuit with the plurality of first registers. The integration register may also be implemented on the first integrated circuit.

At block 4110, the method may additionally include identifying one or more peaks represented in the histogram by making a pass through the first plurality of registers with the threshold. As described above, the pass through the first plurality of registers may include an operation or set of operations that successively retrieves values from the histogram memory and compares them to the threshold. Identifying the peaks may include identifying values that exceed the threshold, as well as identifying a time window or time interval surrounding the values that exceed the threshold. The time window may include a plurality of values in time bins of the histogram memory and an indication of when that interval occurred in the histogram memory. Some embodiments may store the one or more peaks in a separate set of registers, such as the second set of registers 4006, and may pass the one or more peaks to an off-chip processor in filtered and/or unfiltered formats. The peaks may be identified on the first integrated circuit.

At block 4112, the method may further include sending information describing the one or more peaks detected using the threshold to a processor on a second integrated circuit. As depicted in FIG. 40 above, the processor may comprise an off-chip processor that is implemented on a separate integrated circuit. The first integrated circuit may be physically separate and distinct from the second integrated circuit. The processor may be configured to identify peaks in the one or more peaks resulting from pulse trains reflected from objects of interest in the surrounding environment. The processor may also be configured to perform distance calculations, generate images, and/or perform other processing functions on the information describing the one or more peaks sent from the first integrated circuit. The information describing the one or more peaks may include values from the plurality of first registers representing photon counts received in time bins of the histogram. The information may also include timing information indicating when the photon counts were received relative to a measurement made by the optical measurement system.

XIX. Additional Embodiments

While some embodiments disclosed herein have focused on the application of light ranging within the context of 3D sensing for automotive use cases, systems disclosed herein can be used in any application without departing from the scope of the present disclosure. For example, systems can have a small, or even miniature, form factors that enable a number of additional use cases, e.g., for solid-state light ranging systems. For example, systems can be used in 3D cameras and/or depth sensors within devices, such as mobile phones, tablet PCs, laptops, desktop PCs, or within other peripherals and/or user-interface devices. For example, one or more embodiments could be employed within a mobile device to support facial recognition and facial tracking capabilities, eye tracking capabilities, and/or for 3D scanning of objects. Other use cases include forward-facing depth cameras for augmented and virtual reality applications in mobile devices.

Other applications include deployment of one or more systems on airborne vehicles, such as airplanes, helicopters, drones, and the like. Such examples could provide 3D sensing and depth imaging to assist with navigation (autonomous or otherwise) and/or to generate 3D maps for later analysis, e.g., to support geophysical, architectural, and/or archeological analyses.

Systems can also be mounted to stationary objects and structures, such as buildings, walls, poles, bridges, scaffolding, and the like. In such cases, the systems can be used to monitor outdoor areas, such as manufacturing facilities, assembly lines, industrial facilities, construction sites, excavation sites, roadways, railways, bridges, etc. Furthermore, systems can be mounted indoors and used to monitor movement of persons and or objects within a building, such as the movement of inventory within a warehouse or the movement of people, luggage, or goods within an office building, airport, train station, etc. As would be appreciated by one of ordinary skill in the art with the benefit of this disclosure, many different applications of light ranging systems are possible and, as such, the examples provided herein are provided for illustrative purposes only and shall not be construed to limit the uses of such systems to only the examples explicitly disclosed.

XX. Computer System

Any of the computer systems or circuits mentioned herein may utilize any suitable number of subsystems. The subsystems can be connected via a system bus 75. As examples, subsystems can include input/output (I/O) devices, system memory, storage device(s), and network adapter(s) (e.g. Ethernet, Wi-Fi, etc.), which can be used to connect a computer system other devices (e.g., an engine control unit). System memory and/or storage device(s) may embody a computer readable medium.

A computer system can include a plurality of the same components or subsystems, e.g., connected together by external interface, by an internal interface, or via removable storage devices that can be connected and removed from one component to another component. In some embodiments, computer systems, subsystem, or apparatuses can communicate over a network.

Aspects of embodiments can be implemented in the form of control logic using hardware circuitry (e.g. an application specific integrated circuit or field programmable gate array) and/or using computer software with a generally programmable processor in a modular or integrated manner. As used herein, a processor can include a single-core processor, multi-core processor on a same integrated chip, or multiple processing units on a single circuit board or networked, as well as dedicated hardware. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective step or a respective group of steps. Although presented as numbered steps, steps of methods herein can be performed at a same time or at different times or in a different order. Additionally, portions of these steps may be used with portions of other steps from other methods. Also, all or portions of a step may be optional. Additionally, any of the steps of any of the methods can be performed with modules, units, circuits, or other means of a system for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of example embodiments of the invention has been presented for the purposes of illustration and description. It is not intended to be exhaustive or to limit the invention to the precise form described, and many modifications and variations are possible in light of the teaching above.

A recitation of "a", "an" or "the" is intended to mean "one or more" unless specifically indicated to the contrary. The use of "or" is intended to mean an "inclusive or," and not an "exclusive or" unless specifically indicated to the contrary. Reference to a "first" component does not necessarily require that a second component be provided. Moreover reference to a "first" or a "second" component does not limit the referenced component to a particular location unless expressly stated. The term "based on" is intended to mean "based at least in part on."

All patents, patent applications, publications, and descriptions mentioned herein are incorporated by reference in their entirety for all purposes. None is admitted to be prior art.

What is claimed is:

1. An optical measurement system comprising:
   a light source configured to transmit one or more pulse trains over one or more first time intervals as part of an optical measurement, wherein each of the one or more first time intervals includes one of the one or more pulse trains;
   a photosensor comprising one or more photodetectors configured to detect photons from the one or more pulse trains;
   a first integrated circuit comprising:
      a plurality of first registers that accumulate photon counts from the one or more photodetectors received during the one or more first time intervals to represent a histogram of photon counts received during the one or more first time intervals, each of the plurality of first registers corresponding to a time bin in the histogram;
   one or more integration registers that accumulate the photon counts from the one or more photodetectors over a second time interval that overlaps with at least a portion of the one or more first time intervals;
      a threshold detection circuit configured to provide a threshold for identifying one or more peaks in the histogram, wherein the threshold detection circuit is configured to calculate the threshold using one or more values in the one or more integration registers; and
      a peak detection circuit configured to make a pass through the plurality of first registers and identify the one or more peaks represented in the histogram using the threshold; and
   a second integrated circuit comprising a processor, wherein the first integrated circuit is configured to send information describing the one or more peaks detected using the threshold to the processor on the second integrated circuit.

2. The optical measurement system of claim 1, wherein the threshold detection circuit is configured to use an existing threshold.

3. The optical measurement system of claim 1, wherein the threshold detection circuit is configured to calculate the threshold based on the background noise level present during the one or more first time intervals.

4. The optical measurement system of claim 1, wherein the threshold detection circuit is further configured to calculate the background noise level by dividing a total photon count in the one or more integration registers by a duration of time during which the one or more integration registers were enabled.

5. The optical measurement system of claim 4, wherein the duration of time during which the one or more integration registers were enabled is determined based on a total number of clock cycles during which the one or more integration registers were enabled.

6. The optical measurement system of claim 1, wherein the threshold detection circuit is further configured to calculate the background noise level by:
   identifying one or more time bins in the histogram that represent the one or more peaks; and
   subtracting photon counts in the one or more time bins from a total photon count in the one or more integration registers.

7. The optical measurement system of claim 1, further comprising a plurality of second registers configured to store the one or more peaks identified by the peak detection circuit.

8. The optical measurement system of claim 7, wherein each peak of the one or more peaks is stored as:
   a window of time bins representing a time interval in the histogram around the peak; and
   a relative time in the histogram at which the peak occurred.

9. The optical measurement system of claim 1, wherein the first integrated circuit is implemented on a first chip that is physically separate and distinct from a second chip on which the second integrated circuit is implemented.

10. The optical measurement system of claim 1, wherein the one or more peaks are sent to the processor without applying a filter to values representing the one or more peaks in the histogram.

11. A method of using an optical measurement system, the method comprising:
   transmitting one or more pulse trains over one or more first time intervals as part of an optical measurement, wherein each of the one or more first time intervals includes one of the one or more pulse trains;
   detecting photons from the one or more pulse trains using one or more photodetectors;
   accumulating, on a first integrated circuit, photon counts from the one or more photodetectors into a plurality of first registers to represent a histogram of photon counts received during the one or more first time intervals, each of the plurality of first registers corresponding to a time bin in the histogram;
   accumulating, by one or more integration registers, photon counts from the one or more photodetectors over a second time interval that overlaps with at least a portion of the one or more first time intervals;
   providing, on the first integrated circuit, a threshold for identifying one or more peaks in the histogram, wherein the threshold is calculated using one or more values in the one or more integration registers;
   identifying, on the first integrated circuit, the one or more peaks represented in the histogram by making a pass through the plurality of first registers with the threshold; and sending, from the first integrated circuit, information describing the one or more peaks detected using the threshold to a processor on a second integrated circuit.

12. The method of claim 11, further comprising removing a background noise level from the one or more peaks represented in the histogram.

13. The method of claim 12, further comprising determining the background noise level based on a sample of photons received by the one or more photodetectors between the one or more pulse trains.

14. The method of claim 11, wherein providing the threshold comprises setting the threshold a predetermined interval above a background noise level.

15. The method of claim 11, wherein providing the threshold comprises setting the threshold an interval above a background noise level that is a predetermined percentage of the background noise level.

16. The method of claim 11, further comprising applying a low-pass filter to the histogram stored in the plurality of first registers prior to identifying the one or more peaks.

17. The method of claim 11, further comprising applying a matched filter to the histogram stored in the plurality of first registers prior to identifying the one or more peaks, wherein the matched filter corresponds to the one or more pulse trains.

18. The method of claim 11, wherein the one or more peaks comprises a first peak corresponding to reflections of the one or more pulse trains and a second peak that does not correspond to reflections of the one or more pulse trains.

19. The method of claim 11, wherein identifying the one or more peaks represented in the histogram uses only a single pass through the plurality of first registers.

* * * * *